US007882438B2

(12) United States Patent
Markham et al.

(10) Patent No.: US 7,882,438 B2
(45) Date of Patent: Feb. 1, 2011

(54) QUALITY MANAGEMENT AND INTELLIGENT MANUFACTURING WITH LABELS AND SMART TAGS IN EVENT-BASED PRODUCT MANUFACTURING

(75) Inventors: Charles Earl Markham, Appleton, WI (US); Douglas Gordon Barron Barber, Appleton, WI (US); John Harland Hise, Neenah, WI (US); Sheryl Annette Ihde, Greenville, WI (US); Jeffrey Dean Lindsay, Appleton, WI (US); Kurt Sigurd Nygaard, Appleton, WI (US); Michael Roy Pokorny, Neenah, WI (US); Michael T. Price, Oshkosh, WI (US); Walter Caswell Reade, Appleton, WI (US); Gregory Duncan Shaffer, Neenah, WI (US); Roger Dale Yosten, Sumner, TX (US)

(73) Assignee: Binforma Group Limited Liability Company

( * ) Notice: Subject to any disclaimer, the term of this patent is extended or adjusted under 35 U.S.C. 154(b) by 1376 days.

(21) Appl. No.: 11/363,476

(22) Filed: Feb. 27, 2006

(65) Prior Publication Data

US 2006/0149407 A1 Jul. 6, 2006

Related U.S. Application Data

(62) Division of application No. 10/306,868, filed on Nov. 27, 2002, now Pat. No. 7,035,877.
(60) Provisional application No. 60/344,747, filed on Dec. 28, 2001.

(51) Int. Cl.
*G06F 19/00* (2006.01)
(52) U.S. Cl. ........................ 715/736; 700/106; 700/109; 700/13; 700/19
(58) Field of Classification Search ................. 715/239, 715/273, 717, 736; 700/17, 109, 116, 106, 700/13
See application file for complete search history.

(56) References Cited

U.S. PATENT DOCUMENTS 3,693,430 A 9/1972 Menary
(Continued)

FOREIGN PATENT DOCUMENTS

EP 0217032 B1 4/1987
(Continued)

OTHER PUBLICATIONS

Chaudhuri et al., "An Overview of Data Warehousing and OLAP Technology," ACM Sigmod Record, vol. 27, Issue 1, pp. 65-74, Mar. 1997, New York, NY, U.S.A.
(Continued)

*Primary Examiner*—Stephen S Hong
*Assistant Examiner*—Matthew J Ludwig
(74) *Attorney, Agent, or Firm*—Perkins Coie LLP

(57) ABSTRACT

Providing quality management and intelligent manufacturing with labels and smart tags in event-based product manufacturing. Some of the disclosed embodiments include a system, method, and computer-readable media for storing, during a process, data associated with a material. Also disclosed are a method of collecting, storing, and reporting machine productivity, waste, and delay information on an event basis in a manufacturing system, a method of capturing and storing material history, a method of automating tracking of positions of components used in a process and correlating portions of a component with production problems, an improved inventory management system, and a method of tracking and recording actions of specific operators of a process performed by a machine. The embodiments are operable in an intelligent manufacturing system including a process for converting raw materials to a product, a process control system including one or more sensors capable of generating an alarm in response to an event that results in one of waste, machine delay, or decrease product quality, a data logger associated with the process control system for obtaining event parameters associated with the event, a database on a server for recording event parameters obtained by the data logger, and a reporting system cooperatively associated with the database for reporting productivity parameters regarding the process derived at least in part from the event parameters.

20 Claims, 19 Drawing Sheets

U.S. PATENT DOCUMENTS

| | | |
|---|---|---|
| 3,946,212 A | 3/1976 | Nakao et al. |
| 4,652,481 A | 3/1987 | Sjoberg |
| 4,663,220 A | 5/1987 | Wisneski et al. |
| 4,704,116 A | 11/1987 | Enloe |
| 4,798,603 A | 1/1989 | Meyer et al. |
| 4,819,176 A | 4/1989 | Ahmed et al. |
| 4,965,122 A | 10/1990 | Morman |
| 5,063,507 A | 11/1991 | Lindsey et al. |
| 5,086,397 A | 2/1992 | Schuster et al. |
| 5,087,137 A | 2/1992 | Burnard et al. |
| 5,109,241 A | 4/1992 | Keeney |
| 5,121,467 A | 6/1992 | Skeirik |
| 5,176,668 A | 1/1993 | Bernardin |
| 5,176,672 A | 1/1993 | Bruemmer et al. |
| 5,192,606 A | 3/1993 | Proxmire et al. |
| 5,226,992 A | 7/1993 | Morman |
| 5,266,944 A | 11/1993 | Carroll et al. |
| 5,282,001 A | 1/1994 | Watson |
| 5,311,438 A | 5/1994 | Sellers et al. |
| 5,325,305 A | 6/1994 | Rezaei |
| 5,359,525 A | 10/1994 | Weyenberg |
| 5,364,382 A | 11/1994 | Latimer et al. |
| 5,379,427 A | 1/1995 | Hiroshima |
| 5,432,702 A | 7/1995 | Barnett |
| 5,471,614 A | 11/1995 | Kakimoto |
| 5,478,990 A | 12/1995 | Montarnari et al. |
| 5,486,166 A | 1/1996 | Bishop et al. |
| 5,488,223 A | 1/1996 | Austin et al. |
| 5,490,846 A | 2/1996 | Ellis et al. |
| 5,496,298 A | 3/1996 | Kuepper et al. |
| 5,509,915 A | 4/1996 | Hanson et al. |
| 5,532,928 A | 7/1996 | Stanczyk et al. |
| 5,540,796 A | 7/1996 | Fries |
| 5,564,841 A | 10/1996 | Austin et al. |
| 5,595,618 A | 1/1997 | Fries et al. |
| 5,630,070 A | 5/1997 | Dietrich et al. |
| 5,638,519 A | 6/1997 | Haluska |
| 5,644,493 A | 7/1997 | Motai et al. |
| 5,673,194 A | 9/1997 | Cipelletti et al. |
| 5,737,496 A | 4/1998 | Frye et al. |
| 5,751,914 A | 5/1998 | Coley et al. |
| 5,778,155 A | 7/1998 | Hepner |
| 5,781,911 A | 7/1998 | Young et al. |
| 5,801,965 A | 9/1998 | Takagi et al. |
| 5,828,989 A | 10/1998 | Zvonar et al. |
| 5,858,515 A | 1/1999 | Stokes et al. |
| 5,890,159 A | 3/1999 | Sealby et al. |
| 5,896,294 A | 4/1999 | Chow et al. |
| 5,909,176 A | 6/1999 | Schrott et al. |
| 5,920,261 A | 7/1999 | Hughes et al. |
| 5,959,530 A | 9/1999 | Lupien, Jr. et al. |
| 5,971,315 A | 10/1999 | Kojo |
| 6,026,250 A | 2/2000 | Goto et al. |
| 6,027,022 A | 2/2000 | Hong |
| 6,038,486 A | 3/2000 | Saitoh et al. |
| 6,041,270 A | 3/2000 | Steffan et al. |
| 6,073,055 A | 6/2000 | Jahn et al. |
| 6,128,540 A | 10/2000 | Van Der Vegt et al. |
| 6,138,121 A | 10/2000 | Costa et al. |
| 6,141,647 A | 10/2000 | Meijer et al. |
| 6,144,893 A | 11/2000 | Van Der Vegt et al. |
| 6,178,418 B1 | 1/2001 | Singer |
| 6,184,924 B1 | 2/2001 | Schneider et al. |
| 6,195,590 B1 | 2/2001 | Powell |
| 6,212,530 B1 | 4/2001 | Kadlec |
| 6,215,396 B1 | 4/2001 | Script |
| 6,227,643 B1 | 5/2001 | Purcell et al. |
| 6,240,633 B1 | 6/2001 | Kent et al. |
| 6,247,128 B1 | 6/2001 | Fisher et al. |
| 6,259,367 B1 | 7/2001 | Klein |
| 6,266,656 B1 | 7/2001 | Ohno |
| 6,267,291 B1 | 7/2001 | Blankenship et al. |
| 6,291,003 B1 | 9/2001 | Riemann et al. |
| 6,294,997 B1 | 9/2001 | Paratore et al. |
| 6,298,454 B1 | 10/2001 | Schleiss et al. |
| 6,308,107 B1 | 10/2001 | Conboy et al. |
| 6,317,700 B1 | 11/2001 | Bagne |
| 6,353,835 B1 | 3/2002 | Lieuwen |
| 6,354,493 B1 | 3/2002 | Mon |
| 6,362,738 B1 | 3/2002 | Vega |
| 6,366,824 B1 | 4/2002 | Nair et al. |
| 6,401,098 B1 | 6/2002 | Moulin |
| 6,415,192 B1 | 7/2002 | Satoguchi |
| 6,418,450 B2 | 7/2002 | Daudenarde |
| 6,451,154 B1 | 9/2002 | Grabau et al. |
| 6,467,052 B1 | 10/2002 | Kaler et al. |
| 6,501,501 B1 | 12/2002 | Miyazawa |
| 6,522,939 B1 | 2/2003 | Strauch et al. |
| 6,560,611 B1 | 5/2003 | Nine et al. |
| 6,564,171 B1 | 5/2003 | Peterson et al. |
| 6,606,947 B2 | 8/2003 | Frossard et al. |
| 6,640,151 B1 | 10/2003 | Somekh et al. |
| 6,671,818 B1 | 12/2003 | Mikurak |
| 6,672,212 B1 | 1/2004 | Ferlitsch |
| 6,672,508 B2 | 1/2004 | Kaye |
| 6,673,637 B2 | 1/2004 | Wack et al. |
| 6,693,511 B1 | 2/2004 | Seal |
| 6,693,539 B2 | 2/2004 | Bowers et al. |
| 6,694,284 B1 | 2/2004 | Nikoonahad et al. |
| 6,708,129 B1 | 3/2004 | Pasadyn et al. |
| 6,769,280 B2 | 8/2004 | Cao et al. |
| 6,801,822 B1 * | 10/2004 | Fujiwara et al. ............. 700/108 |
| 6,829,559 B2 | 12/2004 | Bultman et al. |
| 6,891,627 B1 | 5/2005 | Levy et al. |
| 6,968,250 B2 | 11/2005 | Reade et al. |
| 7,032,816 B2 | 4/2006 | Markham et al. |
| 7,035,877 B2 | 4/2006 | Markham et al. |
| 7,092,777 B2 | 8/2006 | Reade et al. |
| 7,124,059 B2 | 10/2006 | Wetzer et al. |
| 7,124,101 B1 | 10/2006 | Mikurak |
| 7,162,318 B1 | 1/2007 | Brearley et al. |
| 7,197,469 B2 | 3/2007 | Hegde et al. |
| 7,266,476 B2 | 9/2007 | Coburn et al. |
| 7,357,298 B2 | 4/2008 | Pokorny et al. |
| 7,380,213 B2 | 5/2008 | Pokorny et al. |
| 7,401,728 B2 | 7/2008 | Markham et al. |
| 2002/0082899 A1 | 6/2002 | Aley |
| 2002/0087440 A1 | 7/2002 | Blair et al. |
| 2002/0113125 A1 | 8/2002 | Schuessler et al. |
| 2002/0155628 A1 | 10/2002 | Bulaga et al. |
| 2002/0177959 A1 | 11/2002 | Williams et al. |
| 2002/0178069 A1 | 11/2002 | Walker et al. |
| 2002/0186007 A1 | 12/2002 | Cao et al. |
| 2003/0046180 A1 | 3/2003 | Chiu et al. |
| 2003/0150909 A1 | 8/2003 | Markham et al. |
| 2004/0134504 A1 | 7/2004 | Lane |
| 2005/0125531 A1 | 6/2005 | Singer et al. |

FOREIGN PATENT DOCUMENTS

| | | |
|---|---|---|
| EP | 0606626 A1 | 7/1994 |
| EP | 0652539 A1 | 5/1995 |
| EP | 0875365 A2 | 5/1997 |
| EP | 1065620 A2 | 1/2001 |
| WO | 9942939 A1 | 8/1999 |
| WO | 0020939 A1 | 4/2000 |
| WO | 0180146 A1 | 10/2001 |
| WO | 0193036 A1 | 12/2001 |
| WO | 0248955 A2 | 6/2002 |

OTHER PUBLICATIONS

Hughes, "Designing the Financial Data Warehouse," Intelligent Enterprise, www.intelligententerprise.com/021115/518warehouse1_1.shtml, Nov. 15, 2002, 4 pages, U.S.A.

Chapman et al., "CRISP-DM 1.0: Step-by-Step Data Mining Guide," the CRISP-DM Consortium, Aug. 2000, 78 pages, U.S.A.

McFarlane, "Auto-ID Based Control," White Paper, Auto-ID Centre, Institute for Manufacturing, University of Cambridge, Feb. 1, 2002, 19 pages, Cambridge, UK.

Wong, "Integration of Auto-ID Tagging System with Holonic Manufacturing Systems," White Paper, Auto-ID Centre, Institute for Manufacturing, University of Cambridge, Sep. 1, 2001, 52 pages, Cambridge, UK.

Ashayeri et al, "Computer Integrated Manufacturing in the Chemical Industry," Production & Inventory Management Journal, vol. 37, No. 1, 10 pages, First Quarter 1996, U.S.A.

Yeager, "Mead's, ERP System Integrates 'Best of Breed' Software." PIMA'North American Papermaker, vol. 82, No. 4, 4 pages, Apr. 2000, U.S.A.

"Taratec Develops New Solution to Help Life Sciences Industry Comply with FDA Regulation," LIMSource, http://www.limsource.com/whatnew/indnews/1to201.html, 2 pages, Jan. 16, 2001, U.S.A.

Babcock, "The Ask Master: An XML Technology Makes Retrieving Web Data Much Easier," Interactive Week, Sep. 24, 2001, p. 48, U.S.A.

Tacker et al., "A Fuzzy Logic/Neural System Approach to Signal Processing in Large Scale Decision Systems," 1989 IEEE Conference on Systems, Man, and Cybernetics, vol. III, pp. 1094-1097, Nov. 14, 1989, U.S.A.

Hillman, "Integrating Neural Nets and Expert Systems," AI Expert, Jun. 1990, pp. 54-59, U.S.A.

Simon, "The Engineering of Distributed Control Systems," http://www.plcopen.org/leading_persons/rene_simon.htm, 2 pages, accessed on Feb. 14, 2003, U.S.A.

Bonadio et al., "For Remote Stations, Fieldbus + PLC + Radio = Economical Network," InTech, Feb. 1, 1999, pp. 46-49, U.S.A.

Reilly, "Buyers to Suppliers: Manage My Inventory," Purchasing, vol. 129, No. 1, Jul. 13, 2000, 5 pages, U.S.A.

Weiss et al., "Predictive Data Mining: A Practical Guide," Morgan Kaufmann Publishers, 1998, pp. 203-205, U.S.A.

Wieser, "Integration of Process Control Systems and Laboratory Information Systems Into the Logistic Chain," Automatisierungstechnische Praxis, vol. 39, No. 2, Feb. 1997, pp. 26-28.

Ruegsegger et al., Feed Forward Control For Reduced Run-to-Run Variation in Microelectronics Manufacturing, IEEE Transactions on semiconductor manufacturing, vol. 12, No. 4, pp. 493-502, Nov. 1999.

Office Action mailed from the USPTO for U.S. Appl. No. 10/306,883, Mar. 18, 2009, 16 pgs.

Final Office Action for U.S. Appl. No. 10/306,883; Mailed on Apr. 8, 2010; 16 pgs.

* cited by examiner

QUALITY MANAGEMENT AND INTELLIGENT MANUFACTURING WITH LABELS AND SMART TAGS IN EVENT-BASED PRODUCT MANUFACTURING

CROSS-REFERENCE TO RELATED APPLICATIONS

This application is a divisional of prior application Ser. No. 10/306,868, filed Nov. 27, 2002, which claims the benefit of U.S. Provisional Application No. 60/344,747, filed Dec. 28, 2001, both of which applications are hereby incorporated herein by reference in their entirety for all purposes.

TECHNICAL FIELD

The present invention relates to the field of product manufacturing. In particular, this invention relates to quality management and intelligent manufacturing with labels and smart tags in event-based product manufacturing.

BACKGROUND

In manufacturing, the realized capacity of a machine or production facility may be substantially less than the theoretically maximum capacity for any number of reasons, including machine stoppage or delay caused by quality problems, machine failure, inadequate manpower, unavailable raw materials, and the like. Many attempts have been made to improve statistical process control of machines and plants to improve quality, and other efforts have been made to optimize machine maintenance, raw materials purchasing, inventory management and so forth to generally increase productivity.

Previous efforts have failed to adequately document and analyze the many factors that may be associated with machine delay or other productivity problems. Further, a manufacturing information system does not yet appear to have been developed which can directly provide accounting data for financial reports based on data obtained directly from a manufacturing site pertaining to process events and associated productivity parameters.

Thus, there is a need to provide an improved manufacturing information system for tracking and analyzing causes of delay and waste in manufacturing. There is also a need to integrate the improved manufacturing information system with financial reporting means to allow accountants, management, and others to readily obtain financial information regarding one or more machines or plants.

Further, in the production of goods from raw materials and intermediate components, it is an ongoing challenge to ensure that proper raw materials are used, and to track the effect of the raw materials on the productivity of a machine. Improved systems are needed for handling and tracking raw materials to improve the productivity of a process. For example, using present systems, it is often possible for an incorrect raw material to be loaded into a process, and that process may continue to operate for hours, yielding product that does not comply with specifications, sometimes resulting in enormous waste. There is a need for improved automated systems to prevent such waste and validate raw materials used in a process.

For these reasons, an event-based manufacturing information system is desired to address one or more of these and other disadvantages.

SUMMARY

The invention is operable in an intelligent manufacturing system including a process for converting raw materials to a product, a process control system including one or more sensors capable of generating an alarm in response to an event that results in one of waste, machine delay, or decrease product quality, a data logger associated with the process control system for obtaining event parameters associated with the event, a database on a server for recording event parameters obtained by the data logger, and a reporting system cooperatively associated with the database for reporting productivity parameters regarding the process derived at least in part from the event parameters.

Briefly, a system stores, during a process, data associated with a material. The system includes a control system for collecting, during a first process, event data relating to a material. The event data includes an event code and a value pertaining to an attribute or physical property of the material affected by the event. The system also includes a memory device for storing the collected event data as a data record. An identifier within the memory device is associated with the data record. The data record is accessible via its associated identifier so that the collected event data in the memory device is obtainable during a second process occurring subsequent to the first process. The second process is adapted to be modified responsive to the event data.

In one aspect, a method stores data associated with a material. The method includes collecting, during a first process, event data relating to a material. The method also includes storing the collected event data as a data record. The event data includes information indicating the location within the material where a quality defect may occur. An identifier is associated with the data record. The data record is accessible via its associated identifier so that the collected event data is obtainable during a second process occurring subsequent to the first process. The second process is adapted to be modified responsive to the event data to reduce the impact on the process of a quality defect in the material.

In another aspect, one or more computer-readable media have computer-executable components including a control module and a database module. The control module collects, during a first process, event data relating to a material. The database module stores the event data collected by the control module as a data record. An identifier within the database module is associated with the data record. The data record is accessible via its associated identifier so that the collected event data in the database module is obtainable during a second process occurring subsequent to the first process.

In yet another aspect, a method collects, stores, and reports machine productivity, waste, and delay information on an event basis in a manufacturing system. The method includes monitoring an event via a process sensor. The method also includes detecting an event trigger in response to the monitoring. The method also includes obtaining data in response to the detecting. The method also includes a process variable from a control system, a measure of the waste, delay, or quality loss associated with the event, and operator input. The method also includes automatically validating the obtained data. The method also includes formatting and recording the validated data. The method also includes generating a report based on the recorded data.

In still another aspect, a method in an event-based manufacturing system includes receiving a vendor identifier from a manufacturer. The method also includes receiving an order for a material from the manufacturer, producing the material, and creating a batch code for the produced material. The method also includes measuring a material property of the produced material and storing the measured material property as material property data in a material property database for access by the manufacturer. The method also includes applying a label including an identifier to the produced material. The identifier includes the vendor identifier and the created batch code. The method also includes shipping the produced material and its applied label to the manufacturer. The method also includes producing a product using the produced material as a raw material in a process having a control system configured to record waste and delay events as event data in an event database comprising event records. The method also includes correlating event data to the material property data in the material property database.

In another aspect, one or more computer-readable media store a data structure representing an identifier for a material in an event-based manufacturing system. The data structure includes a first field storing a vendor code representing a vendor of the material. The data structure also includes a second field storing a batch code assigned by the vendor representing a batch of the material.

In still another aspect, in an event-based manufacturing system, one or more computer-readable media for use in conjunction with a second process occurring after a first process, store a data structure representing event data for a material. The data structure includes one or more fields storing data describing characteristics of the material and one or more codes describing the nature of an event. The data structure is populated during the first process and is accessible during the second process.

In yet another aspect, a method captures and stores material history in an event-based manufacturing system. The method includes implementing a common database format among a plurality of vendors. The method also includes receiving data in the common database format from each of the plurality of vendors. The data represents event data collected for a material during a process. The method also includes storing the received data in a database for access during a subsequent process. The second process is adapted to be automatically modified responsive the received data.

In another aspect, a method automates tracking of positions of components used in a process and correlates portions of a component with production problems. The method includes embedding a plurality of identification devices in a material. The method also includes monitoring the plurality of identification devices as the material passes through a component to obtain material position data indicating a position of the material with respect to the component. The method also includes storing the material position data in a database including or operatively associated with event-based data for the process. The method also includes correlating the stored material position data with a quality control issue to identify corrective action.

In still another aspect, an improved inventory management system in an event-based manufacturing system includes monitoring at least one identification device associated with an inventory item from a first process. The system also includes determining a physical location of the inventory item in response to the monitoring to use the inventory item in a second process. The system also includes associating the physical location of the inventory item with event-based data from the manufacture of the inventory item pertaining to the quality of the inventory item.

In yet another aspect, in a distributed control system for event-based manufacturing, a method tracks and records actions of specific operators of a process performed by a machine. The system includes reading, from a plurality of scanning devices, an identification device identifying an operator. The system also includes verifying an identity of the operator. The system also includes tracking a time and place of the operator relative to the process via the reading and verifying.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
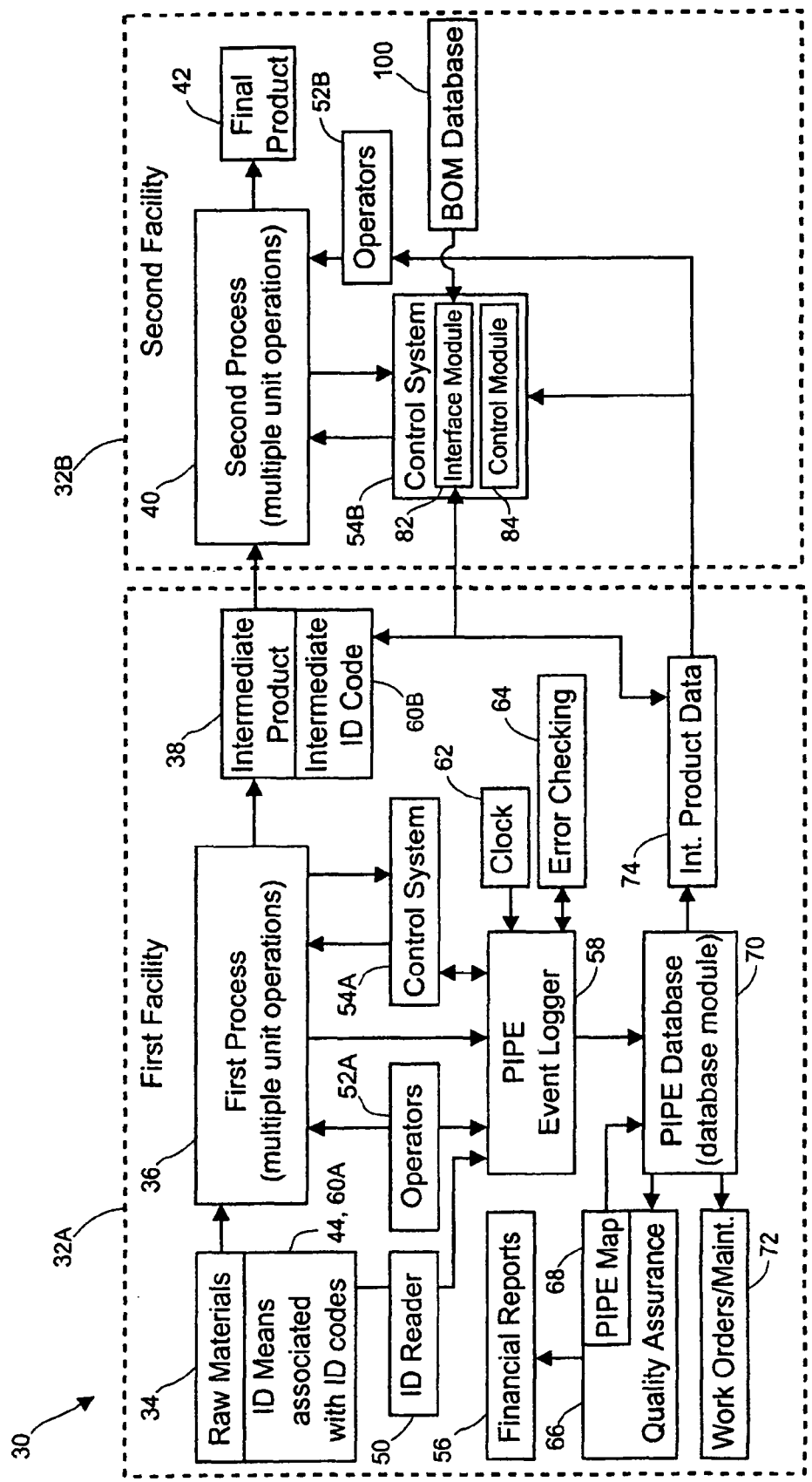
FIG. 1 is an exemplary block diagram illustrating a manufacturing process for a product that includes a first process producing an intermediate product from a raw material and a second process producing a final product from the intermediate product.

An intelligent manufacturing system for tracking production information from one or more manufacturing facilities has been developed. The system is known as PIPE (Process Information Per Event). PIPE collects, stores, and reports production information such as converting machine productivity, waste, and delay information on an event basis. In this system, machine data from sensors and other control means are continually monitored for events related to productivity and/or product quality, such as product waste, machine down time, machine slow downs, product maintenance, machine failure, etc. Customized rules may be established to specify how events are classified and what types of events are to be logged (normally, all sources of delay may be logged and coupled with additional data). These events may be spaced apart in time by time steps that typically are not constant, and may be substantially randomly spaced in time, or may be characterized in that the standard deviation of the time step between successive events is large relative to the mean, such that the ratio of the standard deviation to the mean time step during a week of production is about 0.2 or greater, specifically about 0.5 or greater, and most specifically about 1.0 or greater. Time steps between successive events may range, for example, from a few seconds or minutes to hours or days, depending on the process.

An "event," as used herein, refers to any incident that may affect the productivity of a process or machine in use to produce a product, or that may adversely affect the quality of the product being produced. Events that adversely affect the productivity of a process or machine by increasing delay are "adverse productivity events." Productivity events that lead to waste are "waste events," while those that cause delay are "delay events." Events that adversely affect the quality of a product are "adverse quality events." As used herein, "intermediate events" may refer to incidents during a first process for the production of an intermediate product to be used as a raw material (starting material) in a second process for the production of a finished product (or another intermediate product or product component), wherein the incident in the first process may affect the productivity of the second process or adversely affect the quality of the product of the second process. Thus, an intermediate event in a first process may lead to an adverse productivity event or an adverse quality event in a second process. An adverse quality event may also refer to incidents that may adversely affect the quality of an intermediate product, such that the risk of rejection of the product by a subsequent user (including an industrial user) is increased. The PIPE system may be used to track any or all types of events, including events from multiple machines and processes wherein intermediate products from early processes or machines are used as raw materials in later processes or machines, and optionally wherein the event data for the intermediate products are used by operators or process control equipment to properly execute the subsequent processes based on the events associated with the intermediate product or, in general, with the quality and property attributes of the intermediate product as recorded at least in part with a system including PIPE.

Examples of events may include a web break, a component failure in a machine, a loss of manpower (e.g., inadequate employees present during a shift), a loss of power, a fire, machine shutdown to change a grade ("changeover") or perform routine maintenance, unacceptable quality in raw materials, market curtailment (e.g., inadequate orders or excess inventory), an experimental run, a startup, and the like.

As used herein, "production information" includes waste data, delay data, and any other data related to production. In some systems, production information is segregated from waste and delay data, even though waste and delay data are considered production information. In general, the invention is operable with any form of waste data, delay data, or other production information or event data. For example, production information includes raw material usage information. Raw material usage information includes, but is not limited to, a raw material lot number, an amount of material in a roll, a time the roll was spliced on or off, a supplier of the material, a number of products produced from the roll of material, and a date the material was produced.

PIPE event data obtained during production are stored in a database associated with descriptor information. This information may be used to generate financial reports automatically for use by an accounting department, a plant manager, financial officers, or others, or for use in an internal or public publication such as a report or web page. The PIPE information may be rolled up from multiple machines, plants, sectors, and so forth, including a corporate-wide roll-up of PIPE data, to provide roll-up productivity measures.

The data from the machine are monitored and logged by a PIPE Event Logger, which may include an event logger and a machine logger. The event logger may also serve many functions in addition to receiving and processing data, such as ensuring that the raw materials fit the specifications for the product to be made (in cooperation with a separate raw materials tracking system described hereafter), or linking operating data to the PIPE database, or ensuring that adequate explanations have been entered by operators to explain delay states that occurred on the machine. The machine logger provides an interface for operators to provide explanations about delay states or product waste, but generally does not collect data from sensors or production equipment. The event logger and the machine logger may be separate programs or be part of a single program, or functions of both may be shared or split between multiple programs and servers.

The system may be structured to support multiple converting lines in multiple plants as an enterprise information system. According to the present invention, a plant information system or enterprise information system may be adapted to allow corporate financial and purchasing systems to receive information from the PIPE system for direct use. Production reporting systems may be directly linked to multiple PIPE data streams to provide rolled-up financial information or information for a single asset. The PIPE system and its accounting module may be interfaced with or cooperatively associated with accounting software such as SAP brand software and SAP/R3, process control software such as WONDERWARE brand manufacturing and process control operator-machine interface software (Wonderware Corp., Irvine, Calif.), neural networks, expert systems, fuzzy logic systems, and many other suitable software systems. Further, the PIPE system may automatically submit work requests and purchase orders to deal with causes of delays (particularly equipment failure) as they are encountered. Further, the PIPE system may be used to mine process and quality data to identify means to improve productivity or quality.

Data from the PIPE system may also be integrated with other software systems for financial tracking, production management and planning, supply chain management, inventory control, maintenance and reliability engineering, customer relationship management (CRM), and the like. For example, PIPE data may be included in the sources of information treated by POWERFACTORE software from KPMG Consulting (McLean, Va.). With this approach, the relationship between system maintenance schedules and product quality may also be explored to optimize operations to improve financial returns.

PIPE data may also be integrated with data warehousing systems such as the SAS INTELLIGENT WAREHOUSING SOLUTION marketed by the SAS Institute, Inc. (Cary, N.C.) and the KALIDO brand computer database management programs by Kalido, Inc. (Houston, Tex.) such as the Dynamic Information Warehouse. Likewise, SAS/INTRNET brand computer software and SAS online analytical processing (OLAP) technology from the SAS Institute, Inc. may be combined with the PIPE system. Other exemplary OLAP tools include the ESSBASE DB2 OLAP software from Hyperion Solutions Corporation (Sunnyvale, Calif.) and COGNOS POWERPLAY of Cognos Incorporated (Ottawa, Canada). General principles on the combination of OLAP with data warehousing are disclosed by Surajit Chaudhuri and Umeshwar Dayal, "An Overview of Data Warehousing and OLAP Technology," ACM Sigmod Record, March 1997.

Other data warehousing and maintenance methods may be applied. By way of example, principles of data warehousing and warehousing technology are disclosed in U.S. Pat. No. 6,418,450, "Data Warehouse Programs Architecture," issued Jul. 9, 2002 to Daudenarde; U.S. Pat. No. 6,353,835, "Technique for Effectively Maintaining Materialized Views In A Data Warehouse," issued Mar. 5, 2002 to Lieuwen; U.S. Pat. No. 6,178,418, "Distributed Data Warehouse Query and Resource Management System," issued Jan. 23, 2001 to Singer; U.S. Pat. No. 6,138,121, "Network Management Event Storage and Manipulation Using Relational Database Technology in a Data Warehouse," issued Oct. 24, 2000 to Costa et al.; and U.S. Pat. No. 5,781,911, "Integrated System and Method of Data Warehousing and Delivery," issued Jul. 14, 1998 to Young et al. Historical, summarized, and consolidated data are typically present in data warehouses, which may be queried to guide decision making and the development of business plans, or to prepare summary financial reports.

In addition, the PIPE system may be combined with NET PROPLAN and other manufacturing execution systems (MES) software systems and modules in the NET COLLECTION by Network Systems International, Inc. (Greensboro, N.C.). For example, the PIPE data may be integrated with the NET SCHEDULER module and the NET EVENT TRACKER system. In addition, the PIPE system may be integrated or modified to communicate with the FOLDERS system and the FACTELLIGENCE brand software for assisting manufacturing operations by CIMNET (Robesonia, Pa.).

Enterprise Resource Planning (ERP) systems may be coupled with PIPE systems. Exemplary ERP systems include those marketed by suppliers such as SAP (Newtown Square, Pa.), JD Edwards (Denver, Colo.), Manugistics (Rockville, Md.), Siebel Systems (San Mateo, Calif.), ROI Systems (Minneapolis, Minn.) including the MANAGE 2000 brand pre-recorded computer programs, or custom built systems. An exemplary tool for integrating PIPE data and other data with ERP systems (SAP R/3 systems in particular) and generating financial reports is DATA INTEGRATOR of Business Objects Americas, Inc. (San Jose, Calif.).

Existing software and known methods may be used to determine the financial costs of waste and delays. A computer system for determining the financial cost of various production problems and process bottlenecks is disclosed by Van Der Vegt and Thompson in U.S. Pat. No. 6,144,893, issued Nov. 7, 2000, and in U.S. Pat. No. 6,128,540, issued Oct. 3, 2000, both of which are herein incorporated by reference to the extent they are non-contradictory herewith. Columns 1 to 12 in U.S. Pat. No. 6,144,893 disclose the computer method, and columns 12 to 19 therein disclose a method for generating a problem priority table for problems in the process. The determination of the cost of a process problem may be calculated based on whether the process is constrained by production limitations or whether the process is sales constrained (demand for the product is less than the maximum capacity of the machine).

Integrated systems, in which PIPE and other systems tie into purchasing and financial systems, may be used for many purposes. For example, information about a machine failure detected by PIPE may be used to automatically order a failed part with an asset management process utilizing SAP or other systems. Production tracked with PIPE may be combined with financial reporting tools, components, or modules as well. Neural network/fuzzy logic analysis of PIPE and related data, including raw material data that is linked to the PIPE system via a raw material tracking system, may be used to optimize profitability and improve process control, identify weaknesses in systems, parts, or vendor performance, and so forth. Results may be displayed on a web page to local or remote viewers (typically authorized viewers only); displayed via a client (e.g., through a window on a monitor for a Human-Machine Interface such as WONDERWARE brand manufacturing and process control operator-machine interface software); incorporated into weekly, monthly, and annual reports; used to guide daily operations; and so forth. Time series of productivity parameters, such as measures of waste or delay may be displayed graphically to show trends or ranges, in tabulated form, including means and for various periods of time, and so forth. Productivity results may be sorted and/or displayed according to sector, machine type, product classification, geographical location, technology or raw material types used in production (to examine the effect of a change in a production technology or raw material implemented at one or more plants), and the like. In generating reports, any suitable type of chart or graph may be used, and results may be put into any suitable software format.

PIPE may be adapted to provide information for key performance indicators (KPIs) expressed in terms of common performance measures, wherein a standardized definition and formula based on PIPE data is applied. For example, one KPI may be percent total waste, expressed as the ratio of the total number of products discarded to the total products made. KPIs are identified by financial departments to describe profitability, efficiency, production rates, etc., for individual machines, plants, groups of plants, product categories, and so forth. Another KPI may be system rate, which is the actual machine speed divided by target speed, commonly expressed as a percentage. Actual speed may be defined as total standard units produced divided by actual hours of operation. Waste may be calculated as total units produced minus acceptable units products, or may be expressed as a percentage, (total units−acceptable units)/total units×100%. Percent yield may be expressed as 100%−percent waste. Efficiency may be expressed as percent uptime×percent yield/100%. Percent reliability may be expressed as system rate*percent uptime*percent yield/10,000%.

Another factor that may be used to characterize the productivity of a machine is the "Rate of Operation" (R/O), defined as the number of non-rejected standard unit products produced per hour (standard unit products is the number of products divided by a sector standardized unit; for example, a standard unit of diapers could be set at 1,000, to 50,000 diapers would be 50 standard units).

Machines or processes also may be evaluated in terms of opportunity costs, which generally refer to the financial cost of waste or delay (include slow machine speed). As used herein, "Waste Opportunity Cost" is the direct cost of wasted products plus the delay cost. As used herein, the "Delay Opportunity Cost" is the direct cost of machine down time plus the cost of wasted product as a result of restarting the machine plus the cost of time that is spent disposing of wasted product. Also as used herein, the "Slow Running Opportunity Cost" is the cost of the machine running at a speed less than the ideal speed (determined on a per machine level), producing less product as a result.

To achieve standardized reporting, PIPE systems may provide information about production modes. Production modes may describe the status of a machine at any given moment, such as whether a machine is operating, down for scheduled maintenance, being used for a research run, and so forth. The production mode information from the PIPE system allows down time or delays in production to be counted appropriately by financial departments. Thus, the PIPE output may include fields or records for production mode. In one embodiment, data entered into a production mode field are automatically screened for correctness (e.g., upon entry and again upon the next start up), and errors or ambiguities are flagged for correction.

Other output parameters may be modified to comply with standard definitions required by finance or other users of the data. Thus, in one embodiment, the integrated system and its method of use include a method for adapting an online production documentation system to provide financial report data for a machine, including the steps of identifying one or more key performance indicators pertaining to the machine required for a financial report, modifying the output of the production documentation system to automatically track and generate the key performance indicators suitable for use in a financial report, receiving the key performance indicator information from the production documentation system, and incorporating the key performance indicator information directly into a financial report such as an electronic report (e.g., a web page or electronic chart). In one embodiment, the generated reports are maintained by the production documentation system for a preset time interval for future retrieval. In this manner, frequently requested reports may be delivered quickly with reduced processing overhead.

PIPE reports may be generated to report on operations on any of several levels, such as at the level of section or subsection of a machine (e.g., monthly defects, waste, or delays in a film production line caused by excessive arcing in a secondary corona treatment section of an apertured film line), at the machine level (e.g., hours of delay per month for the entire film surface treatment converting machine, or percent uptime for a lotion packaging line), for a product code (e.g., a particular type of apertured films for use in sanitary napkins), at the plant level (e.g., percent waste for a film production plant, or a general plant summary), at the sector level (e.g., average percent uptime for all film plants in a sector), or at the corporate level (potential lost sales per quarter based on total waste and delay). The leading (most frequent or most costly) types of waste or delay events may be listed by machine, by section, by plant, by sector, and so forth. Detailed daily, weekly, monthly, or annual reports by machine, plant, or sector may be generated, and may be applied to specific products or product categories. Production, waste, or delay by shift or crew may also be reported.

Applications of PIPE financial information to the general ledger and various subledgers may be achieved via Charts of Accounts and other tools, as described by Dan Hughes, "Designing the Financial Data Warehouse."

In the past, there was typically a significant delay between the acquisition of data pertaining to productivity, loss, or waste for a machine and the generation of a corresponding report for review by management or incorporation into Corporate reports. Further, such reports were generally limited in terms of what could be displayed, often being static reports rather than live, customizable reports. The scope of the present invention includes an automated reporting system adapted to provide more timely and flexible reports based on PIPE data which may be provided to management, incorporated into corporate reports or intranet pages, used to call for remedial action or other decision making processes, and the like.

In one embodiment, a method for automatically generating an alert comprising a financial report based on event data comprises:

setting alert criteria for automatic report generation of an alert, such a setting including a cost threshold for a predetermined unit of time (e.g., a shift, day, or week, or moving time frames such as the past hour, 24 hours, 3 days, week, and so forth), such as the total cost of waste and delay during the unit of time, the total cost of waste and delay from a specified subcategory of event types during the unit of time (e.g., web breaks or equipment failure), or, rather than considering costs over a unit of time, also or alternatively setting a threshold for the cost of any single event or any event of a predetermined type (e.g., generate an alert if any waste event has a cost of $2,000 or greater, or results in a lost of at least 500 units of production);

repeatedly calculating costs for events during manufacturing based on event information being recorded in a PIPE database associated with the manufacturing process, the costs being calculated for the events and periods of time specified in the alert criteria, and comparing the costs to the alert criteria to determine if the alert criteria have been met;

in response to the alert criteria being met, automatically generating an alert comprising (or directing attention to) an electronic financial report conveying information pertaining to the costs that have met the alert criteria, and issuing the alert electronically to a supervisor.

For example, the alert may comprise a message indicating that cumulative waste or delay events during a predetermined period of time have exceeded a specified threshold, and provide a chart showing the top ten categories of waste and delay events in terms of cost, or a table of events showing the nature and cost of the most expensive events or all events that contributed to the alert. The financial report may comprise interactive electronic information such as a bar graph with electronic controls (drop-down box, radio buttons, etc.) to allow the viewer to control the format and content of the displayed information (e.g., selecting the top N waster or delay events as a function of user-selectable periods of time, product categories, machine sections, shifts, and the like). The alert may be sent by e-mail, or another electronic notification means may direct the viewer to use a link to the financial report information that is provided separately from the notice. The user, who may be a supervisor or executive, may then call for remedial action to deal with possible causes of the production problems that led to issuance of the alert. In one embodiment, the method further comprises automatically indicating one or more possible remedial actions that may be taken to reduce the production problem. The indicated remedial actions may be suggested by an expert system or other means, and information on the costs associated with the remedial action may be automatically included to enable better or more rapid decision-making.

The time delay between the occurrence of an event that contributes to a cost threshold being exceeded and subsequent issuance of an alert coupled with access to electronic financial reports based on event data may be arbitrarily short. The time delay between events and reports according to the present invention may less than a day, less than eight hours, less than an hour, less than ten minutes, less than three minutes, or less than a minute. Indeed, live reports may include financial information about events that have occurred only a few seconds before generation of the live report.

The time frame for computation of cumulative costs may be a moving time frame, whose endpoint continually advances in time (e.g., a span of one week ending with the current time), or a fixed time frame, with fixed starting and end points, such as the days, weeks or months of the calendar.

Alerts comprising electronic reports may also be issued to appropriate personnel in response to other information extracted by analysis of event data in the PIPE database. An increased rate of occurrence of one type of event may, for example, be indicative of excessive wear of a machine component. Not only may an alert be sent to maintenance staff that a component is in need of replacement, but the report system may be configured to automatically compile historical event data associated with that particular component of the machine to calculate historical and recent or projected maintenance costs for that component to allow a supervisor to assess the need for improvements in machine or component design to reduce costs associated with maintenance of the component. In one embodiment, a report comprising historical cost information associated with the performance and/or maintenance of a machine component (including the entire machine itself) is generated when problems with the component's performance or maintenance appear to be causing waste and delay at a rate or level beyond a predetermined threshold. In that case, management may be alerted that unusual or unanticipated costs are being accrued and that remedial action may be needed. Again, an expert system may recommend remedial action and include information on the costs associated with the remedial action to enable better or more rapid decision-making.

A subset of the PIPE system, herein referred to as STORM (System for Tracking Online Raw Materials), may be used to provide database information about raw materials accepted by a plant for use during the production of a product. The STORM system may provide access to raw material properties, vendor information, and so forth. Productivity data obtained by the PIPE system for a product may be combined with raw material information from STORM to provide archived information about the ingredients of a product, to permit analysis of the effect of various raw material attributes on the productivity of the process or the quality of the resulting products, and so forth. Possible functions of the STORM system in the context of the present invention may include:

Tracking and reporting consumed raw material.

Linking raw material data to finished or intermediate products.

Validating raw material (e.g., shutting down the machine if an incorrect raw material is loaded).

Collecting raw material waste data.

Rejecting and tracking reject material.

Tracking partially consumed raw materials (e.g., partially used roll goods or bales).

Linking specific lots of raw material to machine waste and delay results.

Linking specific raw material events (e.g., splicing) to machine waste and delay results.

STORM may employ a separate database of raw material information that may be linked to a PIPE database and software. Raw material or pointers to such data may be integrated as a component of a PIPE database, if desired. A related system for electronically tracking material properties of raw materials and generating certificates of analysis for their use is disclosed in commonly owned U.S. patent application Ser. No. 10/253,200, "Supplier Data Management System," filed Sep. 23, 2002 by Amy H. Boyd et al., herein incorporated by reference. In this system, raw material data and certificates of correction, as well as information about product specifications, delivery and use dates and locations, etc., may all be included in the PIPE database or linked to data in the PIPE database.

In general, electronic means of receiving and processing raw material data in order to create electronic certificates of analysis may be integrated with PIPE such that the PIPE database provides access to a certificate of analysis or a link (pointer) to the certificate and its associated data (vendor, manufacture date, raw material properties, test methods used, batch number, date of receipt, etc.), such that the raw material data may be considered in subsequent analysis of delay or waste based on the PIPE database.

In one embodiment, a raw materials database (e.g., a certificate of analysis database) is used to store and merge raw material data. The data may be provided by a vendor or collected by the manufacturer or both. For converting operations with roll goods, for example, the data may be collected in three steps of the converting process: material load, material start (or splice on), and material expire (or splice off). Prior to loading a raw material onto the converting machine, material label information is transferred to the raw materials database (such as from label bar codes using bar code scanners). This includes material label information such as part number, lot number, and quantity. The converting line keeps a product counter that resets at a fixed preset. This product counter is a reference number that is transferred to the database on certain machine events. At the time a material starts to be consumed and at the time a material expires the converting machine transfers reference information such as a timestamp and product count to the database. This information gets merged with the label information.

Another source of data that may be combined with a PIPE system is a database of consumer complaints or other post-manufacturing quality indicators. Many producers of consumer products and other goods maintain one or more databases of information obtained from users of products, either from users or consumers contacting the manufacturer to register a complaint (e.g., data logged by customer service representatives, including type of complaint and lot number of the product, if available, or date and place of purchase to help identify the time period of manufacture), or from surveys of users, focus groups, test markets, responses to targeted promotions, and so forth. Such data, when associated with lot numbers or other information regarding the manufacture of the product, may be linked to the corresponding PIPE data. Establishing a link between post-manufacturing quality measures and the PIPE database may permit data analysis to be performed to identify possible relationships between operating conditions and consumer complaints or other measures of quality.

The PIPE system and other related systems disclosed herein, as well as methods of using such systems for improved productivity, financial reporting, raw materials handling, system optimization, and the like, may be applied to any manufacturing system, including continuous, batch, and semi-continuous manufacturing operations. The present invention may be adapted for a single unit operation, a single machine, a series of unit operations or machines, a group of related or unrelated machines at a single production facility (plant or mill), groups of production facilities (for all production operations or a subset thereof, such as operations of a single type or for a single product), or for corporate-wide operations for all products or a subset of products and processes. Exemplary products include cosmetics and toiletries, health care products, absorbent articles such as diapers or feminine care products, foods such as baby food or canned goods, paper and tissue products, pharmaceutical products, automobiles, electronic goods, petrochemicals, agricultural products, wood products, textiles, plastics, and the like. In one embodiment, the PIPE system, including any of the STORM system, the PipeMap utility, and the PIPE Data logger, may be adapted for products produced under regulatory guidelines such as FDA regulations, and includes audit tools needed for Good Manufacturing Practices (GMP). For example, pertinent data from the PIPE system and other sources may be archived and verified with electronic signatures. Raw materials sources and their certificates of analysis may be recorded electronically and associated with the materials produced. Information regarding the recipes, materials, process conditions, crewmembers, and other issues may be electronically recorded and associated with the archived data for future audits or reviews.

Tracking Delay and Waste

The PIPE system may be used to track delay and waste, or other productivity problems, as well as the apparent causes of those problems.

As used herein, "delay time" for a machine is any time when products are not being made during a time that was scheduled for production of a product. Even if the delay is due to circumstances outside the control of the company or plant, such as a shipment of raw materials from a vendor that has been delayed due to bad weather or that was shipped to the wrong plant due to a clerical error on the part of the vendor, the result is still delay of production.

Whenever a converting line stops, a delay record is created in the database. The record may include fields such as delay code, delay duration, timestamp, product count, and other information from the machine controller (see FIG. 10A and FIG. 10B).

In addition to delay data, waste data may also be obtained in much the same way. Whenever defective product is culled (e.g., culled in response to machine vision sensors in a converting line), a waste record is created in the database using a waste code, number of defects, timestamp, product count, and other information from the machine controller (see FIG. 10A and FIG. 10B).

In general, waste and delay information, as well as other productivity parameters, may be automatically captured on an event basis and stored in the PIPE database.

Productivity and performance of a machine, plant, or business unit may be reported using any suitable set of measures. For example, the total available hours for a reporting period (typically taken as 24 hours per day multiplied by the number of days in the reporting period) may be reported in terms of several categories, such as:

Development outages, which may include down time for special research runs;

Market-driven curtailment, when a machine is taken down deliberately because of inadequate sales or due to inventory factors;

Planned asset outages, as approved by manufacturing leadership;

Planned holiday shutdowns;

Force majeure, when an uncontrollable event precludes operation, including floods, hurricanes, disruption of energy supply, etc. Catastrophic equipment failure for reasons other than acts of nature would not normally be included under force majeure.

The total available hours, minus the sum of any hours falling into the five categories immediately above (development outages, etc.) may be taken as the scheduled hours. The delay hours are the total number of hours that the unit is precluded from operating for any reason during scheduled hours. The scheduled hours minus the delay hours is the actual hours operated.

In one embodiment, "preliminary waste data" may also be obtained and stored by the PIPE system. "Preliminary waste data," as used herein, refers to data regarding defects encountered or observed during production of an intermediate product in a first process, wherein the intermediate product is intended for use as a raw material in a second process, and wherein the defects did not cause waste in the first process but are likely to cause waste in the second process. Thus, for example, production of a roll of tissue for use as a barrier material in a diaper may lead to a PIPE table in the PIPE database describing events encountered during the production of the tissue, including machine vision or other sensor input pointing to a serious defect in product quality, such as a hole or tear in the web at a particular distance into the web from the exposed outer end of the roll (e.g., 113 yards from the end of a 200-yard-long rolled web). The problem may not have created a need for discarding the defective portion of the product, which continued to be wound until the defective region was deep within a large roll of tissue web ready for use in a diaper line. Thus, no waste or delay was incurred, but a known problem has been detected in a product quality event that was recorded in the PIPE database for the product. When the product is subsequently used, the PIPE database may again be accessed to alert the second process and its control system of a position in the roll having a defect that will need to be eliminated by culling the affected product or culling the respective portion of the web before it is incorporated into a final product. In other words, PIPE data during a first process is used for feed-forward control of a second process. The "preliminary waste" of the intermediate product thus became actual waste in the final product, but with improved control over the second process.

The PIPE data may be correlated with process information and other parameters, such as the nature of the shift or crew, material properties of raw materials, season of the year, etc., to better predict causes of waste and to better align machine operation and the "recipe" for the product being made to ensure the less waste is encountered in future production efforts.

In one embodiment, the PIPE system provides a software application to allow users to view and add comments to the event records. The tools for adding comments may provide a customizable, multi-level menu structure (e.g., machine section, sub-section, problem, root cause, action, and comment)

for user entry of machine delay reasons. In one embodiment, a neural network system continually processes event records to mine the database for information that may allow reduced waste. In another embodiment, a fuzzy logic expert system scans operator input to check for discrepancies, as well as to suggest improvements in operation to reduce waste and delay.

The PIPE system may also assist in identifying the various apparent causes of delay. For example, when delay is due to force majeure that persists for a prolonged period of time, one may recognize that the problem will persist and alter the schedule of time. In this case, one may wish to only count as delay the first time unit in which the force majeure occurred, the time unit being chosen as desired from units such as a shift of eight hours, a day, or other period of time.

The PIPE system may also account for down time due to market curtailment, wherein the machine has excess capacity due to inadequate customer orders, or because inventory of a product is sufficient to supply customer demands for a period of time without producing more product. PIPE Fields and Tables The PIPE database includes output tables and support tables with fields that specify the machine and numerous aspects of the performance of a machine or process. The output tables include information obtained from a production event, such as a delay or waste event. Fields that may be of use in an output table for delay, by way of example, may include:

Machine Reference—a field identifying the machine

Timestamp—a field giving the date and time of the event

Delay Code—a field indicating the nature of a delay, which may be related to the alarm in a programmable logic controller (PLC) that caused the machine to stop. The delay code may be linked to a particular PLC and machine section, and to a particular cause of delay, or the field may be more general and be coupled with additional fields for section and details of the delay.

Delay Trigger—a field indicating whether a delay code was caused by a manual/operator stop.

Grade Shift—a field indicating when a shift in the grade of production began (or other shifts in production parameters, such as selection of raw materials, if desired), to serve as a reference to a Grade Shift table, as illustrated below.

Operator comments—a field containing text entered by an operator. Alternatively, this may be stored in a separate table to which a link may be established based on the timestamp or other information.

Duration—the length of a delay

The output tables may be supported by support tables (lookup tables or maps) that are used to interpret information in the output tables and provide links to other information in other databases or tables. Support tables provide relatively static information to be used in conjunction with the active output tables. Support tables may be developed for delay events, waste events, quality problems, and so forth. Exemplary fields in support tables for a delay event may include:

Delay Code—a field indicating the nature of a delay, which may be related to the alarm in the PLC that caused the machine to stop.

Description—a field that contains a brief description of the Delay Code.

PLC Address—the PLC Address that relates to the Delay Code.

Section—the section of the machine in which the alarm was generated

Machine Type—a field indicating the type of machine

Alarm Source—a field indicating where the alarm originated (which PLC/processor)

The choice of how tables are constructed and linked, and which fields are used, may be the subject of many alternatives known to those skilled in the art. The specific examples shown for exemplary purposes here are not intended to limit the scope of the invention.

By way of example only, a line of an output table may include the data shown in Table 1, which indicates what machine is being used, what code describes the delay, and when the delay occurred. The table also indicates when the current grade began being produced (the Grade Shift Start time). Many other fields (not shown) may be present as well, including fields indicating what machine components were involved, which crew and shift was involved, what product was being made, which recipe file was being used, what corrective actions were taken, who made the corrective actions, what the machine speed was prior to failure or averaged during the time since the last event, whether any planned maintenance occurred, whether the down time was a scheduled down, etc. Other records may include data or provide links to data from selected sensors for parameters such as air temperature, humidity, process water pH, etc., which may be known to be relevant to runnability or quality. A field for general operator comments may also be included (not shown).

TABLE 1

Portion of an Exemplary Delay Table.

| Machine Ref. | Delay Code | Timestamp | Duration (sec.) | Grade Shift Start |
|---|---|---|---|---|
| U2 | 257 | 9/22/01 04:12:48 | 206 | 9/22/01 03:15:20 |

Further, a line of a support table serving as a delay map may include the data shown in Table 2, wherein the meaning of code 257 in the Delay Code field is given.

TABLE 2

Portion of an Exemplary Delay Map.

| Delay Code | Description | PLC Address |
|---|---|---|
| 257 | Web break at transfer to first imprinting fabric on tissue machine U2 | B44: 16/06 |

The description field may be more generic, such as "Web break at transfer to first imprinting fabric" so that it may be applicable to more than one machine. It may also be simply "Web break" if the Delay Code were accompanied with additional information in the Delay Table to specify where the break occurred.

Additional output and support tables may be used to link the information in the Delay Table to other production data. A waste table may show waste-related information, similar to that of Table 1 but using parameters pertaining to waste. A material usage table may indicate what raw materials were used and in what quantities for each period of production. A Grade Shift table is an output table that may provide basic production information for the grade being produced. For example, an exemplary Grade Shift Table associated with the Delay Table of Table 1 is shown in Table 3. The data shown indicate when the grade shift began, what the machine was, which crew of employees ran the machine, how many rolls of product were produced for shipping, how many rolls were discarded as waste, and what the product was (e.g., white facial tissue according to recipe C2). A link between Table 1 and Table 3 is possible by means of the Grade Shift Start field, which may serve as pointer in the Delay Table to additional information in the Grade Shift Table. The Grade Shift Start value may be used combination with the machine reference field to serve as a pointer if multiple machines may be considered. Thus, by looking up the entry in the Grade Shift Table having the same Grade Shift Start field as that recorded for an event in a delay table, details of production information associated with the delay may be obtained.

TABLE 3

Portion of an Exemplary Grade Shift Table.

| Grade Shift Start | Mach. Ref. | Crew # | Rolls | Waste Count | Grade |
|---|---|---|---|---|---|
| 9/22/01 03:15:20 | U2 | 3 | 3380 | 96 | White Facial C2 |

PIPE data may also provide a continuous time series of machine state information to show machine status and history before an alarm event occurs, or to allow tracking of the long-term effects of a process modification on machine efficiency and modes of operation. The machine state may be described by a Machine State record in a database, which may include labels such as startup, shutdown, thread, acceleration, full speed, etc. The state of operation may further be described by information from a statistical process control program, which may generate associated data to indicate at any point in time if the machine was operating within specifications or whether it was out of control on one or more variables. Analysis of machine state data and other measures of productivity in combination with statistical process control data may be a rich source of information about the interaction between statistical quality control practices and machine productivity.

Similar fields may be used to describe other events such as waste, slow downs, process control excursions, quality problems, remedial actions to correct a delay, or other events. For example, an incident of waste on a machine (e.g., the culling of one or more products) may be described by a waste code may be associated with a description field, a PLC address, a section code, a delay trigger field, a machine type field, and an alarm source.

If desired, PIPE data may be stored on a server at each plant and be periodically "rolled up" to the corporate PIPE database. Support tables or maps may be kept identical across a sector or across the corporation or other unit. Thus, the support tables or a subset of the support tables may be maintained at the corporate level and provided to individual plants to ensure uniformity. The plants may then ensure that the output of their PIPE systems is adapted to comply with the applicable support tables.

Combining Human and Machine Input

To fully document the reasons for delay and optionally the corrective actions taken, the PIPE system allows human input to supplement machine-generated data for any event. Human-machine interfaces are often used for the entry of such data. Human input may be required to explain what the event was or to identify planned corrective action. Human input may also be required to validate a possible error state detected by a control system, or to select one of several automatic responses to a delay problem.

Human input is subject to many forms of error. For example, a shutdown may be caused by a web break that normally takes 5 minutes to correct, after which time an operator may elect to initiate routine machine maintenance for several hours. The source of the several-hour delay, when queried by the PIPE system, may be entered simply as "web break," leading to a greatly inflated apparent cost of web breaks in the financial reporting for the shift, day, or other period of time in which the web break occurred. More accurate financial reporting may be done by ensuring that the machine delay is properly identified, such as ascribing five minutes of the delay to a web break and the remaining delay time to routine maintenance.

For example, if a tissue machine stops due to a web break, which normally causes a delay of several minutes, an operator may choose to prolong the down time for other scheduled maintenance that might require an hour. If the act of maintenance is not properly recorded, the hour of delay may be falsely credited to a web break. After a predetermined period of time or after start-up, the PIPE system may then alert the operator that the down time may have been incorrectly attributed to a web break, and query if it was prolonged for other reasons, which may then be recorded. Seemingly erroneous entries may also result in e-mail or other alerts directed to a supervisor for review and corrective action or further verification, if needed. Additional operator or management input optionally may be required before the machine is allowed to start again to ensure that proper documentation is provided To validate human input in this manner, an expert system may be used. The expert system may include a simple table of rules and responses to deal with common problems, or may be a more sophisticated fuzzy logic expert system optionally coupled with a neural network that learns over time how the process should perform and what conditions are anomalies.

Though fuzzy logic and neural networks may be powerful tools in data mining a PIPE database, it is to be understood that any known statistical or mathematical technique may be applied to determine correlations, find optimum process conditions, predict instabilities or runnability problems, and the like. Such methods include statistical analysis such as regression or time-series analysis, signal processing techniques such as autocorrelation analysis, etc.

The expert system may be an intelligent agent to automatically check data integrity as it is recorded in the database, adapted to tag the record for human intervention if the data was suspect. If a data record violated a set of particular rules or was determined to be a statistical anomaly, the agent may flag the record and send e-mail or other communications to appropriate people for intervention. If the record was found to be in error, it may be manually corrected; if the record was correct, a tag may be marked in the database to signal to the agent that it had been checked and verified for accuracy.

The agent may be intelligent in two aspects. First, human experts may impart their learning to the agent through a fuzzy-rule-based inference system. There are many types of errors in a machine process log that humans may quickly and easily detect upon inspection. For example, a machine that made product during a particular day may report an average machine speed of zero due to a recording error. A person reviewing this record may easily spot this inconsistency. A list of known errors and inconsistencies would be compiled into fuzzy if-then rules, and the agent may automatically navigate a large amount of data and check the data using the expert-based rules. Second, the agent may use a neural network to learn patterns in the data. Deviations from learned patterns may be flagged as anomalies. The neural network may be trained with historical data and may be re-trained after a given time period to be updated with the most current process information.

Integration of Data for Multiple Systems

PIPE data from multiple machines or plants may be integrated and summarized in a common display or report. Database results from multiple sources may also be sorted or searched in any way desired, such as sorting waste data by geographical region and machine type, or searching for plants of a certain kind having waste delays in the upper quartile.

When PIPE is applied to multiple machines or plants for financial reporting of a plant, sector, or other business unit, there may be a need to obtain useful information from a variety of control systems or hardware and software systems. One useful method for establishing communication and common standards between multiple machines and control systems is the use of maps that identify the relationship between parameters required by PIPE and the data structures employed by the diverse systems communicating with PIPE. Map definitions (e.g., support tables) may be established by a central supervisor and then downloaded to the respective business units or plants, to ensure that the data transmitted from the machines at the plants is in the proper fields and format.

Feed-forward Control Systems

When a raw material for use in a process was produced under a PIPE system of the present invention, electronic data in time series form about production defects may be available that may be of value for a process control system. For example, during production of a roll of cover material used in feminine care products, a PIPE system may record that defects were observed at two positions in the roll (e.g., at 210 meters and 318 meters within a roll of material having a total length of 500 meters). The defects may have been associated with a web break and represent the location of splices, or they may have been holes or color defects that did not result in machine delay but were detected as quality problems that may or should result in waste during subsequent manufacturing. The information about the nature of the defects and their location in the roll is sent to the machine that subsequently processes the roll as a raw material. A feed forward control system then allows the machine to anticipate the problem areas in the roll as they are about to be fed into the machine or any of its unit operations. The machine may, in response to the problem supplied by the PIPE system for the raw material, slow down or invoke a cull to remove potentially defective product or initiate other compensating action. Thus, waste may be predicted at an early stage and the cause may be properly identified when the material is culled. Through anticipating the problem, the impact of the defects in the raw material on runnability and productivity of the machine may be reduced (e.g., web breaks may be avoided, or other machine problems may be averted), while quality of the final product is improved.

Basic information identifying the raw materials used in production may be supplemented with detailed information from an electronic certificate of analysis or other information accessible, for example, via a license plate system, described hereafter.

In one embodiment, the feed-forward system employs information obtained from a subset of PIPE specifically engineered to track raw materials (e.g., STORM—System for Tracking Online Raw Materials). STORM enables detailed data about the production history of a material to be generated during production and stored.

In another example, in producing a roll of tissue, the STORM system may provide the quality attributes of the tissue, including a record of measured basis weight from a beta-radiation-based scanner or other means as a function of position in the roll, and perhaps a record of optically detected web defects in the roll, again as a function of position in the roll (distance from the end of the roll). The tissue may then be slitted and converted into multiple smaller rolls for use in a diaper mill, for example. Each slitted roll may have an electronic file associated with it indicating the basis weight and presence of defects as a function of roll position. When the roll is received at the mill, this information may be accessed by scanning a bar code to obtain an identifier that links to the data file. The raw material data file is accessed by process control systems for the machine. The system may then anticipate that a defect may exist at, for example, 47 meters into the roll. The machine speed may be momentarily reduced to either prevent a web break or to allow the defective portion to more easily be removed, after which full speed may be resume. If a portion of the roll has inadequate basis weight, that portion may be automatically spliced out by the machine or with the assistance of human operators, following directions electronically conveyed in response to the process control system of the present invention.

In general, STORM or PIPE data for one component (e.g., a raw material or intermediate product), generated by any of the machines used in the production of that component, may be communicated to other machines that use the component in manufacturing. The data may be used to verify quality of the incoming components, to make adjustments to the component (e.g., removing portions with quality problems), or to make adjustments to the machines using the component. In the latter case, feed forward process control technology may be applied to adjust the machine in anticipation of changes in the component. Other suitable process control strategies may be used as well.

In one embodiment, the improved system may access multiple databases pertaining to the raw material using the "license plate" described more fully hereafter, in which a "license plate" bar code or other identifier on the material permits access to multiple databases of information pertaining to the materials. In other words, the license plate may be a pointer to multiple sources of data. The databases may have a common format for easy access to and display of information in a form usable by the manufacturer.

The problem that is anticipated need not be an absolutely verified problem, such as an observed defect, but may be one that is only probable or possible based on a detected event that is known to be associated with a quality problem (i.e., a deviation in the properties of the raw material). For example, based on past experience with manufacturing a roll good on a first machine, it may have been determined through data mining or other procedures that after the first machine goes down, the portion of a web being produced that was in contact with a heated section of the first machine when the first machine went down may have a 25% probability of being thermally damaged during the down time, resulting in an increased likelihood that the raw material may fail in a subsequent manufacturing process on a second machine. The process conditions for the subsequent manufacturing process employing the raw material may be temporarily adjusted near the time when the portion of the web in question is unwound and enters the second machine, in order to decrease the probability that a web break or other failure will occur. In this manner, the likelihood of waste or delay or a quality problem can be decreased in a manufacturing process by temporarily adjusting process conditions responsive to previously obtained manufacturing information about a raw material, wherein the manufacturing information is interpreted to indicate an increased probability of a quality problem or waste or delay if normal process conditions are maintained during manufacture of a product.

Temporary adjustments to process conditions that anticipate possible manufacturing problems due to deviations in the properties of a raw material may be done when a batch or unit of the raw material is "sequentially trackable," meaning that data are available relating one or more identifiable portions of a raw material (each portion comprising substantially less than 100% of the raw material in this case, such as 10% or less, or 2% or less) to manufacturing or material property information about the one or more portions of the raw material. Sequentially trackable raw materials are typically produced in a known sequence and, in a subsequent manufacturing process, supplied in a known sequence that can be related to the sequence of manufacturing. For example, roll goods can be sequentially trackable. When roll goods are used as a raw material, they are generally used in the reverse sequence in which they were manufactured (the last portion made is the first portion used; though in some applications, the first portion made may be the first portion used). Webs in any form may be sequentially trackable, including cut stacks of web materials, festoons, and the like. Materials that are provided in a string or other fixed sequence may also be sequentially trackable (e.g., medications sealed in pouches along a continuous web of aluminum foil). Material in bales, or loose powders or liquids in tanks, or vats generally is not sequentially trackable because the material within the batch becomes mixed after production.

A batch of sequentially trackable raw material may be associated with a single identification code (e.g., a single barcode or single electronic product code from a smart tag for an entire roll of materials), but the identification code may provide access to sequential manufacturing information such as event data in a PIPE database and/or continuously monitored process data from any number of process sensors and other control devices, and the sequential information may then be associated with various portions of the raw material (e.g., identifying a basis weight deviation in a roll good at a specified location in the roll).

A bill of materials for the manufacturing of a product may specify or may be consulted to help specify what actions should be taken for an anticipated temporary deviation in the properties of a raw material. Some deviations of the properties may still permit production of the product within the targeted specifications for that product, while other deviations may require culling of the products affected by the deviation in the properties of the raw material, or may require rejecting the affected portion of the raw material so that it does not enter the machine.

The above-mentioned feed-forward system or system of machine-to-machine communication regarding raw materials and their use in products need not apply to components produced from a single manufacturer, but may also apply to any raw material used by a manufacturer, wherein data generated by vendors of the raw materials are obtained and stored for use in manufacturing systems according to the present invention.

Accessing the data may require a connection across a network involving vendor computers. Alternatively, the vendor may electronically supply data to a common manufacturer database that may later be accessed through the license plate system.

In another embodiment, probabilistic or "fuzzy" information may be used for improved feed-forward control. The probabilistic information may be obtained by correlations of past machine performance or product quality as a function of PIPE data or raw material data for a component used in a process. The correlations may indicate that the risk of a delay or quality problem may be greater unless machine conditions are modified, or may indicate mixed risks and opportunities that may be weighed for the greatest expected economic return. For example, in the production of a diaper, correlations of past quality results could indicate that a statistically significant increase in consumer complaints about adhesive failure occurred 35% of the time when, even though all product specifications were met, when a batch of hot melt adhesive having a molecular weight slightly below target was used, suggesting that an increased amount of adhesive may need to be used to secure a component, but at a higher cost. However, the PIPE data may also show that increasing the application level of adhesive historically results in a 10% increase in down time due to adhesive nozzle plugging, and may indicate that machine runnability improved on the average when the low molecular weight adhesive was used. These factors may be associated with their expected costs and optimized run conditions may be suggested or automatically implemented, optionally subject to human supervision. In general, the information used for feed-forward control need not be data directly describing quality problems or other waste and delay information pertaining to components of a process, but may be information inferred from past PIPE and other data, such as probabilistic predictions obtained by correlations or neural network mining of the data to suggest opportunities to be obtained (increased machine speed, for example) or possible problems to be avoided or probabilities of various costs and problems to be weighed in optimizing process conditions as the associated materials enter the system.

Data stored in process information databases such as PIPE enable the determination of non-obvious cause and effect relationships between manufacturing events. While many events are related in a trivial manner (e.g., a raw material splice will cause some products to be discarded), there exits a real possibility that seemingly non-related events are correlated. The more non-obvious a correlation, the less likely it will be discovered by a machine operator or process engineer. This is especially true for events that are separated by some temporal distance (i.e., lag). Data mining techniques applied to the process information databases provide an excellent method of uncovering non-obvious yet highly correlated events to suggest process modifications or raw materials strategies that offer a probability of improved performance. In addition to finding these cause and effect relationships, process information data mining also provides information than may be used for process troubleshooting. Exemplary methods for data mining are given in *Predictive Data Mining: A Practical Guide* by Sholom M. Weiss and Nitin Indurkhya (San Francisco: Morgan Kaufmann Publishers, 1997), ISBN 1-55860-403-0. Data mining may be done according to CRISP-DM standards in "CRISP-DM 1.0: Step-by-step Data Mining Guide" by P. Chapman et al. Exemplary software tools for data mining include EDM (Enterprise Data-Miner) and DMSK (Data-Miner Software Kit), both available from Data-Miner Pty Ltd (Five Dock, Australia). Any known data visualization or pattern detection tool may also be applied, such as the OMNIVIZ software system of OmniViz, Inc. (Maynard, Mass.).

Electronic "License Plate" Embodiments

In one embodiment, the PIPE system is adapted for use with a materials tracking system analogous to the use of license plates for automobiles, where a single code (the license plate ID) may be used to uniquely identify an object such as an automobile and its owner, or, in the present invention, a raw material lot. Just as a license plate on an automobile may be used to identify its owner and thus to access information from multiple databases pertaining to the owner, so may an electronic license plate uniquely identify a batch or lot of a raw material and thereby allow access to one or more databases of information pertaining to the raw material. The data accessible by means of the electronic license plate (e.g., upon scanning a bar code including the electronic license plate identifier) may include the PIPE data associated with the manufacturing process in which the raw material was used.

In past procedures for handling raw materials in the production of an article, a label with one or more bar codes is typically applied to a container or to the material itself to provide information about the source and properties of the material. Those using the material in manufacturing scan the bar code to extract information. Multiple scans are often needed to extract information from multiple bar codes on a label, such as bar codes for manufacturer item number, vendor lot number, and quantity. The information provided by the labels to the manufacturer is limited and may be inefficient to use.

In the improved method for handling and tracking raw materials, according to the present invention, the "license plate" concept permits integration of data from multiple vendors or, more generally, from the sources of multiple materials used in a product. Instead of bar codes providing a small amount of data that must be scanned multiple times, a "license plate" code or other identifier on the material permits access to multiple databases of information pertaining to the materials. In other words, the electronic license plate may be a pointer to multiple sources of data. The databases may have a common format for easy access to and display of information in a form usable by the manufacturer.

In another analogy, the "license plate" code of the new method is to a conventional bar code as a hypertext link on a web page is to conventional printed text. The "electronic license plate" code may provide access to all the information of a conventional bar code, but additionally may provide for rapid electronic access to vendor databases or other databases giving detailed information about the material. Such information may include electronic certificates of analysis, such as those generated by the Supplier Data Management System (see commonly-owned U.S. patent application Ser. No. 10/253,200, "Supplier Data Management System," filed Sep. 23, 2001, previously incorporated herein by reference), and the associated tables of material properties and quality statistics. Such information may further include information about quality control during manufacturing (e.g., data from a process control system or other quality parameters and time-series of raw data), the materials used in producing the material, operating parameters (target and actual), etc. Thus, for each pallet, roll good, raw material source, or intermediate product from the beginning to the end of production, there would be quality attributes, production history, and other information that may be tracked and linked to manufacturing events and final product quality.

The license plate code may be provided in an optically scannable bar code or other optically scannable marks such as compressed symbology marks that may be read by a charge-coupled-device (CCD) video camera or other optical scanning means. For example, the "QR Code" (Quick Response Two-Dimensional Code) of Toyota Central R&D Laboratories, Inc. (Nagakute, Japan) may be used. Another form of a compressed symbology system is the DATAMATRIX of RVSI Acuity CiMatrix (Canton, Mass.). Related scanning equipment includes the DMx AutoID fixed position scanner, the MXi hand-held scanner, and the Hawkeye 30 hand-held scanner, all available from RVSI Acuity CiMatrix. The compressed symbology mark may be printed directly on an exposed surface of a product or on the core of a roll good, a pallet or wrap, and so forth, or may be printed on an adhesive label that is affixed to the raw material or associated packaging. The marking need not be visible to the human eye, but may comprise an ink that fluoresces in ultraviolet (UV) light, for example, or the marking may be covered with a coating that still permits scanning of the underlying marking.

The identification code may be conveyed by other electronic means such as radio signals (including ultra-wide band signals), and readable electronic storage devices such as smart cards, electronic chips, or magnetic storage media. In one embodiment, a package or shipment of a raw material is labeled with smart tags that may emit a radio signal carrying an electronic code which may either directly convey information about the raw materials, or provide an identifying code, which may be used to retrieve information about the raw materials in a database. The code on the smart tag may be read by a scanner, which may be a portable device that is brought near to the smart tag to obtain a reading, or the reader may be a stationary device, which reads the smart tags as they are brought to the reader. An electronic product code comprising the license plate code may be read by the scanner with a readable range typically on the order of a few feet, though broader or narrower ranges are possible.

RFID smart tag technology is known and understood by those skilled in the art, and a detailed explanation thereof is not necessary for purposes of describing the method and system according to the present invention. Generally, conductive or passive smart tags consist of a semiconductor, a coiled, etched, or stamped antennae, a capacitor, and a substrate on which the components are mounted or embedded. A protective covering is typically used to encapsulate and seal the substrate. Inductive or passive smart tags have been introduced by Motorola under the name "BiStatix". A detailed description of the BiStatix device may be found in U.S. Pat. No. 6,259,367 B1. Another commercial source of suitable smart tags is Alien Technology Corporation of Morgan Hill, Calif., under the technology name FSA (Fluidic Self-Assembly). With the FSA process, tiny semi-conductor devices are assembled into rolls of flexible plastic. The resulting "smart" substrate may be attached or embedded in a variety of surfaces. The smart tag technology under development at the Auto-ID Center at Massachusetts Institute of Technology (Cambridge, Mass.) may also be used within the scope of the present invention. Further information on smart tags and related technology is disclosed in U.S. Pat. No. 6,451,154, "RFID Manufacturing Concepts," issued Sep. 17, 2002 to Grabau et al.; U.S. Pat. No. 6,354,493, "System and Method for Finding a Specific RFID Tagged Article Located in a Plurality of RFID Tagged Articles," issued Mar. 12, 2002 to Mon; PCT publication WO 02/48955, published Jun. 20, 2002; U.S. Pat. No. 6,362,738, "Reader for Use in a Radio Frequency Identification System and Method," issued Mar. 26, 2002 to Vega; D. McFarlane, "Auto-ID Based Control," White Paper for the Auto-ID Centre Institute for Manufacturing, University of Cambridge, Cambridge, United Kingdom, Feb. 1, 2002; and Chien Yaw Wong, "Integration of Auto-ID Tagging System with Holonic Manufacturing Systems," White Paper for the Auto-ID Centre Institute for Manufacturing, University of Cambridge, Cambridge, United Kingdom, September 2001.

Other RFID technologies believed to be of value for the present invention include the I*CODE chips and readers of Philips Semiconductor (Eindhoven, The Netherlands); the RFID tags of Sokymat (Lausanne, Switzerland); and the RFID technology of Texas Instruments (Dallas, Tex.) including their TI*RFID systems.

Gemplus (Gemenos, France) provides smart tags (sometimes called "smart labels") and smart cards employing RFID technology, which may be used as smart tags. They also market interfaces, antennas, scanners and software that may be adapted for use with smart tags.

With RFID or other smart tag technology, a vendor may associate a unique ID code with a batch of raw materials, and enter physical property data into a database in which the data is associated with the ID code. When the raw material shipment is received, an RFID scanner may automatically scan the RFID chip and retrieve the associated information from the database, verify that usable raw material has been received at the correct facility, provide quality information to be associated with the PIPE database, and so forth.

It is to be understood that many other technologies are potential substitutes for the RFID embodiments disclosed herein. For example, RFID readers could be replaced with optical scanners, image analysis devices, arrays of chemical detection devices, and the like to allow other technologies for reading identification means to be applied.

A related technology within the scope of the present invention is Surface Acoustic Wave (SAW) technology. For example, InfoRay (Cambridge, Mass.) markets a passive smart tag that is said to achieve long ranges (up to 30 meters) using a Surface Acoustic Wave (SAW) device on a chip coupled with an antenna. The SAW device converts a radio signal to an acoustic wave, modulates it with an ID code, then transforms it to another radio signal that is emitted by the smart tag and read by a scanner. The ID code of the smart tag is extracted from the radio signal. RFSAW, Inc. (Dallas, Tex.) also provides minute Surface Acoustic Wave (SAW) RFID devices that may be used within the scope of the present invention.

Ultra-wide band (UWB) technology is related, in that it permits wireless communication between objects using low-power electromagnetic transmissions. However, receivers and transmitters generally are both active but use very low power, typically less than that of radio frequency noise, relying on intermittent pulses which cover a broad band of frequencies rather than transmissions of a particular frequency. UWB technology may provide much higher spatial capacity (information transmission per unit area) than other wireless standards such as BLUETOOTH brand computer communication services or Institute of Electronics and Electrical Engineering (IEEE) 802.11a or 802.11b.

The license plate system may be integrated with the STORM system within PIPE. The system may be structured to support multiple converting lines in multiple plants as an enterprise information system.

In one example, when a shipment is received at a warehouse, a worker or electronic device scans the license plate code and then a worker observes a computer screen. The screen displays what the material is, who the supplier is, when it was shipped, etc., and optionally may display a certificate of analysis showing its suitability for use in the intended process. The scanned identifier provides access to one or more additional databases that may be accessed immediately by the operator, as needed, or later as part of an audit. For example, operators using the material may access manufacturing history information or product quality information to troubleshoot the use of the material. Information may be archived as part of a GMP system.

In one embodiment, to effectively implement the license plate system, the vendors or others whose data will be accessed provide the data in a common format according to the parameters that are needed by the manufacturer. Thus, particular data fields and their units may be specified to establish a common format, as well as other format aspects of the database.

Accessing the data may require a connection across a network involving vendor computers. Alternatively, the vendor may electronically supply data to a common manufacturer database that may later be accessed through the license plate system.

In one embodiment, the electronic license plate for a raw material is scanned and used to access a database providing links to tables in other databases containing information about the raw material. As the raw material is used in a manufacturing process, a new entry in a database is created (or a former data record is supplemented) to contain a link to PIPE data for the manufacturing process, or to contain a copy of all or part of the PIPE data itself. Then, long after the raw material has been used, subsequent users may retrieve information about the raw material and the performance of the manufacturing process in which it was used. This linkage of PIPE data with raw material data via a raw material license plate may allow analysis of the manufacturing data to be done to correlate raw material properties with productivity. For example, data mining with a neural network or any other known data mining method may be used after the fact to determine relationships between raw material properties or sources of origin and productivity on machines or in processes using the raw material. It may be found, for example, a polyolefin having a molecular weight falling within the lower end of the acceptable range, per current specifications, results in 10% more down time in a meltblown operation than similar materials having a higher molecular weight, also in the acceptable range. Such data mining efforts may then lead to a revised raw material specification to improve material properties.

In another embodiment, the raw material property data provided by a vendor are combined (either by copying of data or providing links to the data) with PIPE data for production of an intermediate product, and then made available for feedforward process control of a second process for manufacture of a final product.

In practice, the license plate ID number may include two parts, a vendor code assigned by the manufacturer to the vendor, and an additional batch code created by the vendor to identify the batch of raw material (e.g., a roll of material, a barrel of fluid, a bale, or other unit). The batch code may be further subdivided. For example, the vendor code may include a predetermined number of bits, such as 16 bits. The batch code may include another predetermined number or variable number of bits, such as 12, 16, 24, or 32. A 24-bit batch code and a 16-bit vendor code may be combined into a single 40-bit license plate code provided as a bar code or other scannable code (including machine-readable Roman numerals or alpha-numeric symbols, or another script such as simplified Chinese characters or Arabic script).

By allowing the vendor to create a license plate identification, based on a manufacturer-supplied vendor code and a vendor-supplied batch code, the efficiency of handling raw materials is improved. In past practice, manufacturers often would add their own label to a batch of material for tracking its use and properties, in spite of a label having already been applied from the vendor. Two or more labels may have been scanned and processed in such operations, with data associated with each label being substantially disconnected. The license plate system of the present invention allows a single label to serve the needs of the vendor and manufacturer, providing access for the manufacturer to all needed data and providing means for tracking the performance of the raw material in subsequent manufacturing processes through connection to the PIPE database. Double labeling or the scanning of plural bar codes for a single batch of product is no longer needed, according to several embodiments of the present invention.

For intelligent manufacturing, smart tags or UWB systems may be adapted for other uses as well, such as automating the tracking of positions of machine components and correlating portions of a moving device such as a belt or wire with production problems. For example, microscopic smart tags may be embedded at various locations in a papermaking fabric, and an RFID reader in a papermaking machine could monitor which portion of the fabric is contact with a paper web as the web passes through a nip, enters a dryer, or is transferred to a Yankee cylinder, for example. Fabric position could be entered into a PIPE database when there is waste and delay, and a fuzzy logic analyzer or known statistical tools could then be applied to look for correlations between fabric position and various runnability or quality control issues. For example, PIPE data may indicate that web breaks at the creping blade are 50% more likely for tissue that had been in contact with the seam portion of a papermaking fabric, and steps may then be taken to improve the seam region of the fabric or to momentarily reduce web tension when tissue that contact a seamed region is about to reeled from the Yankee. Alternatively, tracking of the position of airfelt forming drums or other moving components in an absorbent article production facility may be combined with PIPE data to determine if particular portions of a moving system are more subject to waste and delay problems, thereby signaling the need for corrective actions such as repairs or modification of production methods.

Embedded smart tags in wires, belts, or other machine components may also be used to identify incipient failure or degraded performance due to wear or other mechanical problems. The incipient problem may be detected by the loss or failure of the smart tag, such that the inability of a scanner to read a smart tag at a particular location (e.g., the absence of the signal generated by a functioning smart tag) is the signal that a problem or other undesirable process condition has occurred or may occur soon. For example, a smart tag embedded in a drive belt may be lost when the belt becomes worn and is in need of replacement, providing a silent or passive signal that heavy wear has occurred. The degree of wear in many moving and stationary parts may be continuously monitored in this manner, and information about missing smart tags in such parts may be converted to estimates of wear or other measures of machine condition, and this data may be archived and included with or associated with process event data in the PIPE database.

Further, all operations with bar codes may be replaced with smart tags or UWB identification devices. For example, instead of using a bar code to identify a batch of raw material shipped to a production facility in a supplier data management system, a smart tag embedded in a the raw material or the raw material packaging could be automatically read when the raw material is received at the production facility, and the electronic product code generated could either uniquely identify the raw material, allowing links to online material property attributes and a certificate of analysis to be accessed, or the smart tag could be programmed to contain the needed information, such as MSDS data, an electronic certificate of analysis, purchase order information, and the like. Intermediate materials such as nonwoven webs in roll form may be forwarded to the next operation with an identifying smart tag in the core of the roll which may contain provide a unique identifying code for the roll, which in turn may be uniquely paired with a URL or database address from which information about the production of the material may be made available for feed forward control during manufacturing. For example, the location of a splice in the role may be indicated, allowing equipment to adjust speed and tension appropriately during use of the material to prevent a break when the splice is unwound and enters production.

In addition, bills of materials may be automatically checked by verifying that proper raw materials have been loaded, based on RFID scanners reading smart tags of the raw materials as they are loaded for use in production. Inventory management may also be simplified by using UWB transmitters or smart tags to track the physical location of rolls, pallets, or boxes of materials in a warehouse or other facility. With UWB devices, triangulation of an emitted signal may permit location of its source, much as in GPS systems. With RFID technology, scanners and detectors may read and record the location of numerous products in a storage facility, either by passing a scanner through the facility or by having multiple scanners in the facility that detect objects within a short distance of the scanner. In addition, smart chips or UWB devices worn or carried by the operators may be used in lieu of a paper checklist to record the completion of general housekeeping duties, machine health checks, or other actions required by Good Manufacturing Practices.

In another embodiment, smart chips or UWB devices worn or carried by operators may be used to track and record actions of specific operators. For example, a smart tag identifying an operator may be read by the various input and control devices associated with an EWMA system or other HMI (human-machine interface) systems (e.g., a distributed control system) to verify the identity of the operator. If the operator enters a restricted area or physically modifies a portion of the machine, RFID readers in certain locations of interest may track the physical presence of the operator and may associate that operator with changes made to the machine during that time and in that location, for possible subsequent troubleshooting or problem solving analysis.

By way of example, RFID tag and RFID readers, under the name Intellitag 500, may be purchased from Intermec Technologies Corporation of Everett, Wash., and Intermec's Amtech Systems Division in Albuquerque, N.M., or the RFID reader may be a Commander 320 13.56 MHz RFID reader, manufactured by Texas Instruments of Dallas, Tex. Other automatic identification and object tracking systems may be used such as RF SAW (radio frequency surface acoustic wave) technology from RF SAW, Inc. (Dallas, Tex.). PIPE and a Bill of Materials System The productivity of a machine or plant may be improved with an automated Bill of Materials (BOM) system in which "recipes" or other product specifications are used to govern machine operation and raw materials acceptance for a targeted product. These recipes, which are available in electronic form, are used to identify the correct combinations of processes and materials that are needed for various products and to automatically ensure that the incoming raw materials and machine settings are appropriate. Information in the form of bar codes or other means may be used to track the components and their attributes to ensure the recipe was properly followed. Various components may be authenticated and their interchangeability may be known and properly accounted for when replacement materials were needed. In one embodiment, the bill of materials includes at least one specification for manufacturing a product (e.g., a machine setting or a material specification).

For example, before a raw material at a plant is loaded or otherwise used in a process for the manufacture of a product, the bar code of the material may be scanned to obtain information about the raw material, including information from a license plate system which provides pointers to various databases based on a single identification code for the batch of raw material, or information from an electronic certificate of analysis. The raw material information is compared with the current product's bill of materials (recipe). A message is returned and displayed indicating whether the material is valid or invalid for its intended use. When an incorrect material has been selected for use in the process, the PIPE system (or, in more particular embodiments, the PIPE Event Logger, or, most specifically, the event logger module of the PIPE Event Logger) may shut down the machine or process until the correct material is loaded, or until an authorized and justified override is applied, wherein the reason for the override (e.g., a justification) may be required to be entered for auditing purposes (e.g., as an override code).

In one embodiment, a control system such as control system 54 in FIG. 1, in cooperative association with the PIPE Event Logger 58 and an ID reader 50 for raw materials, functions as the BOM system described herein. In such an embodiment, the control system obtains the bill of materials for a product, obtains data associated with at least one material input to the process, and compares the obtained data with the obtained bill of materials. If the obtained data exceeds a preset threshold identified in the bill of materials or is otherwise invalid, the control system invokes a setting change or other modification of the process to prevent waste and/or delay. For example, the control system may disable the machine associated with the process.

The BOM system may be integrated with the STORM system (System for Tracking Online Raw Materials) of PIPE and may support multiple manufacturing or converting lines in multiple plants as part of an enterprise information system. The BOM system may access data from electronic "license plates," or pointers to one or more databases providing information about the material in question. The BOM system may also be integrated or used in conjunction with a Supplier Data Management System that generates electronic certificates of analysis for incoming raw materials.

Each product may have a standard recipe available in electronic format from a database. The recipe specifies what raw materials are needed (e.g., material type, characteristics, etc.) and may specify how they are to be used. When a material is brought into the production line, it may be scanned or a material code may be entered, and software may then access specifications for the material and compare it to the recipe. If there is not a suitable match, the machine may be shut down until the correct raw materials are provided. Optionally, the recipe may provide directions for machine settings (speed, temperature, etc., of various devices) and may automatically invoke machine changes or, if desired, require employees to make the appropriate adjustments.

Accessing the data may require a connection across a network involving vendor computers. Alternatively, the vendor may electronically supply data to a common manufacturer database that may later be accessed through the license plate system.

When the recipe demands are met by the incoming raw materials, the machine is allowed to operate and an electronic record is created to specify the starting materials used and the production history for the run. PIPE data are continually created in the process as the machine operates. All details of raw materials and their correspondence to specified guidelines may be recorded and archived to provide an audit trail for GMP compliance.

During grade transitions, the BOM system can compare presently loaded raw materials with those of the Bill of Materials for the new grade and determine what changes are needed. The BOM system can also be adapted to improve performance of a process during grade changes. In many manufacturing systems, there are multiple raw materials that must be changed when a product grade is changed. Some raw material changes can be as simple as taking a roll of material off a spindle and replacing it with a new roll, or switching a valve to change a chemical sprayed onto a product, but in some cases there may be tanks or lengths of piping filled with a previous raw material or product of a previous raw material which may require time to be flushed out with a new raw material (or product of a new raw material) before the system can fully meet the specifications for the new grade, resulting in lost production or production of lower grade product. The BOM system can be adapted to optimize grade changes by including recipes for intermediate products that can be produced during the transition from one grade to another. For example, a transition from a red-colored pasta grade to a green-colored pasta grade may result in off-color product made during the transition from red to green, but there may be a marketable "transition" product in which color of the pasta is not important. The transition product may be produced with reduced waste during the transition. To be marketable, the transition product made during the transition may require adjustment in other ingredients or process conditions that have a faster response time (or flush time) than the raw material lines that need to be changed to achieve the targeted grade change. Thus, a transitional bill of materials can be specified to allow a marketable product to be made during a grade transition requiring a raw material change in which other raw materials may be temporarily changed during the transition to achieve a marketable intermediate product. Transitional bills of materials may be predetermined for a variety of grade transitions, or may be determined by an expert system or by optimization of costs considering the various alternative raw materials that may be acceptable for a new targeted grade and a proposed transition product, as well as considering the quantities of raw materials from a previous grade that are currently in place and the costs of changing the previous raw materials. In some cases, for example, it may be more cost effective to continue producing excess product to use up a raw material rather than to have to remove the remaining raw material to prepare for an immediate grade change.

The PIPE and BOM systems may record the transition events (e.g., end and beginning of a run), record the recipes used (e.g., initial recipe, recipe for the targeted new grade, and the transition recipe), and provide information to indicate the rationale for the transition product and the intended use (e.g., donated goods, internal corporate use, external customer, and the like). A human operator or supervisor may be prompted for approval to adapt a transition bill of materials. The prompt may include automatically generated information about the proposed quantity of intermediate product to make and the intended customer, the costs (including waste and delay) associated with making a transition product as opposed to a conventional direct grade change, and other information needed to make an informed decision regarding the grade change.

Audit Logs

The PIPE system may include means for modifying PIPE data and audit means to document information regarding edited data. For example, a utility known as PipeMap may allow an authorized user to view and modify data. Data integrity may be maintained by requiring that any modification be documented and justified with added comments, and by preventing the deletion or modification of data that would disrupt relationships between tables and databases associated with the records being modified. When PIPE is adapted to multiple plants (manufacturing facilities), an authorized user of PipeMap may access a list of plants and, for each plant, a list of available tables. The plants may be further categorized as a function of sector, business unit, division, or corporation when the system spans the operations of more than one corporate entity.

Tables that may be changed/updated may require an audit record to be created and stored in an audit table in order to meet audit requirements from external regulatory agencies (e.g., the Food and Drug Administration of the United States) or general Good Manufacturing Practices. Through the audit log, changes to data values, date/time of change, and ID and name of person performing the changes may be documented and archived. These records may be viewed in the audit log within PipeMap and may allow the user to see if records have been modified or deleted. In addition the audit logs may apply a secure, computer generated, timestamp to the changed record and audit trail.

Database triggers may handle auditing of the various tables. For example, audit triggers may be SQL Server database table procedures that execute every time there is a specific action on a table, such as a change. They may be broken into multiple elements for each table requiring an audit trail. For example, there may be Update and Delete triggers that will monitor the table to be audited for the respective action. As modifications take place, the trigger may obtain all of the record's previous information and add a transaction date and transaction type to the audit table record. User comments may also be stored and tracked.

Where the data originates may dictate where the data may be changed. The PipeMap utility may be adapted to allow map tables to only be changed at the corporate level. PipeMap may also be adapted to allow plant production tables (tables of data from a particular plant) in the PIPE database to only be changed at the plant level (by authorized plant personnel). Thus, a user viewing production data with the PipeMap utility may find certain fields are unchangeable.

The STORM system for tracking raw materials may follow different standards. Map tables (lookup tables) for material types, consumption locations, and so forth may best be editable at a sector or corporate level, while tables for materials, bill of materials (the recipe for a product), vendor locations, and so forth may be editable at a plant level.

Setpoint Management

Many products are produced with a wide range of attributes, such as tissue with different colors, print patterns, topical additives, and so forth, or diapers having different sizes. A change in the grade for a product generally requires a variety of different process settings to be adjusted according to a recipe for that grade. Setpoint changes or other setting changes may be tracked and recorded in an audit table that is part of or linked to PIPE data such that the setpoints used for any particular production run may be associated with the products for subsequent analysis or for providing documentation needed for regulatory compliance. Software systems may be used to track and record current setpoints and to update recipes when new or experimental setpoints are found to offer improvements.

Other features for managing machine settings may include the ability to maintain multiple sets of settings. One set may be tentatively deemed as the "best settings" for a grade. Current settings at any time may be captured and compared to the "best settings," and the current settings may be archived for later reference. When new settings are found to be superior or required due to changes in raw materials or equipment, they may be uploaded as the new "best settings" for that grade of product. Process control settings may be downloaded on demand, especially after PLC replacement or software updates, when settings may need to be restored.

Use of PIPE with Other Software, Including Neural Networks/Expert Systems

The PIPE system or other systems of the present invention may be integrated with any suitable Human Manufacturing Interface (HMI), supervisory control and data acquisition (SCADA) system, or distributed control system (DCS), including those provided by Wonderware Corp. (Irvine, Calif.), Rockwell International (Milwaukee, Wis.) and its subsidiary, Allen-Bradley, Honeywell (Morristown, N.J.), Horton Automation (Burnaby, British Columbia, Canada), and the like. For example, WONDERWARE brand manufacturing and process control operator-machine interface software for plant operations or the RSView32 SCADA/HMI package of Rockwell International may be integrated with PIPE and may send measured process parameters to the PIPE Event Logger, for example, as well as be adapted to display reports derived from the PIPE database for viewing by plant personnel or corporate personal via a client server. The PIPE system or other systems of the present invention may be adapted to be part of or cooperate with the integrated manufacturing system of U.S. Pat. No. 5,311,438, "Integrated Manufacturing System," issued May 10, 1994 to Sellers et al., incorporated herein by reference, or with any suitable related systems, including those of Rockwell International, Microsoft Corp., and other vendors.

The systems of the present invention may be incorporated into or linked with other suitable software systems such as electronic data interchange (EDI) systems and SAP brand software, or integrated with quality control systems and with computer-integrated manufacturing systems in general, including those described by J. Ashayeri et al. in "Computer-Integrated Manufacturing in the Chemical Industry," Production & Inventory Management Journal, vol. 37, no. 1, First Quarter 1996, pp. 52-57. The systems of the present invention may be integrated with SAP/R3 systems. Interfacing of custom software with SAP/R3 systems is described by B. Yeager in "Mead's ERP System Integrates 'Best of Breed' Software," PIMA's North American Papermaker, vol. 82, no. 4, April 2000, p. 36. For example, encapsulation of custom software, such as any PIPE or STORM component, may occur within SAP brand software using SAP brand software interface programs, called "BAPIs" (business application programming interfaces), which use Microsoft Corp.'s COM/DCOM connectors, allowing a Microsoft-based client to communicate with SAP R/3. Such connectors may be built using ACTIVEX brand technologies by Microsoft Corp. and COM/DCOM strategies. For raw materials handling, suitable certificate of analysis generation tools may also be adapted, including the Proficy Certificate of Analysis Wizard, which is an ACTIVEX brand control. Other aspects of applying a SAP brand software system for use with the present invention are disclosed by O. Wieser in "Integration of Process Control Systems and Laboratory Information Systems Into the Logistic Chain," Automatisierungstechnische Praxis, vol. 39, no. 2, February 1997, pp. 26-28.

In one embodiment, a PIPE system (including STORM) may be integrated with commercial quality control software, such as TRAQ-1 Quality Data Management System of the Gibson-Graves Company, Inc. This software (compatible with VAX brand computers and peripheral apparatus) assists in the management of quality assurance information. This system offers SPC (statistical process control) capability, as well as a range of data entry, analysis, graphics and reporting features. It provides control for raw materials, process, and finished products. There are specific modules for tracking and reporting of defective materials and returned goods, certificates of analysis, and vendor analysis. The system also provides full database query and reporting capabilities. Graphical output includes control charts, histograms, Pareto charts, cusum charts, x-y correlations, etc. DBQ (Database for Quality) brand computer software from Murphy Software may also be coupled with the systems of the present invention.

Another system that may be adapted for the present invention is the E-COMPLIANCE brand computer software system (hereafter TeC) of Taratec (Bridgewater, N.J.), as described in "Taratec Develops New Solution to Help Life Sciences Industry Comply with FDA Regulation," PR NEWSWIRE, Jan. 16, 2001. This system enables data and file management to be controlled in a secure repository that supports the requirements of 21 CFR Part 11. It allows security for all information to be maintained through Access Control Lists (ACLs), which provide the flexibility to grant access as required while protecting files against accidental modification or unauthorized access. TeC also allows users with appropriate permission to update individual files while maintaining copies of the original record and all subsequent versions. Secure audit trails capture information including date of modification, who modified the file, and why the file was changed. TeC is said to be able to integrate into most existing computer systems and is non-invasive to data sources or applications. Systems supported include laboratory instrument data collection applications, data entry applications, and electronic batch records systems as well as MICROSOFT brand Excel spreadsheets and MICROSOFT brand Word files. Accessible through a web browser, TeC stores all files, from raw data to Certificates of Analysis, in a secure, central location with a full audit trail. Building on an Oracle8i platform (Oracle Corporation), TeC provides the security and reliability of a Relational Database Management System (RDBMS) along with ease of use associated with standard file systems.

Vendor inventory management systems may be used, in which a request for more material is automatically generated as stores of the material are depleted. Related concepts are described by C. Reilly, "Buyers to Suppliers: Manage My Inventory," Purchasing, vol. 129, no. 1, Jul. 13, 2000, p. 76 c. 39.

In one embodiment, a web-based version of the PIPE system (particularly reporting features for PIPE) may incorporate XQuery, an XML query language, as described by C. Babcock, "The Ask Master: An XML Technology Makes Retrieving Web Data Much Easier," Interactive Week, Sep. 24, 2001, p. 48. An XQuery system, for example, may query a relational database such as a product specifications database, as well as electronic data provided via web pages or e-mail, incorporating data from several sources into a single XML document or web page. In another embodiment, Active Server Pages (ASP) may be used in cooperative relationship with an SQL server.

The rich and expansive body of process data obtainable with PIPE systems is well suited for analysis and data mining by a variety of techniques, including neural networks/expert systems and data analysis employing fuzzy logic. For example, PIPE may be adapted for use with the neural network/expert system described in U.S. Pat. No. 5,121,467, "Neural Network/Expert System Process Control System and Method," issued Jun. 9, 1992 to Skeirik, herein incorporated by reference, or in WO 00/20939, "Method and System for Monitoring and Controlling a Manufacturing System," published Apr. 13, 2000 by J. D. Keeler et al., the U.S. equivalent of which was filed Oct. 6, 1998, and is herein incorporated by reference. Other useful publications include the following publications: Tacker et al., "A Fuzzy Logic Neural System Approach to Signal Processing in Large Scale Decision System", 1989 IEEE Conf. on Sys. Man. & Cybernetics, pp. 1094-97; and Hillman, "Integrating Neural Nets and Expert Systems", AI Exper., June 1990, pp. 54-59. Such neural networks and expert systems may play a role in the control of the system using rules learned by the neural network and in generating rules to guide the administration of the process (e.g., optimizing the use of crews, adjusting recipes to improve product yield or machine productivity, etc.).

More particularly, neural networks and expert systems may be used to identify factors that are associated with increased delay or lower machine productivity in general. For example, a neural network may analyze PIPE data and determine that increased delay time from a particular cause of delay is associated with the use of replacement parts from one of several vendors, with an interaction between a particular crew and a particular product grade, or with certain raw material properties in association with an attempt to increase machine speed to an above average state. Identification of such factors may lead to creation of a new rule for production of the product, an alteration to the standard "recipe," to eliminate the source of delay.

Optimization Using PIPE Data

PIPE data from multiple machines and mills may be analyzed to determine factors that allow one machine or mill to have higher quality or production rates in order to suggest improvements for other operations. For example, mining of PIPE data may show that whenever Mill A uses raw material from supplier B for product C, machine breaks are unusually low. A suggestion may then be generated asking a manager in Mill D to consider testing raw material from supplier B for product C as well, giving a prediction of the expected reduction in down time. If such a trial is run, the results may be integrated with PIPE to validate or reject the hypothesis. The process of mining data to propose improvements for a given machine or for other machines may be done by a Learning Module, which may be directed by human input as to what types of problems to investigate (e.g., finding optimum process conditions for selected grades or machines, finding synergy between machine components and process conditions, etc.).

PIPE data may be incorporated in optimization routines to determine optimum scheduling of maintenance when a process problem is encountered. As with any other optimization procedure within the scope of the present invention, any known optimization strategy may be used. For example, Linear Programming (LP) may be used, as well as Mixed Integer Programming (MIP), genetic algorithms, neural networks, nonlinear programming (e.g., successive linear programming or distributed recursion) and the like.

Integration of the PIPE system with maintenance scheduling systems may allow maintenance schedules to be adjusted to reduce overall down time. For example, when a part failure occurs that has taken an average of 4 hours to repair in the past, based on past PIPE data, and a 6-hour down time is scheduled within a few days for routine maintenance, a message may be automatically generated by a module in the integrated PIPE system or mill control system to suggest that the future scheduled maintenance be initiated immediately to reduce overall down time. An operator may review the suggestion and approve it, reject it, and optionally enter instructions to increase the likelihood of similar suggestions or to suppress the suggestion in identical future cases (perhaps because the maintenance may not be done when the failed part is inoperative). The system may be programmed to search for accelerated maintenance opportunities for any delay event or only for events of certain kinds or with minimum expected down times. Scheduled maintenance events in a database may also be associated with maximum values for accelerated or postponed execution (e.g., no more than a 2-day difference from the scheduled time) and with a minimum down time for which an acceleration in the schedule could be beneficial (e.g., since six hours are needed, don't combine with an unscheduled down time of less than three hours), or with other criteria.

As used herein, a "controller" or "control system" may refer to any electronic device or system of devices and any associated software for controlling a process to operate within specified limits. Controllers may range in complexity from a simple control circuit to large, sophisticated systems such as a multi-facility distributed control system employing Fieldbus Foundation-protocol field device systems and including central and remote installations with hardwired and wireless connections to numerous devices (see, for example, R. Bonadio and R. Argolo, "For Remote Stations, Fieldbus+PLC+Radio=Economical Network," InTech Online, Feb. 1, 1999). Ethernet, Allen-Bradley and Rockwell networks are further examples of the many systems known in the art that may be used according to the present invention.

Control systems commonly employ PLCs (programmable logic controllers) to treat I/O discrete variables. The PLC central processing unit (CPU) not only allows users to execute interlocking routines but also to communicate these internal variables for monitoring or actuation purposes via, for example, EIA-232 or -485 ports. PLCs also have inputs for analog variables such as current, voltage, and temperature sensors, as well as internal processing for arithmetic calculations and proportional-integral-derivative controls. Commonly, each I/O discrete information point requires one pair of wires connecting a field device to the PLC I/O module. For analog information, a transmitter or converter is required to transform the physical variable (pressure, flow, pH, or level) to a standard signal (e.g., 4-20 mA). When there are controls in the system, it is necessary to have analog outputs to the valve actuators.

The standard IEC 1131 defines hardware and software models as well as programming languages for programmable controllers that may be employed in the present invention. If desired, a neutral file exchange format (FXF) may be used as specified by PLCopen, based on a STEP (ISO 10303) model that allows transport of PLC programs from the programming environment of one vendor to another. IEC 1131 languages are suitable not only for PLC programming, but also as basis for a Distributed Control System (cf. IEC 1499). Other Fieldbus-related approaches to exchange of data include Device Descriptive Languages and Device Data Base (HART, FF, PROFIBUS). An international standard for the exchange of product data, ISO 10303 (STEP) may also be used for integration of various data types in a control system. See, for example, "The Engineering of Distributed Control Systems" by Rene Simon.

Illustrations of Exemplary Embodiments

FIG. 1 depicts a PIPE-based manufacturing process 30 for a product 42 that requires two stages, a first process 36 in the first facility 32A to produce an intermediate product 38 from raw materials 34, and a second process 40 in the second facility 32B to produce a final product 42 from the intermediate product 38. The first facility 32A employs a PIPE system of the present invention to improve supervision of the manufacturing process. The first process 36 involves one or more unit operations controlled by one or more operators 52A and desirably operated in a cooperative relationship with an automated process control system 54A of any suitable kind. Events from the first process 36 are received and handled by a PIPE Event Logger 58, which may also timestamp the events based on clock 62 information.

The PIPE Event Logger 58 serves as a bridge between the process-related parameters (operator input, control system parameters, and other factors obtained from or pertaining to the first process 36) and the PIPE database 70. The PIPE Event Logger 58 may monitor event triggers (though a separate program may be used for monitoring as well), may send alerts to appropriate personnel or devices depending on the nature of the alert, may format and may record event data in a PIPE database 70 and/or other database, may send a signal to the control system 54A of the first process 36 indicating that a delay condition has been resolved and the process may be started up once again (e.g., sending permissive information to a control system 54A to allow start up, ramp up, or other procedures following a delay or, in some embodiments, a delay and/or waste event). The PIPE Event Logger 58 may also conduct or oversee error handling 64 or checking (data correction, for example), backup logging, and other issues. Backup logging may be especially important when a PIPE server or communication line to the PIPE server is temporarily down, for the PIPE Event Logger 58 may continue writing data to a text file (a backup log) or other file on a local computer until access to the PIPE server is restored, at which time the backup log may be transmitted to the PIPE server for entry into the PIPE database 70, preventing the loss of data that would otherwise occur.

Data entered in the PIPE database 70 regarding the intermediate product 38 may be extracted to provide intermediate product data 74 for use in the second process 40 at the second facility 32B. The intermediate product data 74 may be accessible via an intermediate product identification code 60B, which may be associated with the intermediate product 38 with identification means (not shown) such as a bar code or smart tag or other identification means. The intermediate product identification code 60B may be read by a reader (not shown), by human agents, or other means such that the code is entered into the control system 54B (specifically, the interface module 82) for the second process 40. Using the intermediate product identification code 60B, the control system 54B may access the intermediate product data 74 from the PIPE database 70 (alternatively, the intermediate product identification code 60B may be sent directly to the control system 54B for the second process 40 shortly before or as the intermediate product 38 is fed into the second process 40). The operators may also view information from the intermediate product data 74, such as the product manufacturing history, the raw materials 34 used, the bill of materials used, manufacturing events that occurred during production of the intermediate products 38, and measured material properties (not shown) which may also be linked to or entered into the PIPE database 70.

The PIPE Event Logger 58 may ensure that information pertaining to the raw materials 34 is stored and associated with the intermediate product data 74 and data associated with the final product 42. In one embodiment, the raw materials 34 are associated with smart tags, bar codes, or other identification means 44 which convey an identification code 60A that may be read by an identification reader 50 (e.g., a scanner for bar codes or an RF reader for smart tags). The read identification code 60A may be fed to the PIPE Event Logger 58 and optionally used to electronically look up information in a database (not shown) such as raw material properties, manufacturing information, electronic certificates of analysis, and the like. The identification code 60A, when archived in the PIPE database module 70, may serve as a pointer to archived raw material data, or the raw material data may be archived directly in the PIPE database 70.

The PIPE Event Logger 58 may use the read identification code 60A to verify that the raw materials 34 are suitable for the first process 36, the intermediate product 38, or the final product 42. This may be done by comparing the data associated with the raw materials 34 with a bill of materials (not shown) for, the intermediate product 38 or final product 42, or operators 52A, 52B may examine the data and verify that it is suitable for the processes 36, 40 or products 38, 42. If the raw materials 34 are not suitable, the first process 36 may be shut down until the problem is resolved, or other alarms may be activated.

Data that are entered by operators 52A or that are obtained by other means may be checked for completeness or reasonableness with an error-checking module 64. For example, error checking may involve requiring that entered numbers fall within a plausible range, or may prevent entry of text when digits are needed, or may require that a comment field be filled before the entered data may be processes. Expert system rules may also be applied to check for common mistakes or unreasonable entries. In one embodiment, error checking occurs before any data are accepted by the PIPE Event Logger 58 or are written to the PIPE database 70.

In one optional embodiment shown in FIG. 1, the data added to the PIPE Database by the PIPE Event Logger 58 are checked for reasonableness or consistency with a quality assurance module 66, and optionally corrected by the PipeMap utility 68 after review from human agents. If corrections to the data must be made, the PipeMap utility 68 may properly correct the data without damaging needed links between data in the database. The quality assurance module may send a message by e-mail or other means (not shown) to a human to request intervention with the PipeMap utility 68 to correct a possible problem. Any changes made or any responses to the request for intervention may be logged and stored in another database (not shown) for auditing purposes.

The PIPE database 70 is cooperatively associated with a financial reports system 56, such that data for a variety of financial reports are provided from the PIPE database 70. Processing of data for financial reporting may be done after quality assurance procedures to ensure that the reported data are substantially accurate. In one embodiment, the PIPE-based manufacturing system 30 provides real time productivity measures for a machine which allows the profitability and yield of the machine to be updated daily in an intranet web server or other means.

The financial reports system 56 shown in FIG. 1 may include a corporate-wide reporting system that allows remote users to track production, waste, delay, and/or profitability of a process, mill, sector, or other grouping of production operations, and to do so for any period of time or preset time interval (e.g., current rates, cumulative results for any hour, day, week, month, year, etc., week to date, month to date, year to date, etc.) and with the ability to display and print the results by product grade or class, by machine type, by process, by production site, by sector, by customer, etc. For delay and waste reporting, reports may be provided for the top several (e.g., the top 5 or top 10) most frequent or most costly (in terms of time and production) events or event categories. Waste and delay may be displayed or reported according to sections of the machine or machines of either facility 32A, 32B (e.g., for a paper machine, the forming section, the press section, the drying section, the calendering section, the coating section, the reel section, the slitting section, etc.), with reports viewable by date, by grade, or by cross-direction region of the machines in any section (e.g., by slitter position when multiple slitters are used, spaced apart in the cross-direction). Reports may be formatted as tables, spreadsheets, bar charts, scatter plots, time series lines, hi-low plots, box plots, control charts, histograms, Pareto charts (e.g., a bar chart showing percent defects as a function of defect type, in descending order), cause-and-effect charts, Ishikawa diagrams (also known as fish bone diagram), various three-dimensional plots, composite charts, interactive charts such as manually rotatable scatter plots in three or more dimensions, multimedia presentations with animation to show changes in times (e.g., Flash files), JPEG movies, DHTML or XML pages for interactivity in a web browser environment, and the like.

The PIPE database 70 also may be cooperatively associated with a work orders and maintenance module 72, which may automatically generate work orders and schedule maintenance based on events recorded in the PIPE database 70 (or directly based on events detected by the PIPE Event Logger 58). For example, an increased incidence of registration problems in a machine for assembling components of a diaper may be known to be associated with degradation of certain pieces of equipment. An expert system within the work orders and maintenance module 72 may detect the increased incidence of registration problems and deduce that maintenance of the responsible equipment is needed. The maintenance may be automatically scheduled, optionally subject to approval from an authorizer who may manually review the data or justification for the work, optionally supported by a justification report created by the work orders and maintenance module 72, which may include a bar graph showing the trend of increased registration problems. Also by way of example, a part failure entered as a PIPE event in the PIPE database 70 may be noted by the work orders and maintenance module 72 which may then automatically issue a work order for repair and create a purchase order for the needed materials. Projected cost of the work and parts may be entered into the financial reports system 56.

The intermediate product 38 from the first facility 32A is submitted to the second facility 32B as a raw material in a second process 40 to produce a final product 42. The second facility 32B is not shown as equipped with a PIPE system, though it may be. But the second facility 32B is assisted in its operation by the intermediate product data 74 supplied by the PIPE system of the first facility 32A, which provides a description of the events that occurred during production of the intermediate product 38 and optionally other process control and material property information, such that the second process 40 at the second facility 32B may be adjusted with a control system 54B adapted for feed forward control, or the process may be modified by manual control or other means responsive to the intermediate product data 74 to best utilize the intermediate product 38, particularly by anticipating desired modifications in process conditions responsive to the intermediate product data 74. Intermediate product data 74 from the PIPE system may be supplied to both operators 52B and the control system 54B of the second process of the second facility 32B for both human-guided and automatic control adjustments based on the attributes of the intermediate product 38 or the defects to be encountered during its use. Feeding PIPE information (event-based production data) obtained from the production of a raw material 34 or intermediate material 38 into the production system for a final product (or other intermediate product) is one aspect of certain embodiments of the present invention directed toward Intelligent Manufacturing.

In one embodiment, the control system 54B of the second process of the second facility 32B comprises an interface module 82 and a control module 84. The interface module 84 receives the intermediate identification code 60B associated with the intermediate product 38 via a second ID reader (not shown) or manual entry of the intermediate identification code 60B. The control module 84 may then access the intermediate product data 74 associated with the received intermediate identification code 60B from the PIPE database 70 or other repository of the intermediate product information. The interface module 84 may compare the intermediate product data 74 with the specifications of a bill of materials from a bill of materials (BOM) database 100 to verify that the intermediate product is suitable for the second process 40 and for the requirements of the final product 42.

The control module 84 direct process control for implementing process modifications in response to the obtained data, making the manufacturing system 30 a feed-forward manufacturing system, regardless of the hardware and software details of the local process control systems 54A, 54B. Process modification for the second process may include adjusting at least one setting of a machine in the second facility 32B or at least one other ingredient in the recipe provided by the bill of materials database 100. For example, if the intermediate product is a tissue web with lower than normal strength, the amount of an adhesive reinforcement applied to the tissue in the second process may be increased to still provide an acceptable final product 42. The bill of materials may provide acceptable ranges and provide instructions to compensate for certain ranges of material properties of the intermediate product or other raw materials, such as increasing an applied adhesive when a material property is lower than the target value but still acceptable. The final product 42 may then be associated with a final product identification code (not shown) which points to archived data from the first and second processes 36, 40. The final product 42 may later serve as a raw material for yet another process, or may be used commercially in any way.

Figure 2:
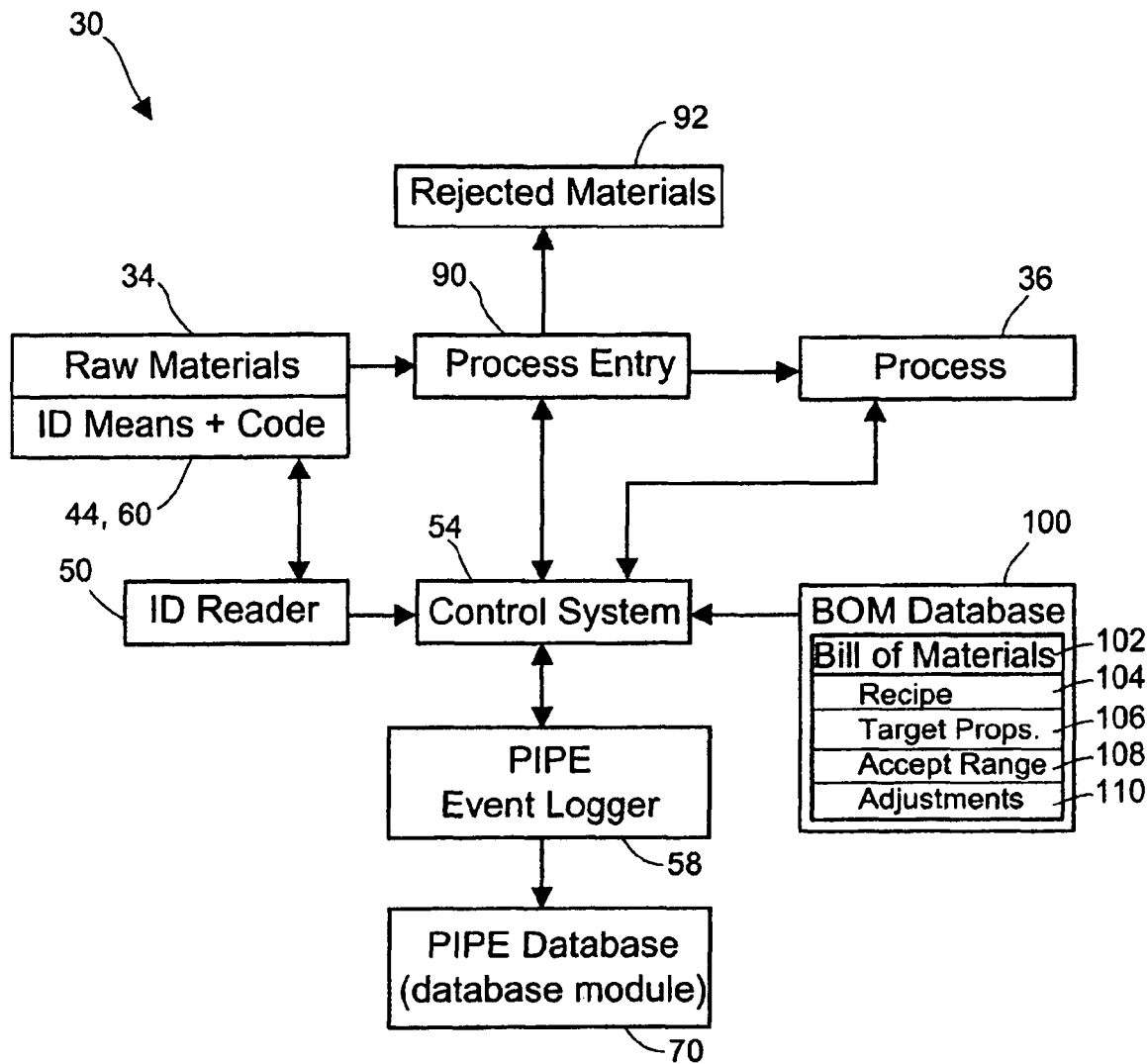
FIG. 2 is an exemplary block diagram illustrating a manufacturing process for a product with a bill of materials explicitly shown.

FIG. 2 depicts another embodiment of a manufacturing process 30 similar to the PIPE-based system for the first facility 32A in FIG. 1, but with the bill of materials 102 in a bill of materials database 100 being explicitly shown. The bill of materials 102 is accessed by the control system 54 and is compared with the properties of incoming raw materials 34, identified by accessing a raw material database (not shown) or by obtaining information from other sources that is associated with the identification code 60 for the raw materials 34 obtained when an identification reader 50 reads identification means 44 on or associated with the raw materials 34. The bill of materials 102 may contain numerous fields associated with the process 36 and its intended product (not shown). Such fields may specify the recipe (approved materials, process conditions, amounts of materials to use, etc.) for the process 36, as well as the target properties 106 desired for one or more raw materials 34 that may have varying material properties. In addition to specific values of target properties 106, acceptable ranges of properties may be specified in the acceptable range field 108 for one or more materials. Since properties away from the target values but still within the acceptable range may sometimes require adjustments in process conditions or in the amount or selection of other materials, an adjustments field or fields 110 may provide instructions for desired process modifications to compensate for off-target properties of the raw materials 34 or for other temporary limitations in the process 36.

Before the raw materials 34 are accepted into the process 36, the raw materials must be accepted in a process entry stage 90 in which the control system 54 directs acceptance or rejection of the raw materials 34 according to compliance of the raw materials with the bill of materials 102. If the raw materials 34 are inappropriate or have material properties outside the acceptable range, the raw materials 34 may be rejected as rejected materials 92, which may then be recycled, returned to the vendor, warehoused for later processing, or the like. Raw materials 34 accepted for process entry 90 may then be used in the process 36, which is controlled by the control system 54, and which may provide event data and other information sent to the PIPE Event Logger 58 for storage in the PIPE database 70.

Figure 3:
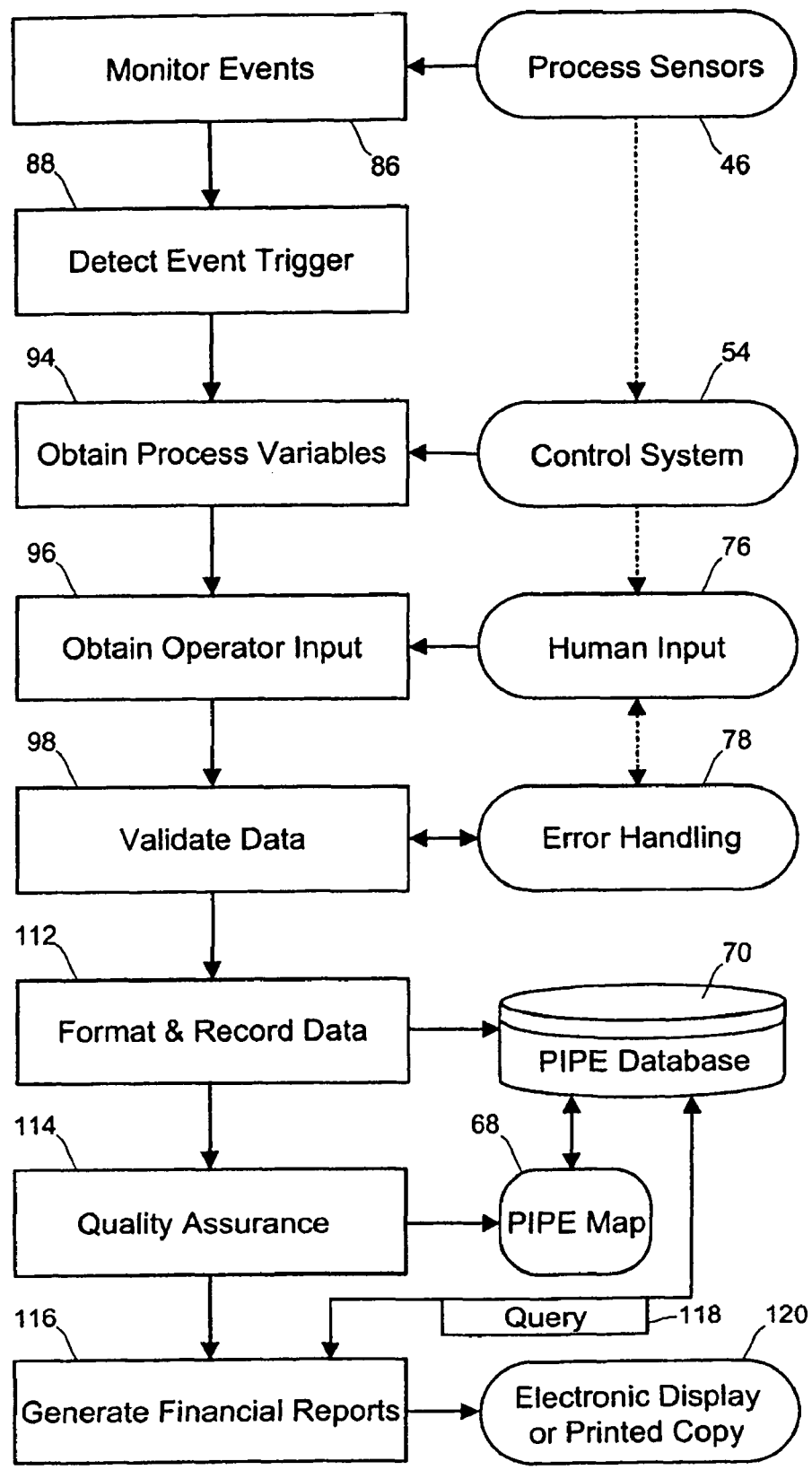
FIG. 3 is an exemplary flow chart showing several of the steps involved in a system according to the invention used for financial reporting.

FIG. 3 depicts a flowchart showing several of the steps involved in a PIPE system 31 that is used for financial reporting. Process sensors 46 associated with a process (not shown) provide data that allow the system to monitor events 86 related to productivity. When a trigger event is detected 88 (an event requiring event data to be entered in the PIPE database 70), process variables are obtained 94 from the control system 54, along with obtaining operator input 96, specifically human input 76 from an operator who is queried by a display screen (not shown) to provide information needed in the PIPE database 70. Before (or, alternatively, after or as) the data are entered, the data are checked for completeness or obvious errors (incorrect ranges entered, etc.) with an error-handling step 78, which may be substantially limited to basic checks on values entered. The data may then be properly formatted and recorded in the PIPE database 70. Before financial reporting is executed, the database should be checked for quality with a data quality assurance module 114 which may be substantially more comprehensive than the error handling step 78 in that entries from multiple periods of time and multiple fields of data may be evaluated for consistency and reasonableness. Operator input in particular may need to be validated due to the possibility of human error (e.g., wrong error code, failure to enter a description of the cause of delay, etc.). For example, if an operator indicated that the machine delay was due to a plugged glue applicator but machine records show that a work order was issued and filled to replace defective roller bearings during the delay, verification of the cause of the delay may be needed and requested, with correction of possible errors handled with the PipeMap utility 68. In general, a data quality assurance module 114 may assess the validity of the data and prompt the operator or others to correct obvious problems or confirm questionable entries. Though this is shown as occurring after data are recorded in the PIPE database 70, this operation may be applied to at least some of the data prior to entry in the PIPE database 70.

Validated data may then be processed to yield reports, and in particular, may be used to generate financial reports 116. While this is shown as occurring after data validation 98 has occurred, choosing to generate reports on non-validated data is not outside the scope of the present invention, though for best results the data should be validated to at least some degree to ensure that spurious waste and delay entries do not distort results. To the extent that human and machine errors may be substantially eliminated, the need for a quality assurance module 114 may be correspondingly reduced.

Report generation may proceed by the use of a query 118 from a client to extract selected data from the PIPE database 70 and other databases (not shown) that are accessible via links using pointers in the PIPE database 70, e.g., a pointer to a STORM database (not shown) to provide raw material information, for showing a table comparing diaper waste for similar diapers made with mechanical fasteners from two different vendors, or a pointer may point to a Bill of Materials database (not shown) to permit sorting of delay by details of the recipes used to produce certain products, for comparing the waste when either of two different airlaid materials are used in the production of an absorbent medical article, or a pointer to a Shift database indicating which crew was used during the production of a product, so that a report may compare the waste and delay results experienced with two or more crews). Queried results may be treated with filters (not shown) in a variety of ways to segregate data, such as segregating delay results according to the slitter position in which the web component of a medical article was slit prior to being used as a raw material.

PIPE data may then be incorporated into a display or hardcopy of a financial report 120, such as a table of waste and delay for multiple plants during a week or month., or most common causes of delay for a product category before and after a change in the recipe for a product. The productivity data may be entered into a financial database (not shown), where it may be rolled up for later use in, for example, an annual report.

For example, Table 4 shows a record of delay history for a material lot returned in response to a query. In one embodiment, the query returns as many delay records as exist in the database. In this example, there is only one record.

TABLE 4

Record of Delay History.

| Machine Ref. | Delay Event Duration | Delay Location (yards) | Delay Code | Machine Section | Delay Problem |
|---|---|---|---|---|---|
| Machine 1 | 29:22.0 | 913 | 481 | Bonder | Main Air Not on Fault |

In another example, Table 5 shows a record of splices for a material lot returned in response to a query. In one embodiment, the query returns as many delay records as exist in the database. In this example, there is only one record.

TABLE 5

Record of Splices.

| Machine Ref. | Roll Identifier | Splice Location (yards) | Total Length |
|---|---|---|---|
| Machine 1 | Roll 1 | 238 | 1916 |

In one embodiment, the PIPE system automatically prepares a MICROSOFT brand Excel spreadsheet with the productivity from one or more machines to be incorporated in the step of generating financial reports 116 or displayed on an electronic display 120 such as an intranet web page for management review.

Figure 4:
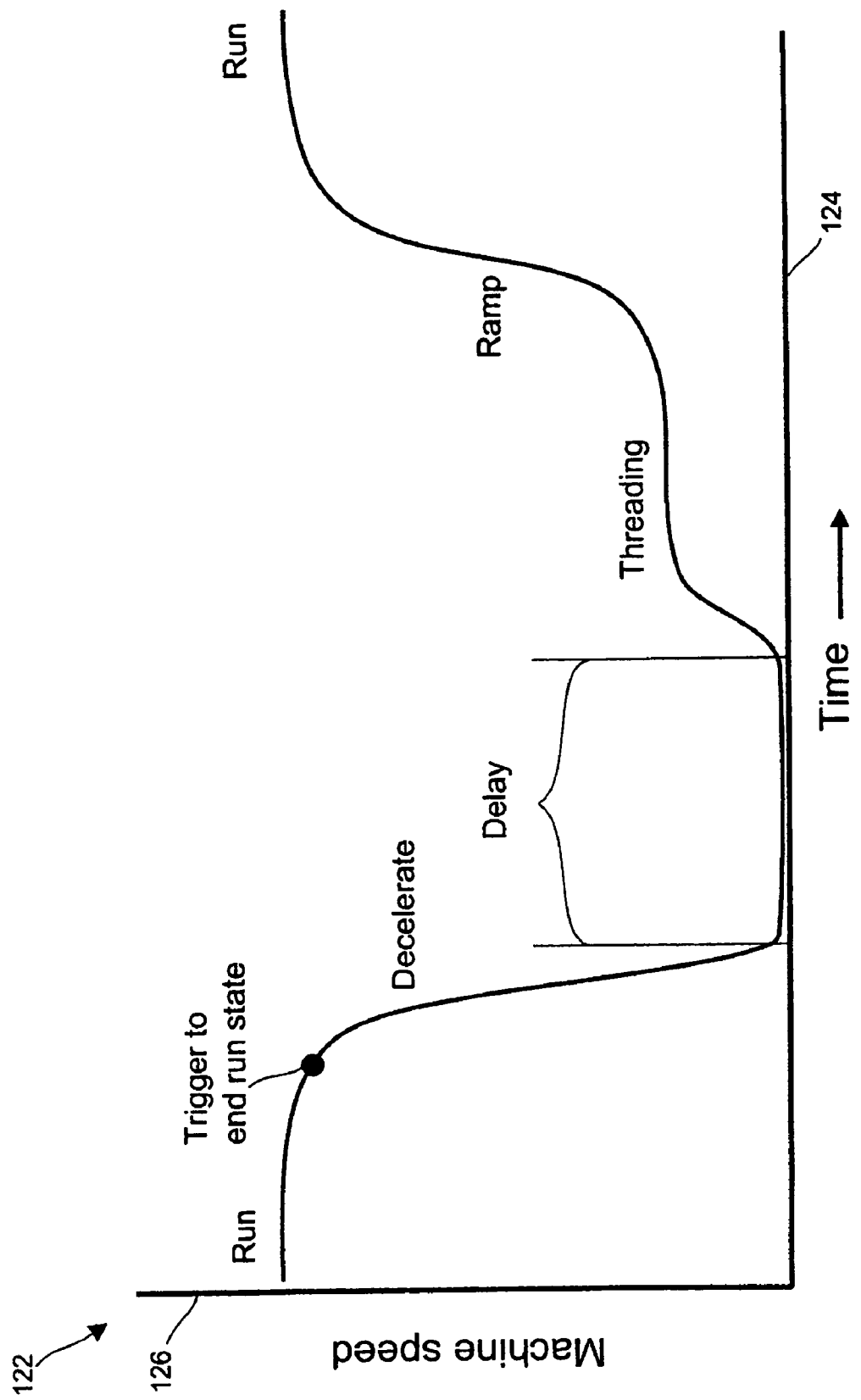
FIG. 4 is an exemplary graph illustrating one definition of delay during a series of events relating to machine productivity over time.

FIG. 4 is a hypothetical plot 122 of machine speed versus time to illustrate an exemplary definition of delay during a series of events relating to machine productivity over time. The vertical axis 126, machine speed, shows the rate of operation of a process relative to time, shown as the horizontal axis 124. Initially at nearly full speed, the machine encounters a trigger at a particular time to end the run. The trigger may be due to a machine-detected web break, an operator input due to a safety concern, a lack of suitable raw materials for processing, a machine error, or other cause. The trigger initiates a machine shut down. The machine decelerates to zero speed. In one definition, the delay time only begins when the machine is at substantially zero speed, and ends when the machine begins moving again. This is the definition used to mark delay in FIG. 4. In an alternative definition (not shown), the delay time may be defined to span the time from the trigger to end the run state (or from the time when the machine has decelerated to a predetermined speed after the trigger) until the machine begins moving again.

After the cause of the delay has been overcome, the machine is started again to resume production. Typically, for an operation with one or more webs of material, a period of low-speed operation is needed to ensure that components are properly aligned and pass through the system in the correct manner (threading). The time for threading generally needs not be counted as delay, though one may employ a definition of delay in which operating below a threshold speed is considered delay. A consistent definition of delay for reporting is generally more important than which reasonable definition is selected. After successful threading, the machine speed is ramped up to normal running conditions again.

Figure 5:
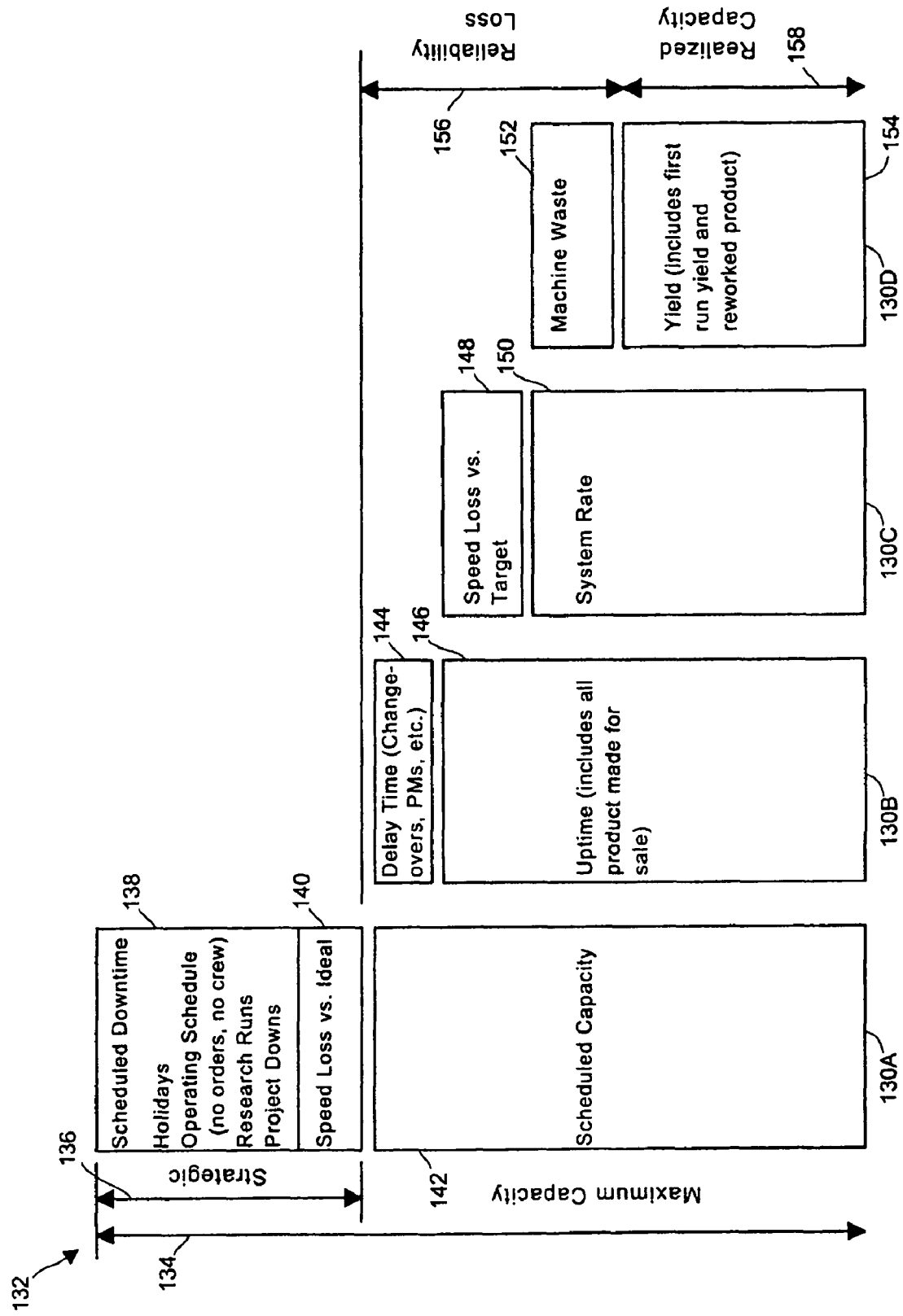
FIG. 5 is an exemplary block diagram illustrating ways in which the realized capacity (productivity or production rate) of a machine may be less than the maximum capacity.

FIG. 5 is a bar chart 132 showing how the maximum capacity 134 of a machine may be distributed. Specifically, the bar chart 132 depicts ways in which the realized capacity (productivity or production rate) of a machine may be less than the maximum capacity 134. In the first column 130A starting with the left, a strategic portion 136 of the maximum capacity 134 is deliberately allocated for modes that do not result in production, such as scheduled downtime 138 for maintenance or other purposes, including holidays, inadequate demand or manpower (market curtailment), research runs that do not result in shipped product, etc. Part of the strategic portion is due to operation at a lower than ideal speed (the "speed loss vs. ideal" 140 part of the strategic portion 136), perhaps to maintain a certain quality standard or to conserve an expensive component more likely to fail at full speed. The resulting scheduled capacity 142 is thus lower than the maximum capacity 134.

In the second column 130B from the left, delay time 144 decreases productivity. Delay time 144 may be due to changes in grades, machine problems, and so forth. The remaining portion of the time scheduled for production is the uptime 146. In the third column 130C from the left, the productivity realized during uptime 146 may be lowered by running at a speed lower than what has been targeted (the planned speed, which helps determine the scheduled capacity), causing delay due to the speed loss versus target speed 148. Thus, speed loss decreases the capacity that could have been achieved within the available uptime 146. The actual speed of the machine during uptime gives a gross production rate termed the "system rate" 150.

As illustrated in the last column 130D, the actual product yield 154 generally will be lower than may be realized at the system rate 150 due to machine waste 152 (e.g., product that must be discarded). Thus, the realized capacity 158 is less than the scheduled capacity 142 due to a reliability loss 156, as shown.

In several embodiments of the present invention, the PIPE system tracks delay, speed loss 148, machine waste 152, scheduled capacity 142, and strategic reductions 136 from maximum capacity 134, allowing regular or even essentially real-time reporting of the various sources of lost capacity, and optionally displaying the financial cost of such losses. Reports may be provided in any desired format, such as tabular, text-based, or graphical formats, and may be online reports, printed reports, and so forth.

Figure 6:
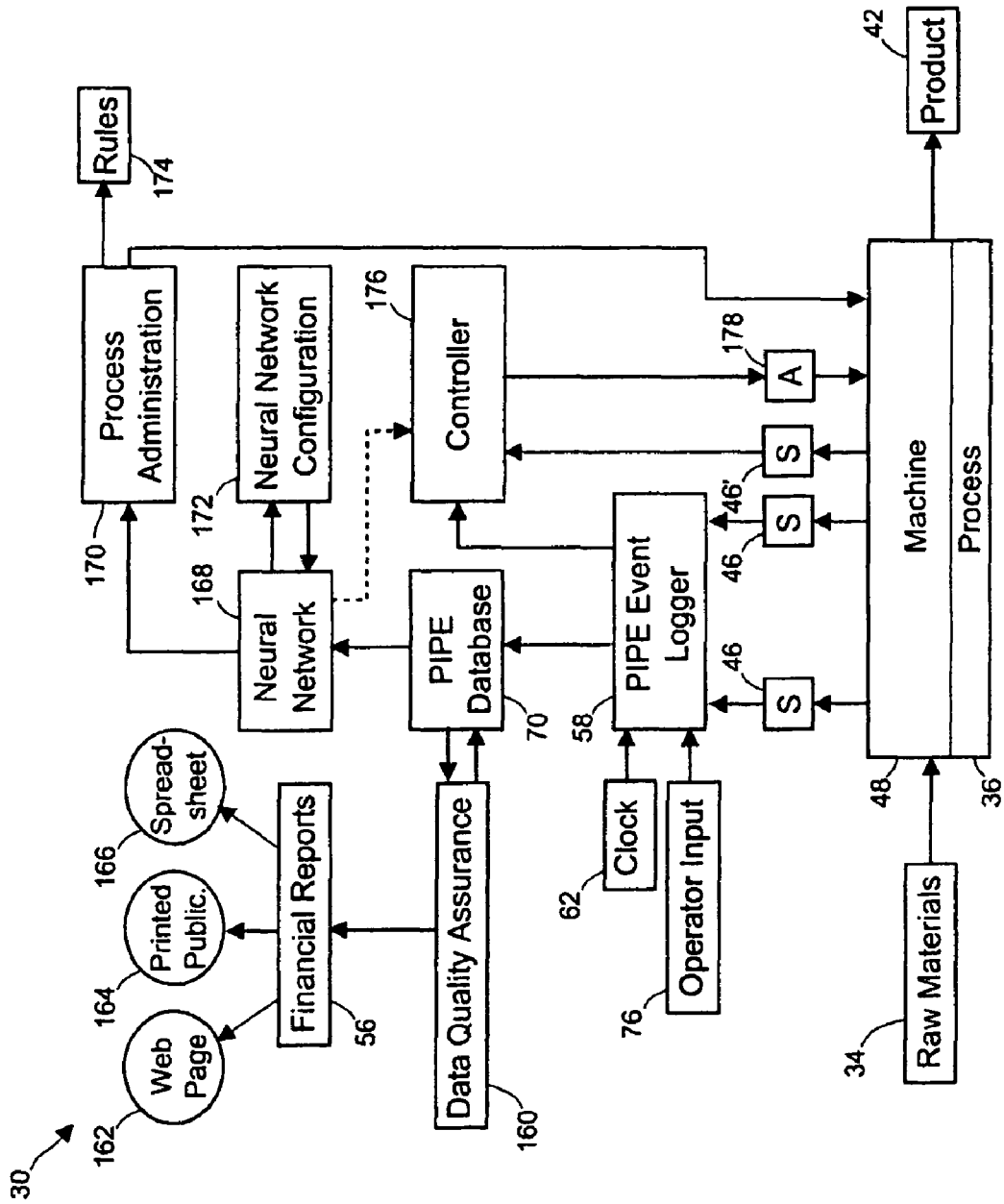
FIG. 6 is an exemplary block diagram depicting an embodiment of a commercial operation according to the invention in which raw materials are converted by a process to yield a product.

FIG. 6 depicts an embodiment of a PIPE-assisted manufacturing process 30 in which raw materials 34 are converted by a process 36 using a machine 48 to yield a product. As used herein, "machine" may refer to all equipment and unit operations used to convert raw materials 34 to a product 42, or to a subset of the equipment and unit operations needed to produce the product 42. Multiple sensors 46 (boxes labeled with "S") detect process conditions and other variables pertaining to the machine 48 and the process 36 of converting raw materials 36 to the product 42. These sensors 46 may be read by the PIPE Event Logger 58, the controller 176 of a process control system (e.g., a system governed by WONDERWARE brand manufacturing and process control operator-machine interface software, including those incorporating the FACTORYSUITE brand manufacturing and process control software of Wonderware Corp.), or both. Sensor data read by the PIPE Event Logger 58 may be forwarded to the controller 176, where well-known principles of process control are employed to control the system by any suitable means, including the use of actuators 178 (the box labeled "A") to modify one or more aspects of the process 36. The PIPE Event Logger 58 obtains process data and adds a timestamp from a clock 62 and also provides a means for operator input 76 to more fully describe an event or to specify the apparent nature and causes of the event. Operator input 76 may be received through a computer or any other suitable human-machine interface (HMI) (not shown). The acquired data from the PIPE Event Logger 58 is then forwarded to a PIPE Database 70, where it may be used for generating financial reports 56, desirably after the data have been examined for integrity using a Data Quality Assurance module 160. Problems that may be checked include apparent typographical errors, incorrect machine state codes, delay or waste values that seem inordinately large, and so forth.

The financial reports 56 generated with the corrected PIPE data may be in any suitable format, such as web page 162 on a secure Internet site or an Intranet to allow remote employees to observe productivity, waste, delay, other desired parameters, including lost profit, cost of waste and delay, performance relative to targeted Key Performance Indicators, and so forth. In one embodiment, a web page 162 continually provides real time productivity information in a format customizable by the user so that machine or plant operation may be tracked essentially in real time, or by certain units of time such as hourly, by shift, per day, weekly, monthly, and so forth. Printed publications 164 may also be prepared in any form. In another embodiment, a spreadsheet 166 such as a MICROSOFT brand Excel spreadsheet or other spreadsheet tool is prepared in a format that may directly be incorporated into a report, such as a monthly report, quarterly report, or annual report.

FIG. 6 further depicts a neural network 168 that mines data from the PIPE Database 70 to look for relationships that account for waste and delay, or for combinations of process variables or other factors associated with decreased waste and delay, in order to propose rules that may be tested for their ability to improve process productivity. For example, the neural network 168, as governed by the neural network configuration 172, may operate on historical data and identify a relationship between the winter season and periodic delay associated with inadequate inventories of raw materials 34. The findings regarding the seasonal increase in delay due to raw material problems may then be used to propose seasonal adjustments to managing raw materials, and may be used to track the root causes of the problem, such as a purchasing agent who tends to be ill more in winter months. In one embodiment, the neural network 168 may have access to employee absence information for possible correlation with certain aspects of productivity. Corrective rules may then be suggested by a process administration entity 170, either automatically or by a process administrator (e.g., a plant manager) to whom the findings of the neural network 168 have been communicated. Improved rules 174 for administering raw material purchases and inventories may then be promulgated by the process administration entity 170, in response to the neural network 168 findings. The process administration entity 170 may also change any number of factors pertaining to the system, such as crew composition, policies for grade changes, machine settings (in cooperation with operators), and so forth.

The neural network 168 (or a second neural network, not shown) may also be used to identify optimum process variables to reduce delay, and these recommended optimum variables may then be communicated to the controller 176 of the control system (or to a human operator or process administration entity 170) to improve performance and reduce waste and delay in the process 36.

The success of any changes made to the process 36 or its manner of operation may also be examined with the financial reports 56 generated in association with the PIPE Database 70. For example, before and after trends in waste or other parameters may be displayed graphically or in data tables to show the apparent impact of change made.

Figure 7:
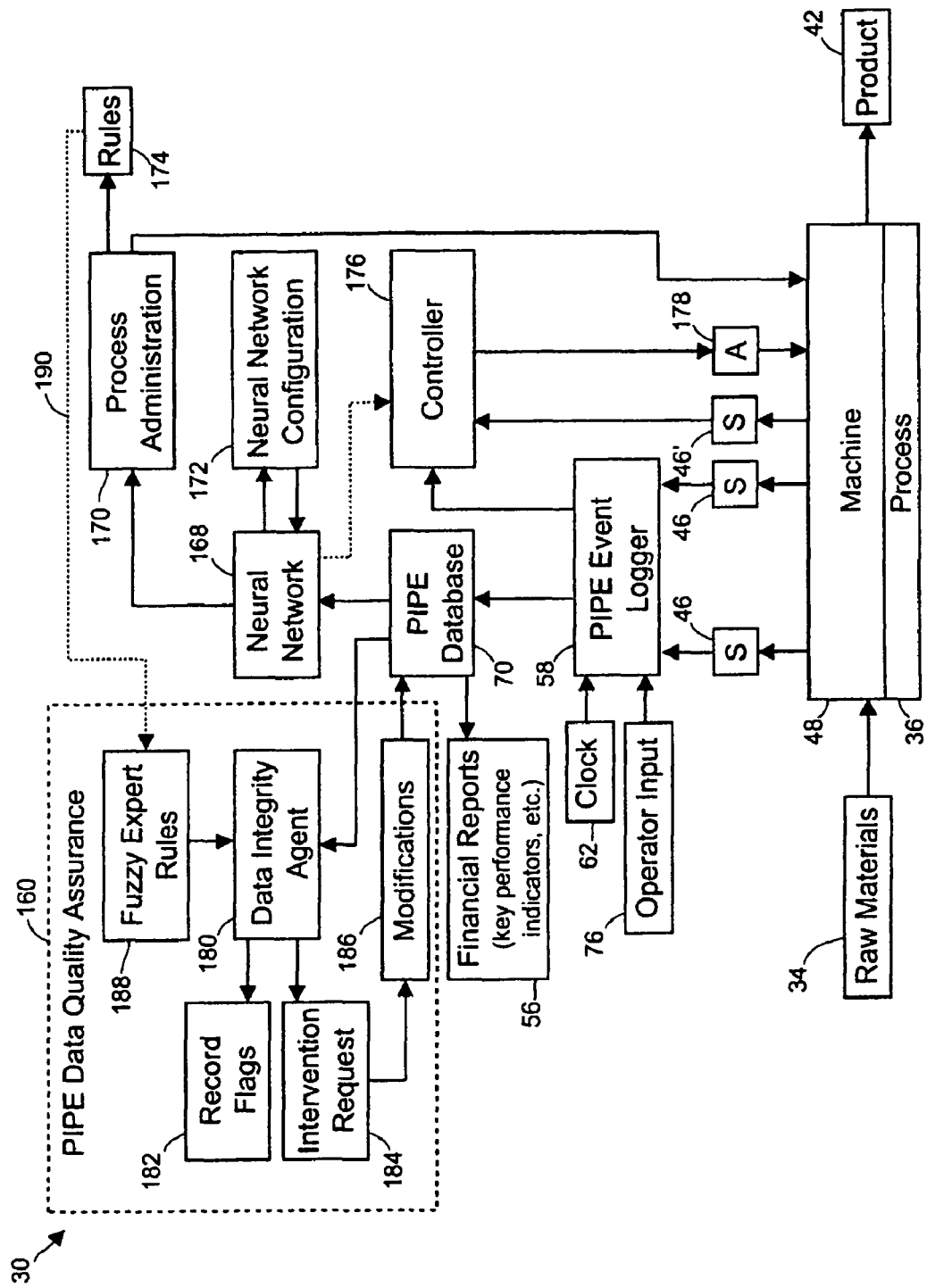
FIG. 7 is an exemplary block diagram depicting another embodiment of a commercial operation according to the invention in which raw materials are converted by a process to yield a product

FIG. 7 depicts another embodiment of PIPE-assisted manufacturing process 30 in which raw materials 34 are converted by a machine 48 in a process 36 to yield a product. The operation is similar to that of FIG. 6 except that an embodiment of the quality assurance module 160 is shown in more detail. Here the dotted box labeled "PIPE Data Quality Assurance" 160 shows that PIPE data from the PIPE database 70 are submitted to a Data Integrity Agent 180, a step that should occur before any PIPE data are incorporated into financial reports 56, or at least before the data are incorporated into permanent financial reports or other subsets of financial reports such as those made available to the public. The Data Integrity Agent 180 is an intelligent agent cooperatively associated with fuzzy expert rules 188 (or any other artificial intelligence system or system of rules governing the integrity of PIPE data). The fuzzy expert rules 188 may, in one embodiment, be continually updated or refined through the learning of the neural network 168 that mines PIPE data and, in cooperation with a process administration entity 170 (such as a human administrator or a supervisory artificial intelligence program), yields recommended rules 174 for improved operation of the process 36 to increase productivity or quality. Some of the rules, as shown with the dotted line 190 from "Rules" to "Fuzzy Expert Rules," may be used to flag anomalous or suspect data.

The Data Integrity Agent 180 examines data and looks for anomalies, discrepancies, errors, including conditions that are a specified number of standard deviations away from the expected value or outside the normal extremes for the process 36. For example, if 6 hours of down time are attributed to the need to clean a meltblowing nozzle, a flag may be raised for that entry in the PIPE database 70. The flagged condition is recorded 182, and an intervention request 184 is generated by the Data Integrity Agent 180, which may be e-mail sent to an operator or plant manager, a copy of which may be archived in an audit database (not shown). In response to the intervention request 184, modifications 186 of operator-entered data (or other data, if needed) may be made and the corrections logged and stored in the audit database (not shown). After the integrity of the data has been checked, the corrected PIPE database 70 may then be used for the generation of financial reports 56 or other reports (GMP reports, etc.). For best results, the financial reports 56 should only be generated after a check of data integrity has occurred, whether the check is done repeatedly and automatically by a Data Integrity Agent 180 or in other ways, such as by other integrity checking means in response to a request for a financial report 56.

The Data Integrity Agent 180 may also perform simple checks such as confirming that each day has 24 hours of accounted time (e.g., the total of time distributed between mutually exclusive categories such as run time, down time, unscheduled time, and so forth).

Though not shown in FIG. 7, an additional expert system or neural network may be employed to learn from the modifications that are made by human users to the PIPE data in response to the intervention request 184. Comparing flagged records 182 with the resulting modifications 186 may be used to update the rules used by the Data Integrity Agent 188 as well as the recommendations made in the intervention request 184.

Figure 8:
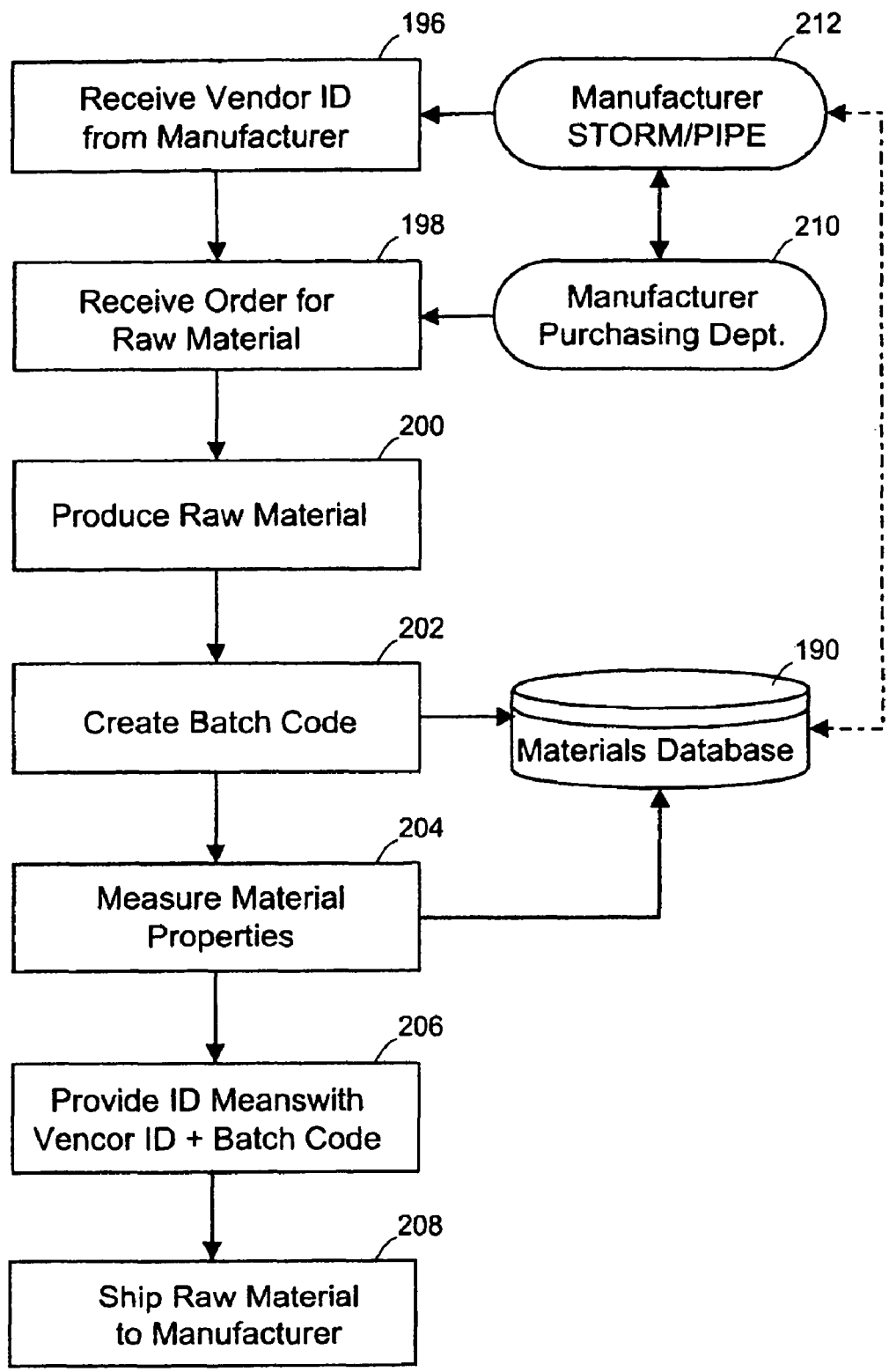
FIG. 8 is an exemplary flow chart showing steps preceding the shipment of a product to a manufacturer, in association with the manufacturer's use of a system according to the invention.

FIG. 8 is a flow chart showing steps preceding the shipment of a raw material from a vendor of the raw material to a manufacturer for use in making a product. The production of the raw material by the vendor is done in association with the manufacturer's use of a PIPE system 212. The flow chart begins with the vendor receiving a unique vendor ID 196 from the manufacturer that may form a portion of the license plate code used to track a raw material. The vendor code is supplied by the manufacturer and is entered into the manufacturer's STORM/PIPE system 212. The vendor, already having a vendor ID code, may then receive an order 198 for the raw material from the purchasing department 210 of the manufacturer. The vendor may then produce the raw material 200, and then create a batch code 202 for the raw material which may be coupled with the vendor ID code to create a unique code identifying the raw material and allowing tracking of the raw material and its material properties, which are measured 204 and entered into a materials database 190 with the license plate code (including the batch code+vendor ID code).

In a step not shown in FIG. 8, an electronic certificate of analysis may be created to allow the manufacturer upon receipt of the raw material to verify that it is within specifications and suitable for use for a particular product, using the Supplier Data Management System of commonly owned U.S. patent application Ser. No. 10/253,200, "Supplier Data Management System," filed Sep. 23, 2002 by Amy H. Boyd et al., previously incorporated by reference.

After measurement of the raw material properties 204, the raw material may be provided with identification means 206 (a bar code, smart tag, or other means) to convey the license plate code. The raw material is then shipped to the manufacturer 208, who may electronically read the identification means upon receipt to identify the raw material and gain access to the associated data in the materials database 190 to examine any raw material properties, comments, or other information pertaining to the raw material prior to using the raw material in the manufacturer of a product.

Figure 9:
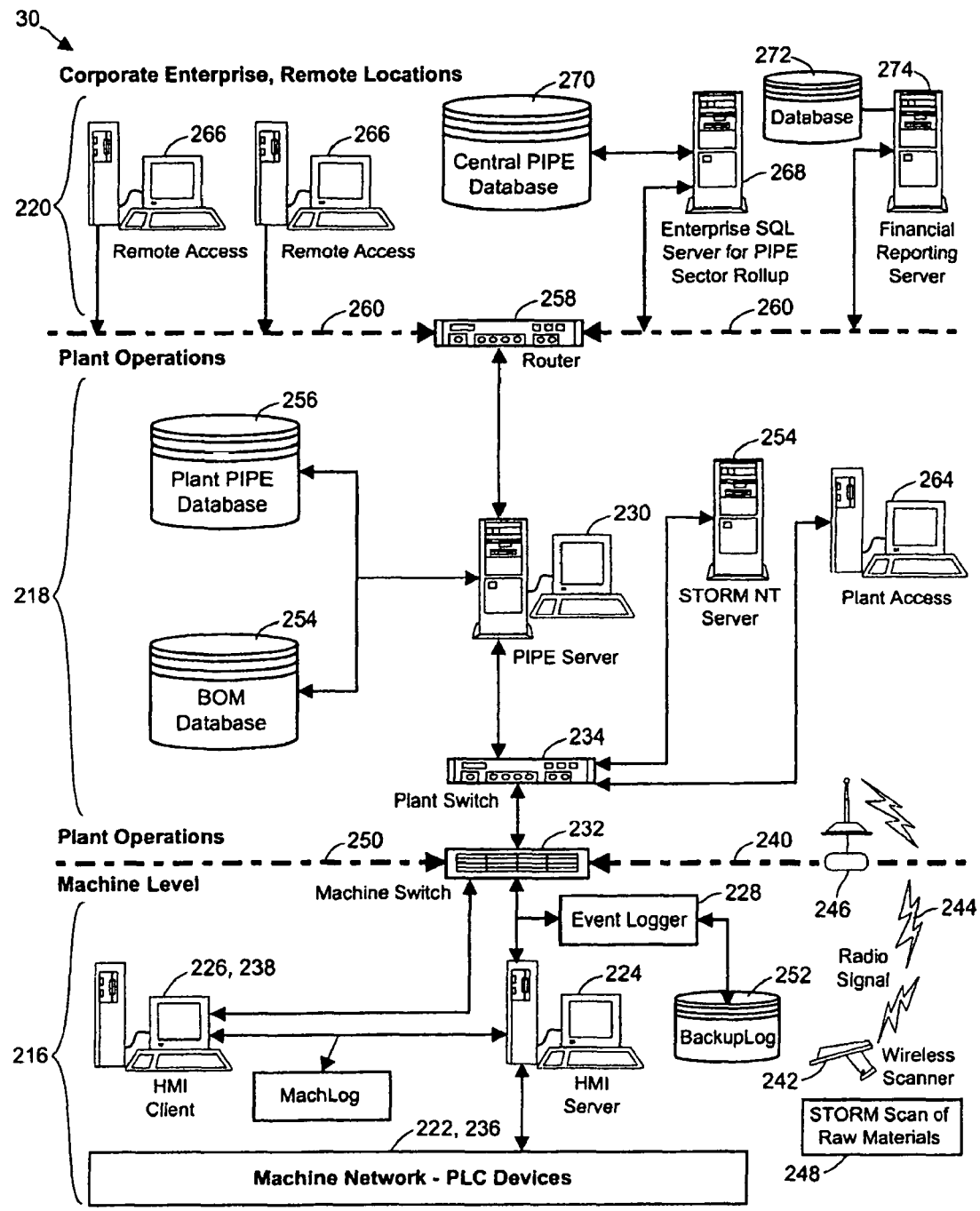
FIG. 9 is an exemplary block diagram depicting one embodiment of a hardware configuration according to the invention.

FIG. 9 depicts one embodiment a PIPE-assisted manufacturing process 30 showing a hardware configuration according to the present invention. The figure shows three levels, the machine level 216, the plant operations level 218, and the remote location/corporate enterprise level 220. At the machine level 216, a machine network 222 including PLC devices 236 or other sensor systems provides data to an HMI server 224 equipped with control software such as WONDERWARE brand manufacturing and process control operator-machine interface software (not shown). The HMI server 224 may be interfaced with or connected to other operator stations (e.g., a WINDOWS NT brand operating system operator station) as well, depicted as the HMI client 226. An event logger 228 program shown as hosted on the HMI server (though it could be on another connected device in a LAN), runs to monitor events based on information obtained from the machine network 222 by PLC devices 236 or sensors in general. The event logger 228 sends event data to the PIPE server 230 via a machine switch 232 and plant switch 234, or, if the PIPE server 230 is down or there are other communication problems, the event logger 228 creates a backup log 252 of event information that may be in the form of SQL statements. The HMI server 224, in general, sends operations data out to the PIPE server 230, and may receive master table information from the PIPE server 230 as well to govern the format or form of data sent out. Data sent to the PIPE server 230 may be archived in the plant PIPE database 256.

Manual delay data and information from WONDERWARE brand manufacturing and other process control operator-machine interface software may be shared directly between the HMI server 224 and the HMI client 226 (or other WINDOWS NT brand operating system operator stations). A machine logger 238 running on the HMI client 226 (or it may be elsewhere, such as on the HMI server 224) responds to events detected by the event logger 228 and presents an alert to operators, requesting comments and other information to characterize the delay. Delay information is captured by the machine logger 238 and forwarded to the PIPE server 230 via the machine switch 232 and plant switch 234. The machine switch 232 also may receive other information 250 from various unit operations (not shown) and raw materials information 240, such as scanned license plate information or general bar code or smart tag information scanned by a wireless scanner 242 and transmitted via radio frequency signals 244 to a receiver 246, which sends the transmission to the machine switch 232. From the machine switch 232, the raw materials information 240 may be sent to a STORM server 254 (e.g., a WINDOWS NT brand operating system server) via the plant switch 234 where related databases may be accessed, or raw materials data may be directly loaded into the STORM server 254. Raw material information 240 from the STORM server 254 may be checked against a bill of materials database 254 to verify that the raw material is suitable for the product to be made. An electronic certificate of analysis (not shown) may also be generated or made available and transmitted back to the HMI server 224 or other monitor available to operators performing the scan 248 of the raw material.

Several functions may be executed either by the event logger 228 or software on the STORM server 254, as desired. The STORM server 254 may be the host computer for raw material scanning 248, and may drive dumb terminals or other displays to guide operators receiving or loading raw materials, including generating a signal to generate a display in response to a scan showing the acceptability of a raw material or displaying the certificate of analysis for the raw material. The decision to accept a raw material may be made by the STORM server 254, responsive to bill of material information obtained from the BOM database 254 or other information from the plant database 256. The STORM server 254 may send a signal to an operator and/or to the event logger 228 when an incorrect material is being loaded or considered for loading to warn of the problem and optionally to shut down the machine or process until correct raw materials are provided, or until an override is authorized or a recipe is altered. Information is shared with the PIPE server 230 and may be written to the plant PIPE database 256 or a pointer may be added to the plant PIPE database 256 to show the location of the raw materials data on the STORM server 254.

At the plant level 218, one or more computers for plant access 264 allow employees to access HMI systems or other control systems and plant reporting systems (not shown), and to access PIPE information and PIPE reports via the PIPE server 230 and its connection to the plant PIPE database 256.

A router 258 joins remote locations and corporate-level 220 systems to the plant level 218 PIPE server 230 and associated databases 254, 256, helping to provide means for communication of information 260 between the plant level 218 and corporate level 220. Computers providing remote access 266 at the corporate enterprise level 220 are connected not only to the plant level 218 PIPE system, but also to an enterprise SQL server for PIPE rollup 268, in which the PIPE databases of multiple plants (not shown) are periodically rolled up at the corporate level 220 by providing data for the central PIPE database 270, accessed via the enterprise SQL server 268 for PIPE rollup. A financial reporting server 274 with access to a financial or other corporate database 272 is also connected to the enterprise SQL server 268 via the router 258, allowing financial analyses and forecasts to be made on the basis of current and historical productivity levels. Numerous charts and tables may be generated, and many aspects of plant, sector, and corporate performance may be analyzed through the availability of rolled up PIPE data and consolidated operations data on the enterprise SQL server 268.

The central PIPE database 270 may host standardized maps describing how PIPE data from the plants is formatted or interpreted, and these maps may be downloaded to the plant-level PIPE servers 230 as needed via the enterprise SQL server for PIPE rollup 268. The plant-level 218 PIPE databases 230 may host PIPE support tables, PIPE output tables, packaging tables, and STORM tables, for example. Mapping information and operational information may be shared between the plant-level PIPE database 256 and the PIPE server 230.

Figure 10A:
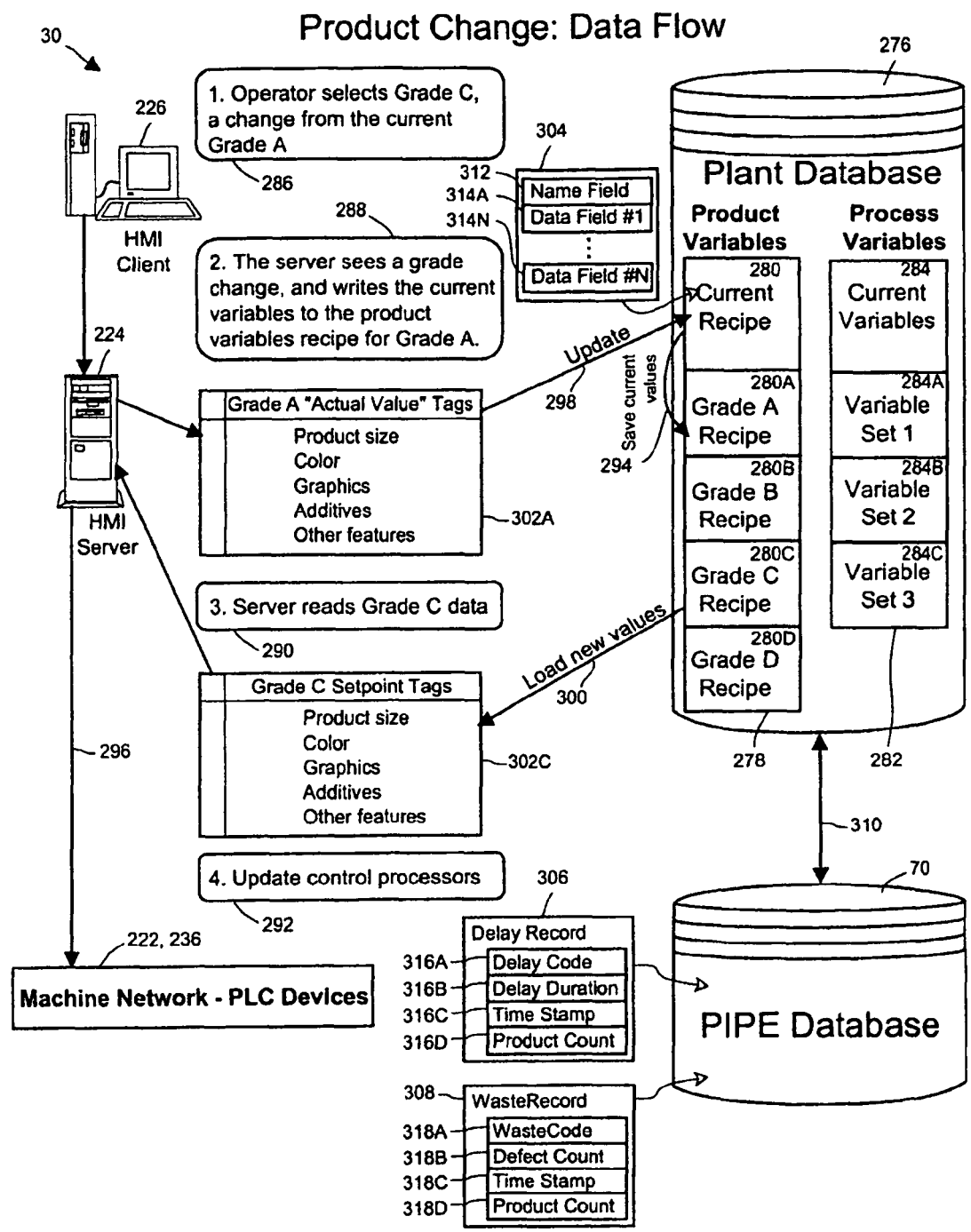
FIG. 10A and FIG. 10B are exemplary block diagrams showing how the product variables and process variables may be loaded, saved, and updated for a manufacturing process incorporating a system of the present invention.
Figure 10B:
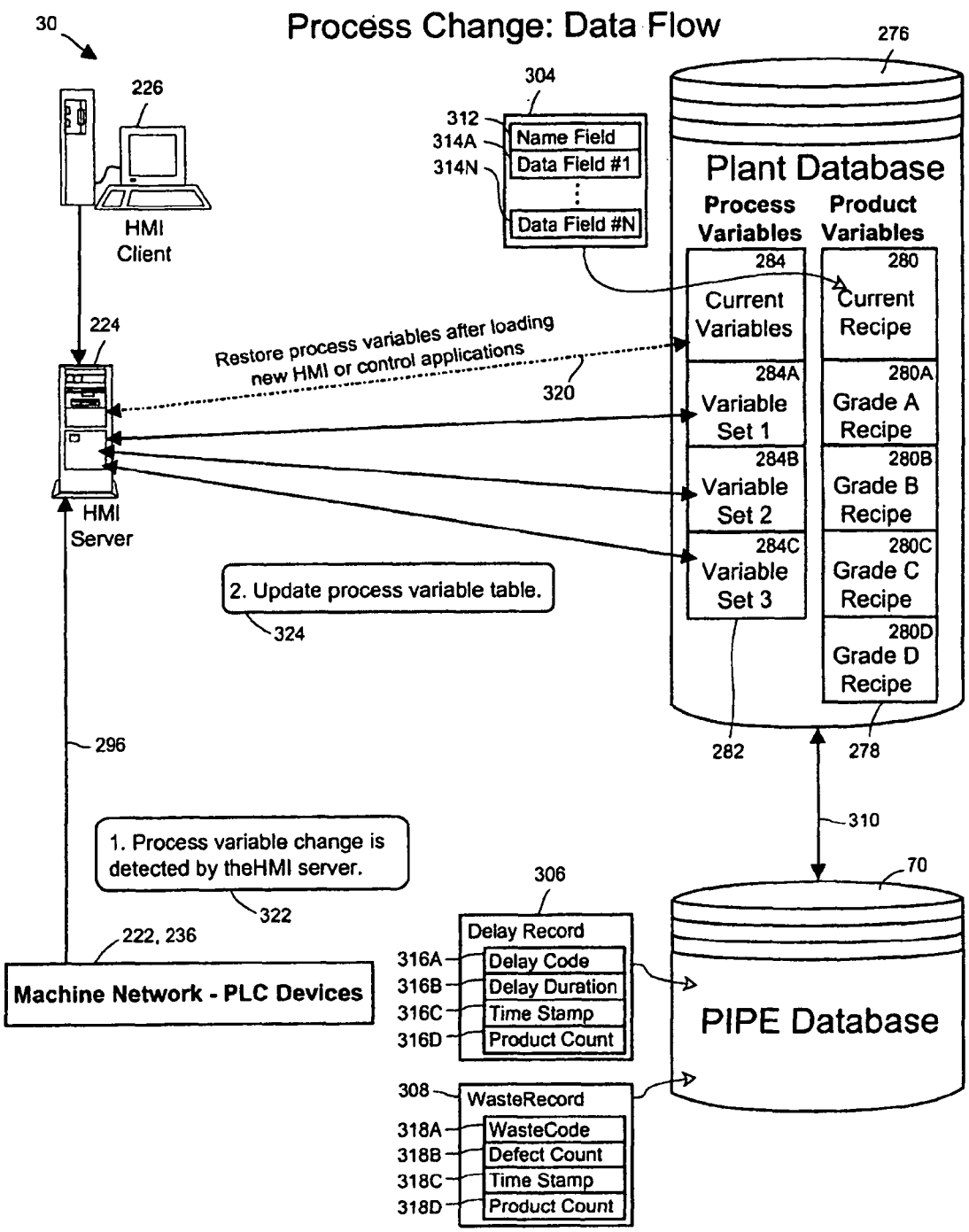

FIG. 10A and FIG. 10B show how the product variables and process variables may be loaded, saved, and updated for a manufacturing process 30 incorporating a PIPE system of the present invention. FIG. 10A depicts a local plant database 276 that maintains records for product variables 278 including product recipes 280 or product specifications (e.g., the composition, size, color, etc. of various product grades) and settings for process variables 282, which may be linked to or may be independent of the grade recipes. In the four steps shown 286, 288, 290, and 292, an operator first chooses to change grades, switching the current recipe 280 from the recipe for Grade A 280A to the recipe for Grade C 280C. The HMI server 224 then sees the grade change and saves 294 the current process variables by writing them into the stored recipe for Grade A 280A (this may be an update of a previous recipe for Grade A). The Grade C recipe 280C is then loaded into the HMI server 224, which in turn updates the control processors for the machine network 226 via communication means 294 which may include an Ethernet system, a DCSNet system, and the like. A central or plant PIPE database 70 periodically records 310 the product variables 278 and process variables 282, taking "snapshots" of variables in use at particular times. These variables may be accessed to identify the operating conditions when a particular product was made.

In one embodiment, each recipe 280 comprises product specification fields 304 including a name field 312 and at least one data field such as data field #1 314A through data field #N 314N, where N is a positive integer.

The records in the PIPE database 70 may include delay records 306 for each event comprising data fields such as a delay code 316A, a delay duration 316B, a time stamp 316C indicating when the event occurred, and a product count 316D (e.g., the number of articles that had been produced in the shift or production run prior to the event). The PIPE database 70 may also include waste records 308 for waste events. A waste record 308 may include data fields such as a waste code 318A, a defect count 318B (e.g., the number of articles lost), a time stamp 318C, a product count 318D, and so forth. Other fields (not shown) may indicate where in the machine a defect occurred (if this information is not already uniquely indicated by the waste code 318A or delay code 316A), which operators were active, etc., and may provide links to the current recipe 280 and current process variables 284 that were in use when the event occurred.

FIG. 10B illustrates a manufacturing process 30 related to that of FIG. 10A, showing the events that occur when a change is made in the process variables 282. First, a process variable change on the machine (not shown) is detected 322 or reported to the HMI server 224. The HMI server 224 then accesses the plant database 276 and updates 324 the table of process variables corresponding to the current variables 284. The new variables, if deemed to be superior to previous variables for a grade, may be recorded as the specified variables for the corresponding grade or grades. For example, Variable Set 1 284A may be suitable for use with the recipes for Grade A 280A and Grade D 280D, and may be the variable set that is in force as the current variables 284. After examination of PIPE data, an operator may determine that runnability would be enhanced on the average by adjusting a process variable such as a temperature in a reactor. After the changed variable is detected 322 and used to update the current variable set 284, the operator or process administrator may use the new current variable set to redefine Variable Set 1 284A, or to create a new variable set (not shown).

The recorded process variables 282 may then be used again later, such as being downloaded to the HMI server 224 from the plant database 276 to restore 320 the process variables 282 when new HMI software is installed, when new control applications are installed, following a shut down, or when a grade is changed. In some embodiments, process variables are present in the HMI server for routine grade changes and are only downloaded from the plant database 276 when there is a need to restore 320 process variables.

Figure 11:
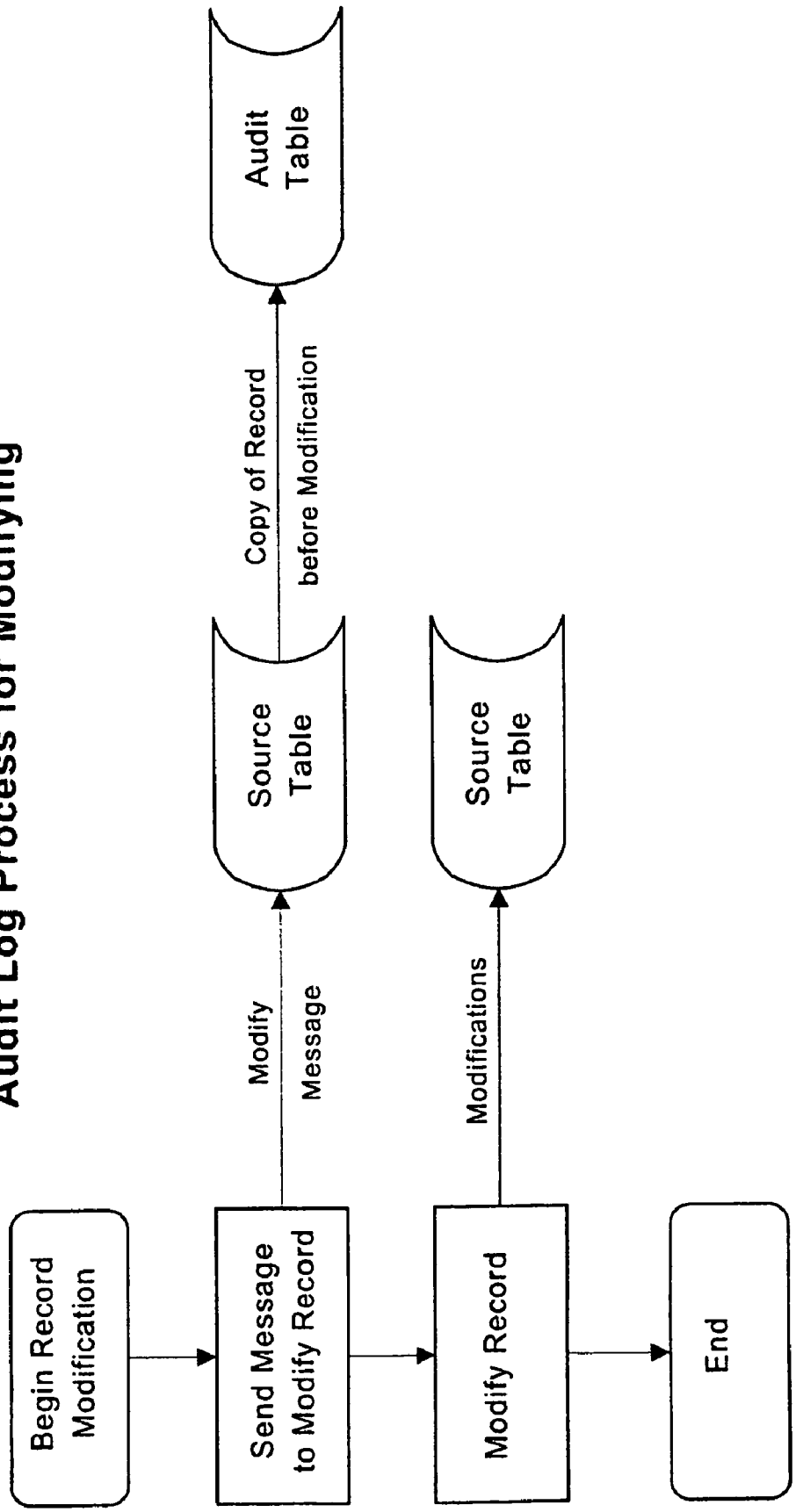
FIG. 11 is an exemplary flow chart illustrating audit operations for modifying data from a database according to the invention.
Figure 12:
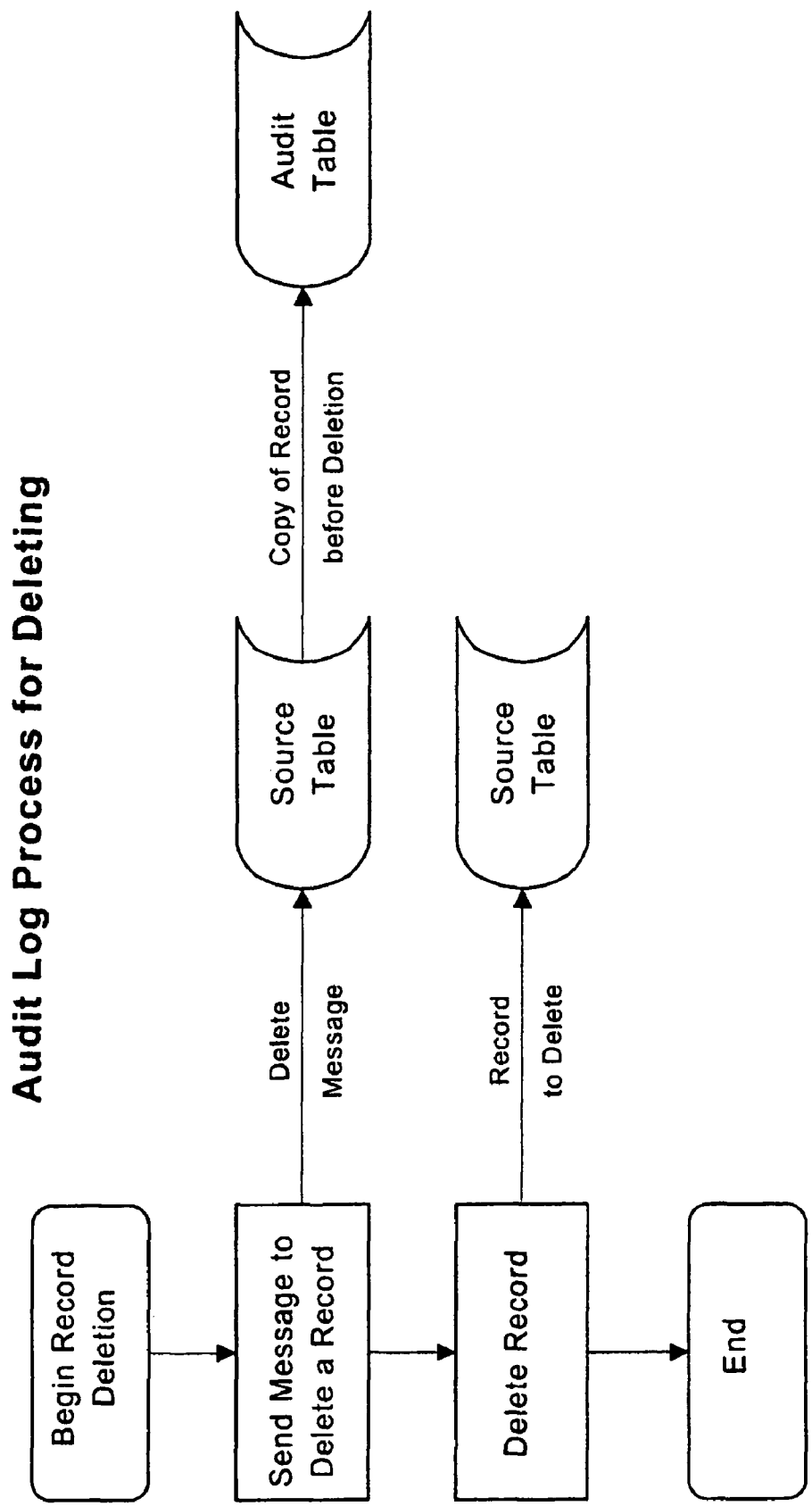
FIG. 12 is an exemplary flow chart illustrating audit operations for deleting data from a database according to the invention.

FIG. 11 and FIG. 12 depict audit operations for modifying or deleting data from a PIPE database. In FIG. 11, once a need has been recognized for record modification, the process begins with a message being sent to modify a record. The message results in a modification request being recorded in a source table, and a copy of the original unmodified record being stored in an audit table. The modification is then made, changing the record the source table. FIG. 12 shows that a similar process is applied when deleting records, resulting in the request to delete a record being stored in a source table, while the original record is stored in an audit table, followed by executing the command to delete a record from a source table.

Figure 13:
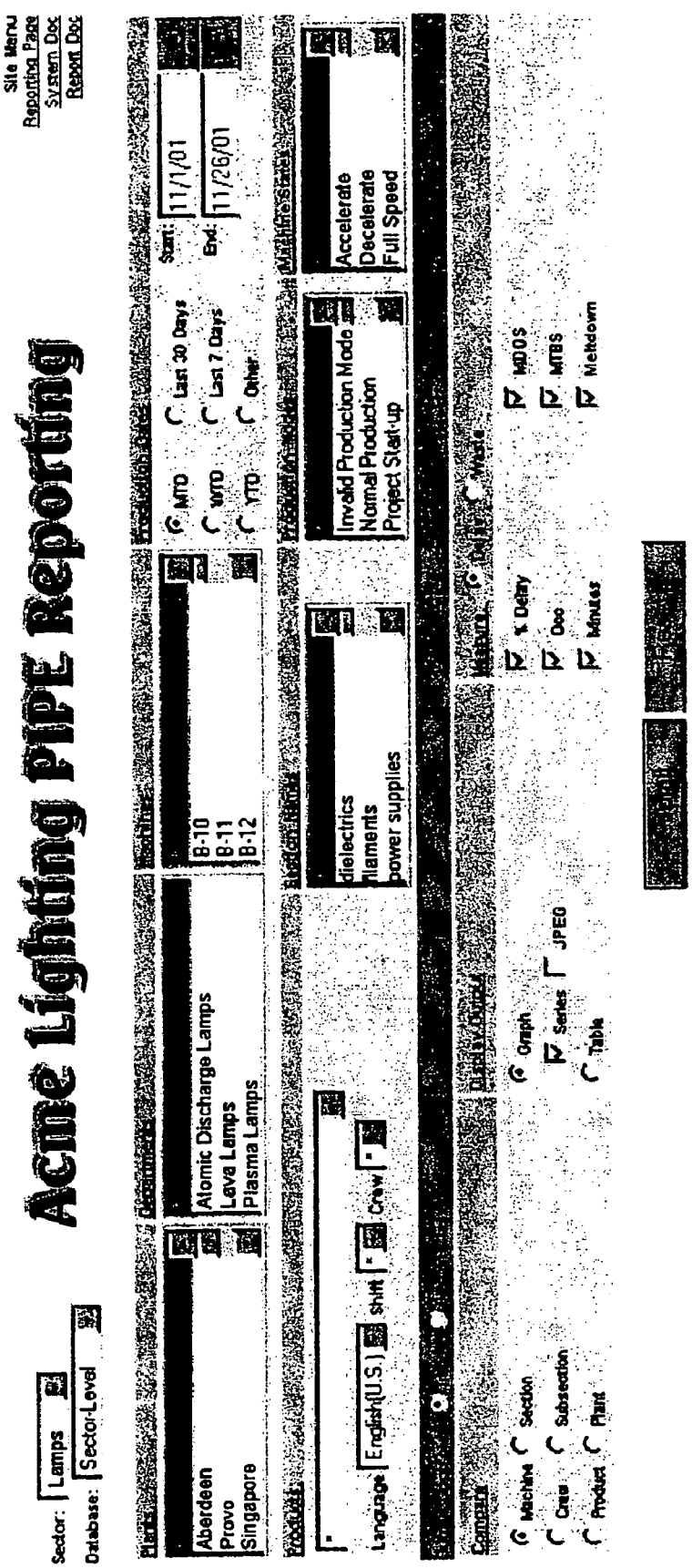
FIG. 13 is a screen shot of the user interface for one exemplary embodiment of the invention illustrating a menu allowing selections for report generation.

FIG. 13 is an exemplary screenshot for a reporting system developed for use with a PIPE system of the present invention. Shown are the types of filters and query information that the user may select to obtain charts or tables of productivity information and other financial reports based on a reporting system cooperatively associated with the PIPE system of the present invention. Exemplary reporting parameters may include mean time between shutdowns, mean delay on shutdown, occurrences of waste or delay events, and so forth. As shown, reporting may be generated for an entire plant, a specific machine, a section or subsection of the machine, a particular crew, or a particularly product or group of products. Reports may explore productivity issues for particular event types or production modes (e.g., normal, start ups, research runs, etc.) or machine states (start up, threading, accelerating, full speed, etc.). Once selections have been made, results may be displayed as a table, a chart, a graphical depiction of the process with embedded or hyperlinked report details, etc.

The reporting system processes data stored in a database. The data includes, but is not limited to, automatically collected event-based waste and delay records in a manufacturing system. Each record represents an event and includes, for example, a timestamp, an event code, and a measure of cost or production loss associated with the event. The reporting system may be implemented as a system on one or more computer-readable media having computer-executable components. Further, the system may include a graphical user interface including a display and a user interface selection device. A display device renders the display.

In general, the reporting system displays a report user interface as illustrated in FIG. 13 via a view component on the display device to a user. The user interface defines a plurality of time periods and a plurality of financial report types. The reporting system receives from the user via the user interface selection device a selected time period corresponding to one or more of the time periods and a selected report type corresponding to one or more of the report types (e.g., via an input component). With reference to FIG. 3, in response to the received selections (e.g., as query 118), the reporting system retrieves report data associated with the selected report type for the selected time period from the data in the database in response to a user command (e.g., via an execution component) to generate a financial report at 116. The retrieved report data pertains only to the selected time period; that is, data from any other time period is excluded from the report data. The time periods include, but are not limited to, a month-to-date time period, a week-to-date time period, a year-to-date time period, a last thirty days time period, a last seven days time period, and a user-specifiable time period. For the user-specifiable time period, the analyst specifies a start date and an end date. In the embodiment of FIG. 13, the user may use the user interface selection device (e.g., a mouse) to select the "SUBMIT" button to issue the user command or send an execution signal to the reporting system.

In addition, the report user interface allows an analyst to track information such as percent of rolls with a delay event, splice efficiency, and the waste and delay associated with different unwind spindles, raw material slit position, lot number, and position within a roll. The analyst may also track, for example, the amount of waste or delay as a function of the raw material age to allow the analyst to optimize inventory levels. In addition, the PIPE reporting page allows an analyst to "drill down" through data. In other words, the analyst using the report user interface can roll up at the sector level and drill down by mill (e.g., selecting a mill). After clicking a mill, the analyst may further drill down by machine. Further, the analyst may click a sector delay number or waste number and to generate a report that shows top delay items or waste items by mill. These numbers may be followed to drill down to the machine level. The report summarizes waste and delay by machine section and/or a "top 10" or "top 50" report of the highest causes of waste and delay.

Example 1

A raw material change was implemented across a number of production facilities, resulting in direct cost savings over the previous material. There was a strong perception among employees at the production level that this new material caused a number of processing problems and had a deleterious effect on machine uptime. Increased process interruptions and machine downtime may potentially negate the savings achieved with the raw material change.

Anecdotal evidence from production facilities caused concern that overall cost savings might not be what was expected because of the increased processing difficulties. Although it seemed clear that some facilities were experiencing difficulties with the new material, a total cost savings analysis was difficult because different machines changed to the material at different times. Further, the facilities tended to use different criteria for determining the impact of the new material, and once some machines experienced problems, sensitivity to the new material was increased and operators on machines that had not seen problems now reported them.

In order to achieve an accurate and unbiased assessment of the total financial impact of the material change, the PIPE database was searched for 28 different categories of machine interruption events known to be caused by the raw material change. The number of events and downtime caused by each event was tallied for each machine on a day-to-day basis for a baseline period before the conversion and for a period after the conversion. All machines were then placed on a normalized time scale where the conversion day was marked by 0. This method allowed the assessment of the average relative impact of the raw material change. A financial-based formula calculated the combined cost of machine stops and downtime minutes.

Results indicated that for a three-month period after the raw material conversion, there was a significant increase in stops and downtime minutes due to the new material, validating what was experienced at the production facilities. This increase may have been enough to warrant a change to the previous material. A key result from the analysis was that, after the three-month period, the number of stops and the amount of delay was not statistically different than the average pre-conversion baseline. This indicated that after a relatively troublesome conversion time, the new raw material may be used at significant cost savings.

The above example required after-the-fact mining of PIPE data by a human agent. The mining of the PIPE data to identify the financial costs of a raw material change may, in an extension of the above example, be modified to be generated automatically. For example, a central server may be programmed to compile production data from various machines or plants that implement a change in a raw material or other aspects of the recipe for a product, or that make a change in equipment, process conditions, and the like. For meaningful analysis of the effect of the change in productivity, the rolled-up data from various sites must be normalized to provide a cumulative time series having a common timeline based on the day that the change was made, which may correspond to different actual dates for the various sites. Thus, the time-series data for each machine or plant may need to be shifted so that the cumulative, averaged, or weighted combination of the data yields a time series with a common origin (day zero) corresponding to the change (or to an arbitrary period of time before of after the change).

In one embodiment, PIPE data from each plant includes information on changes and dates of the change for any change in product recipe, equipment, crew size, etc., so that similar changes at other facilities may be compared based on a meaningful normalized timeline that may require shifting the actual dates for many or all raw data series to provide normalized productivity results for a particular change. In a related embodiment, a user such as an accountant or supervisor may be provided with a menu on a web-based display or other software system, allowing selection of one of several process or raw material changes that have been implemented at one or more facilities, whereupon a normalized time series is displayed showing before and after data from all involved facilities (one data point per facility per reporting period is displayed) or of combined data (one data point per reporting period, averaged or summed or otherwise combined from the results from various facilities for the reporting period), wherein the data type displayed may be selected from a list of available productivity and financial parameters. The resulting data sets displayed may be smoothed, statistically analyzed, transformed, displayed on a web page, incorporated as a graph into a report, and so forth. In this manner, the impact of various changes at various facilities executed at various times may be compared in a meaningful way, allowing combined before and after results to be displayed and further analyzed, as desired, to assess the financial impact of a change (e.g., its impact on any selected productivity measure, including net profit, operating cost, etc.).

Example 2

In the production of an article including a web, the web had been slitted to a narrow width suitable for the article. The narrow roll of the slitted web used as a raw material was produced in another process by slitting a wider roll of the web material. Each slitted roll of the web material was tracked with bar code information that identified the roll, its date and place of manufacturer, and its position on the slitter. The slitter had a plurality of slitter blades and formed a plurality of narrow slitted sections of the web numbered from 1 to N, where N is the number of slit sections and N−1 is the number of slitter blades used. The outer positions of the web were sections 1 and N, while the central position of the web was position N/2 (for even N). The rolls of raw material were used on a machine for producing an article. The machine was equipped with a PIPE system to track process events such as waste and delay at various locations in the machine. Over a period of time, production data was obtained for articles produced with the webs from all slitter positions, and each product was associated with a lot number that may be used to identify which slitter position the associated web came from.

PIPE reporting systems were then used to display cumulative delay during the production period, filtered to only consider delay associated with web handling problems related to the slit web (e.g., a subset of the logged delay codes were used that were known to be linked to web handling problems). The results were further segregated according to splitter position for the web, which was possible because raw material information (including slitter position of the web) had been recorded and was accessible via the PIPE database for the production period. Delay results were displayed as a bar graph, with N bars representing cumulative web-related waste for each of the N slitter positions. The outer bars, corresponding to slitter positions 1 and N, the outside positions, showed the highest delay. Since the web at the outer positions is less restrained than the web in the inner positions during a slitting operation, it is believed to be more subject to flutter, drift, tearing, or other problems, so one may understand that slitting may be more problematic at the outer positions. Problems in slitting for the outermost positions appeared to be clearly reflected in the reported delay rates grouped by slitter position. This method allowed the impact of the problem to be quantified and its effect on financial returns to be determined. Decisions regarding process improvements may then be intelligently pursued and evaluated on a sound financial basis, such as consideration of adding additional restraint to the outer edges of the web such as slitting an thin trim section to be discarded or finding alternative uses for outer portions of the slit web or adjusting production conditions in making a product that employs web slit at the outer positions of a slitter to compensate for expected web handling problems.

In a related embodiment, a quality control system (including one associated with a PIPE system) in the web slitting facility may detect and log possible web quality problems through the use of machine vision during slitting or through other sensors, and this information as a function of the position inside each roll may be fed to the article production line (e.g., into a STORM system) to permit adaptive response of the production line to deal with anticipated quality problems at specific locations in the roll of the slitted web. In this manner, waste and delay may be reduced by communication between a machine producing a raw material and the machine using the raw material, particularly with a feed-forward system based on measured attributes of the raw materials being used.

Example 3

This example deals with analysis of actual PIPE data obtained with a proprietary PIPE-based manufacturing system in which manufacturing events from a consumer products machine were recorded over time. The machine processed a variety of raw materials, including webs of material provided in roll form. To maintain a continuous web being fed into the machine, web splices were routinely performed, particularly between the tail end of one roll and the leading edge of the next roll.

During the review of PIPE summary data of machine stops and delay on the consumer products machine, a particular machine section was identified as contributing an excessively large percent of the total number of daily machine stops. A number of possible reasons for the increased section stops were hypothesized, some of which were connected to various other events that occurred on the machine. In particular, various raw material splice events were suspected as possible causes for the increased stops in the particular machine section. In order to test these hypotheses, PIPE data were retrieved for every machine stop that originated in the particular machine section over a number of months. From these data, the exact time of each stop was obtained. These event times were tested for correlation with other machine events such as machine start-up, raw material splice on, etc. (The occurrence times for these other events were also obtained from the PIPE and STORM databases.) Analysis showed that the machine section stops were highly correlated with the splice-on event of one particular raw material.

Figure 14:
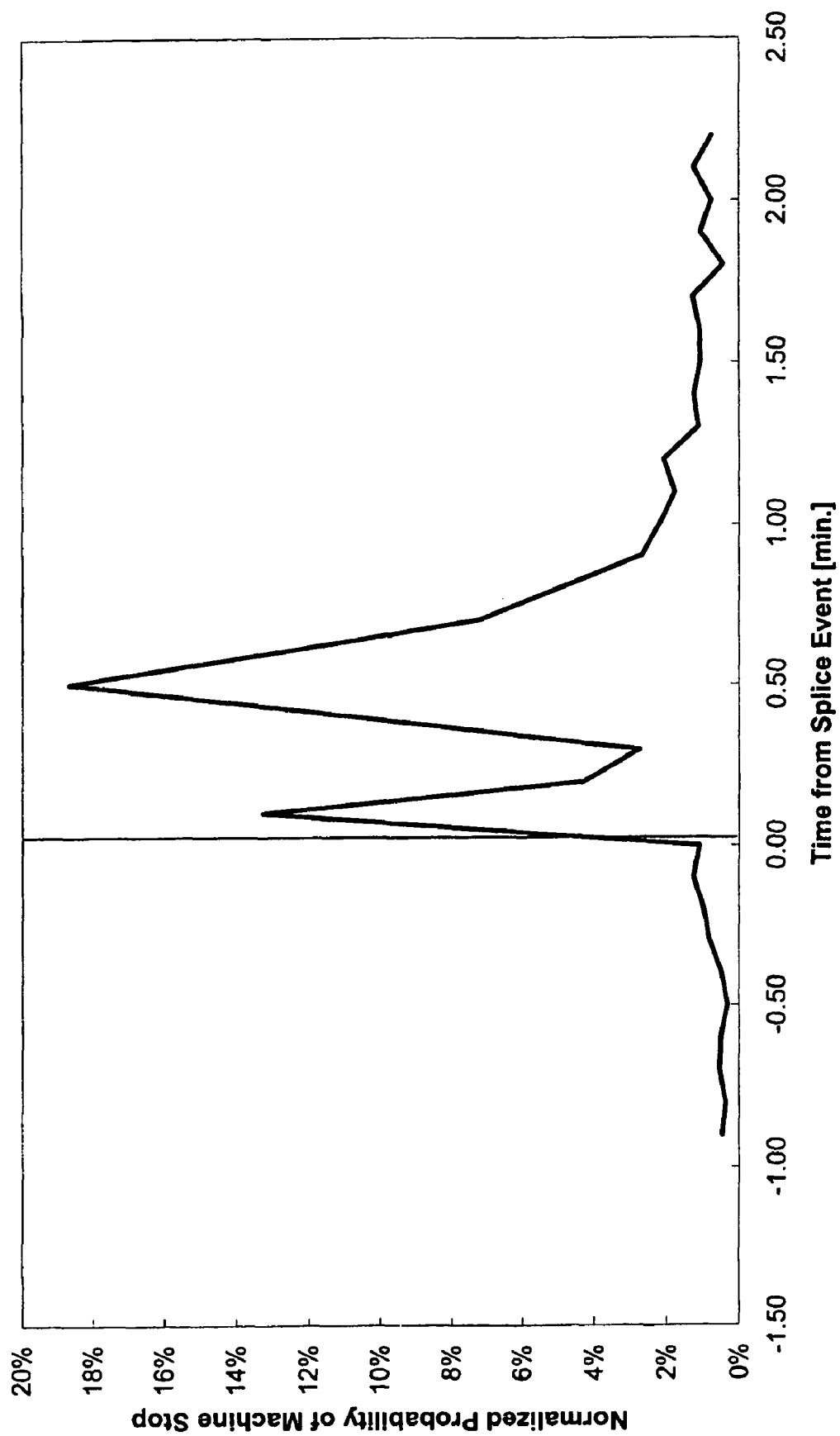
FIG. 14 is an exemplary graph illustrating normalized probability of machine stop over time.

FIG. 14 shows the results of this analysis. The normalized probability of the particular machine section causing a stop is plotted against the temporal distance from the raw material splice-on event. A marked increase in the probability of a stop around this event is evident. In addition to showing a strong relationship between the two events, a distinct bi-modal distribution in the probability of a stop is apparent, suggesting that at least two different failure mechanisms were responsible for the section stops. The relative frequency of each peak of the distribution allowed proper prioritization of recourses to correct the problem.

In many modern converting lines, such as those that manufacture personal care articles, different events, such as new rolls of raw material splicing on, may occur every few minutes. It is highly improbable for an operator to be able to discern, on a long-term and statistically significant basis, between the many possible cause-and-effect relationships that may cause machine stops. The present example illustrates the potential of mining PIPE data for correlations to identify previously unrecognized problems or opportunities.

Example 4

Figure 15:
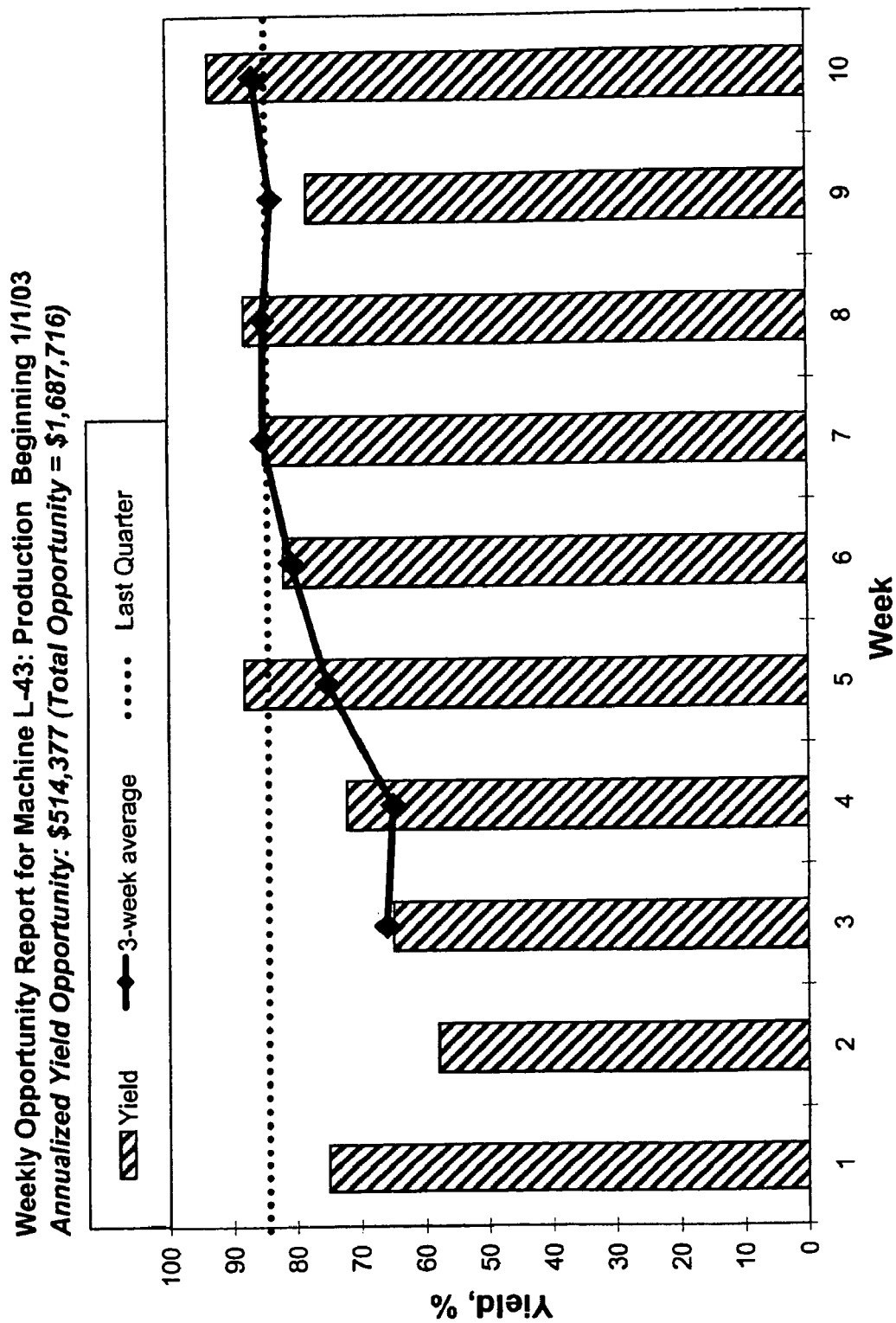
FIG. 15 is an exemplary bar chart illustrating the yield in a plant over a ten-week period, including weekly averages, a moving three-week average, and an average from the previous quarter.
Figure 16:
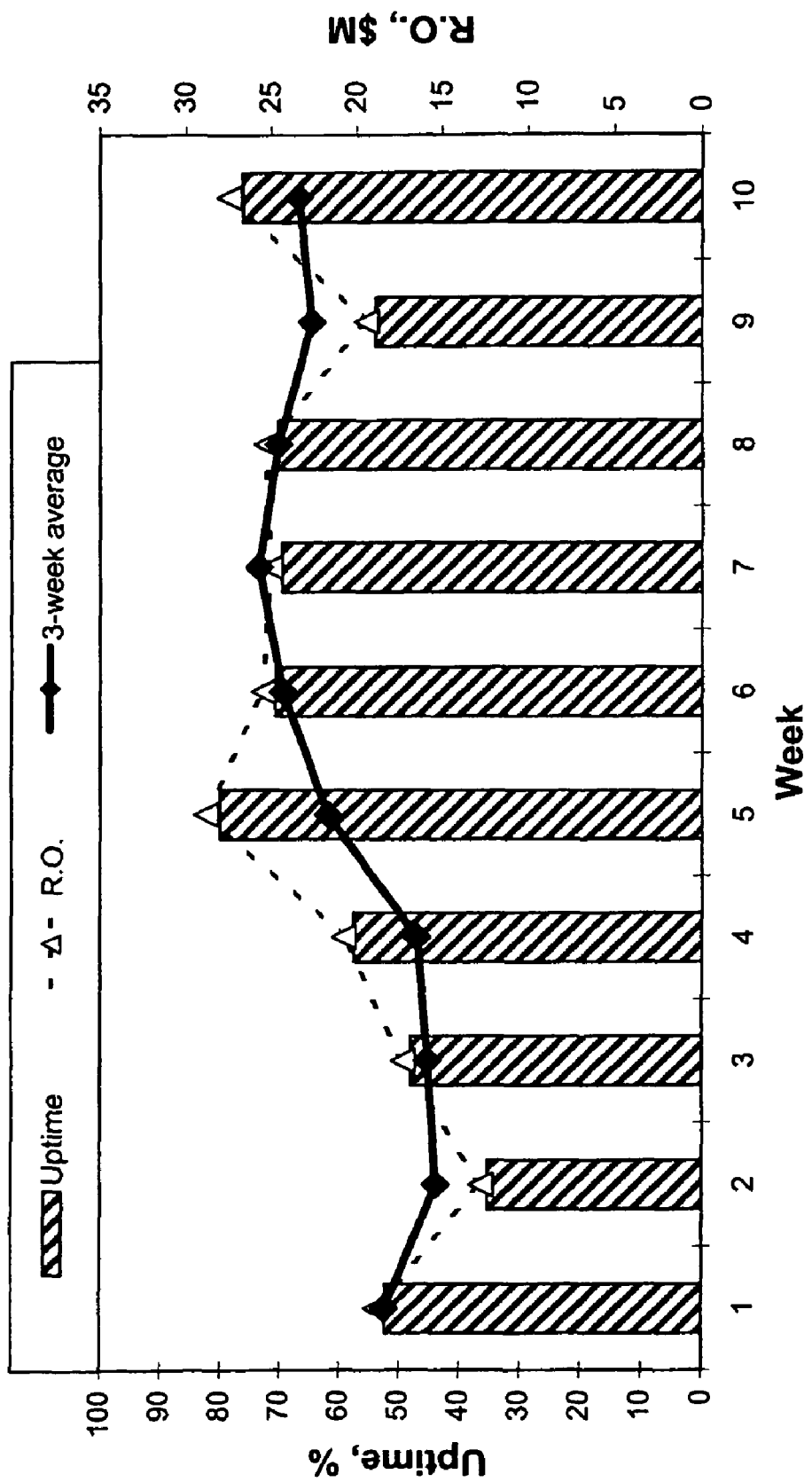
FIG. 16 is an exemplary bar chart illustrating the uptime in a plant over a ten-week period, including weekly averages, a moving three-week average, and an average from the previous quarter.

Examples of financial reports automatically obtainable by a PIPE system for a hypothetical manufacturing operation are shown in FIG. 15 to FIG. 18. FIG. 15 shows the yield in a plant over a ten-week period, showing weekly averages, and a moving three-week average as well as the average from the previous quarter. The report includes information specifying the machine and reported Waste Opportunity Cost (labeled as yield opportunity costs). FIG. 16 shows a related report from the same mill, but reporting uptime results instead of yield. The Downtime Opportunity Cost is also reported. The total opportunity cost is the sum of the Downtime Opportunity Cost and Waste Opportunity Cost.

In another embodiment, a user generates curves in a financial report that represent different machine uptimes for a process having multiple process steps. The actual data for individual processes may then be plotted to give a visual representation of the performance of the individual processes. From this one plot, an analyst may view process performance and analyze how duration and frequency play a role in producing that result. In addition, tables with data for varying percentages of machine uptime may also be generated for analysis.

In another example, a normalized process/section uptime number facilitates comparison not only to other process sections but also to a machine uptime number. The machine uptime number is generated by factoring in the number of process sections in the machine in determining process uptime. By plotting process results on a graph, an analyst may view overall performance, variability in performance, contributing factors to performance, and frequency or duration. The results may be grouped into levels of performance that potentially may be related to the types of corrective action. For example, different corrective actions may be employed if the process uptime is greater than seventy percent, less than seventy percent but greater than fifty percent, or less than fifty percent. Those skilled in the art will note that the percentage thresholds are exemplary and will vary in different embodiments.

Figure 17:
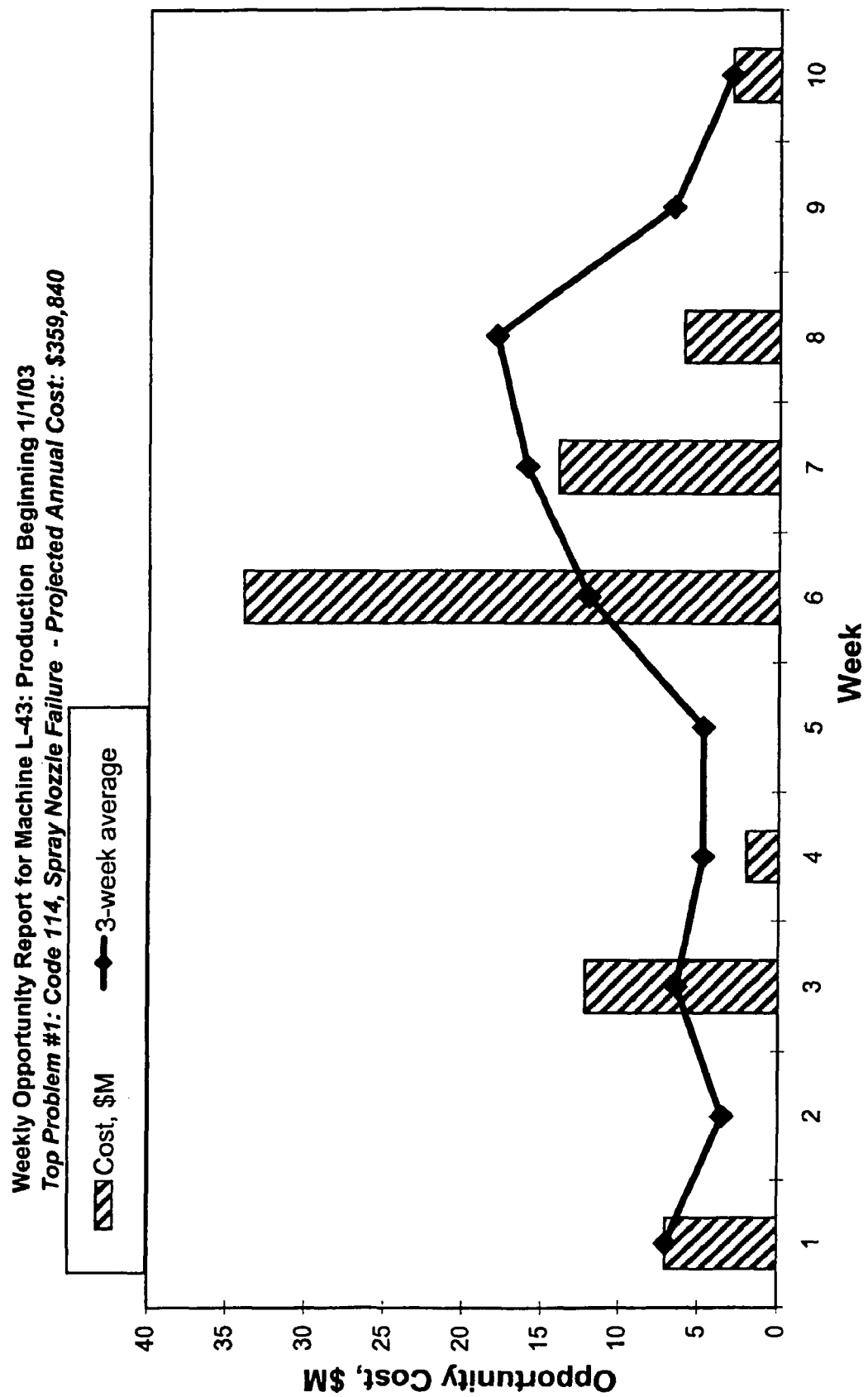
FIG. 17 is an exemplary bar chart illustrating opportunity costs for a single delay event on a single machine including weekly results over ten weeks and a three-week moving average.

FIG. 17 shows opportunity costs for a single delay event (spray nozzle failure, listed as code 114) on a single machine, showing weekly results over ten weeks, and a three-week moving average. A projected annual opportunity cost for this event is reported to allow administrators and operators to understand the financial impact of the event.

Figure 18:
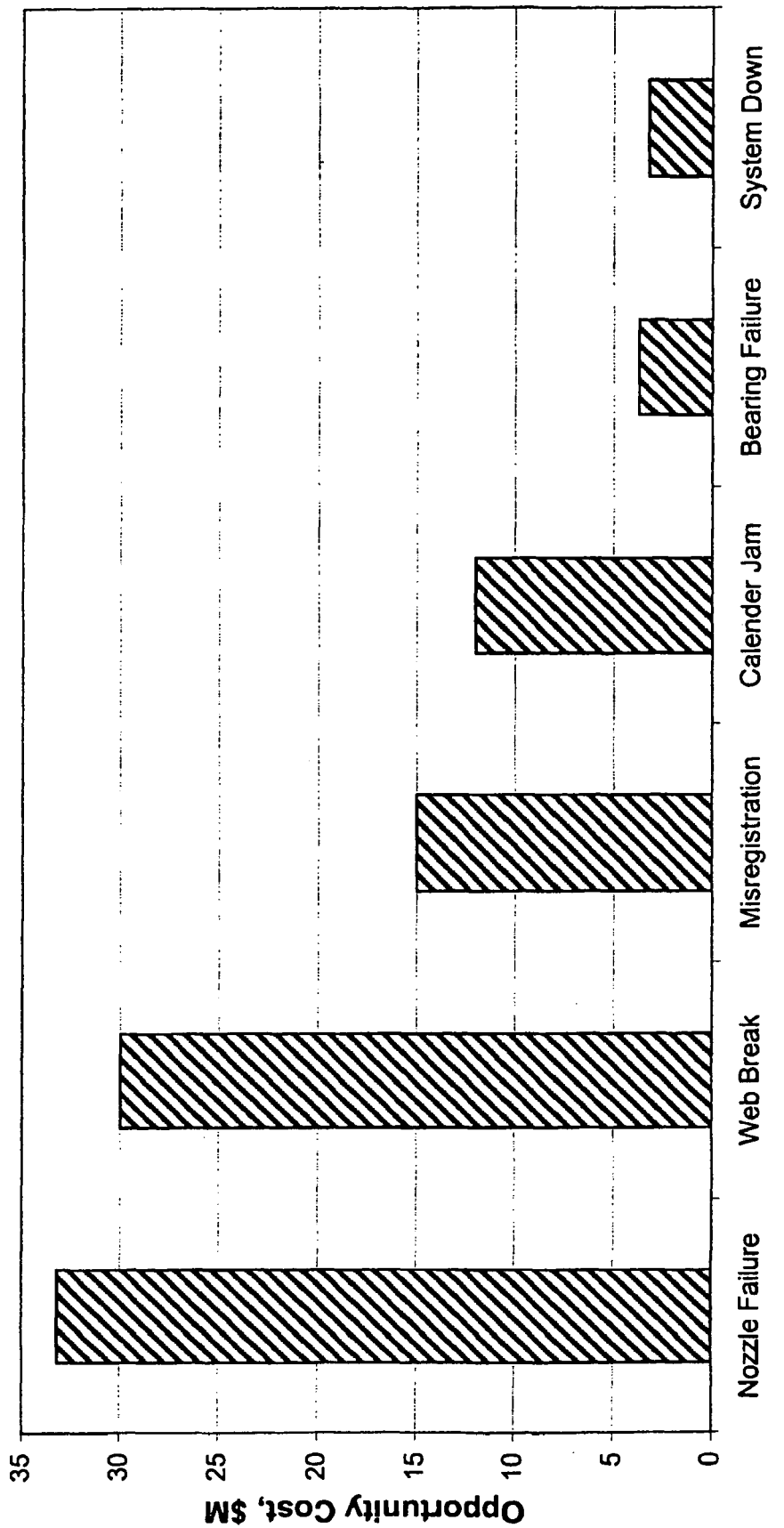
FIG. 18 is an exemplary bar chart illustrating the top six most costly causes of opportunity loss for a specified time period on a particular machine.

FIG. 18 shows a bar chart in which the top six most costly causes of opportunity loss are reported for a specified time period on a particular machine.

The reports may be generated in response to a user request or may be specified for automatic display and updating to permit process administrators to review the information periodically.

Example 5

A prophetic example is described illustrating how a PIPE database may be mined to identify the importance of previously unrecognized variables that may require further monitoring to improve a process or avoid production problems. Analysis of production event from a single machine or single production facility frequently may be inadequate to identify causes of quality problems, particularly when the cause is associated with factors that are not being included in the database. For example, a production problem at a certain time in a cosmetic production line may not have any apparent link to measured raw material properties, line speed, process temperature, and other measured parameters. To explore the possibility of environmental or other factors being associated with the production problem, PIPE event data from other machines in the same production facility may then be analyzed to see if there were related production problems at the same time. If so, a hypothesis may be offered that an environmental or system factor may be at fault, such as process water properties (temperature, pH, dissolved solids, pressure, etc.), humidity, air temperature, dust or other contaminants in the air, a drop or surge in the voltage of electricity provided to the facility, an outbreak of mold in the facility, and the like. Alternatively or in addition, archived data from other sources may be examined, such as a log of water quality measurements, weather information, process water pressure measurements, and the like. The other source of data may be external to the production facility, such as weather data recorded by a meteorological station.

The PIPE system may automatically search other databases to identify possible factors that could account for quality problems, or may inform a human supervisor of the existence of common factors that may be associated with related production problems on multiple machines, and request further action to identify suspected factors. Once factors are identified as having relevance to a production problem, these variables may be routinely monitored as part of the process control approach for the machine and the variables may be incorporated into the PIPE database.

Likewise, production problems with no apparent cause may be used to infer that other factors are playing a role. Steps may then be taken to further identify the factors and add them to the list of variables being monitored in production. These steps may include accessing other databases to search for correlations, or using human input or expert systems to propose hypothesis that may then be tested, typically via expanded measurement of raw material properties, process performance, machine conditions, and so forth, to temporarily obtain additional data until likely causes are identified.

Example 6

One prophetic example of a graphical interface for access to productivity reports is described. For a corporation with multiple production facilities, the PIPE databases and associated databases are accessed and filtered to provide a wide array of customized reports based on user input via a graphical interface. At one level, the interface shows an electronic map depicting icons for the units such as the corporation as a whole and the various sectors and the production facilities associated with the sectors. The interface may be provided via a web browser using tools such as JAVASCRIPT brand computer programs, ACTIVEX controls, XML, DHTML, FLASH brand computer software (Macromedia Corp.), and the like, or may be provided via other means, such as a graphical display in a Human-Machine Interface system such as WONDERWARE brand manufacturing and process control operator-machine interface software, a VISIO brand drawing and diagramming software application (Microsoft Corp.), an electronic map of Business Enterprise Mapping (Scottsdale, Ariz.), or other customized software. Selections made via controls on the screen, including selections offered by clicking on icons, may generate productivity reports for a user-defined period of time, product category (including all categories), or so forth. For example, an officer of the corporation may wish to review overall financial information for all production facilities making health-care products for the current quarter. Upon opening a PIPE report screen via a web browser connected to the corporate Intranet, a screen is provided offering various controls to select the report parameters, and also displaying icons for various corporate entities, such as the overall corporation, its sectors or divisions, and the plants associated with each sector. In one embodiment, the screen is provided in a manner that shows relationships between the entities (such as an organization chart with lines depicting relationships).

A quarter-to-date radio button on the screen may be selected, a checkbox for "waste" may be checked, and a health care category may be selected in a drop down box also on the screen. At this point, the icons for corporate entities on the screen may change in size, color, textual annotation, and/or associated controls (e.g., offered hypertext links, drop-down box items or pop-up menu selections) to convey information about the status of the entities. For example, icons representing sectors or mills that had acceptable levels of waste may appear green, and those with waste above a threshold value (with waste measurement based on wasted product numbers or percentage of waste or a financial measure of the impact of waste, for example) may appear red, with the color saturation being a function of the magnitude of the waste level. Statistics may appear in a box or column associated with each icon to report desired parameters, and charts for waste incidents or other productivity measures may be offered for any plant or sector by clicking on the icon and making a selection from a pop-up menu. Double-clicking on an icon for a mill (or other suitable actions) may expand the display to show icons or other graphics representing processes or machines in a mill, optionally with display of a new window to show mill-related graphics. A new window, for example, may show a graphical depiction of processes used to manufacture the products made at the mill, with the processes being depicted as flow charts or as interrelated machines depicted with icons showing the relationship between the components (hardware, raw materials, final products, etc.). Productivity results may be displayed for each process for a given product, allowing the viewer to rapidly identify which parts of the process or of a machine were causing the greatest waste or delay. For example, a graphical depiction of a paper-making machine might show a square representing stock prep, connected by a line to a box representing a forming section, connected by another line to an icon representing a press section, connected by another line to an icon representing a drying section and finally connected by another line to a box representing a winder. PIPE information may be dynamically linked to the display such that the parts of the process were displayed in a color indicating the level of delay caused by events associated with the respective parts. Thus, for a user-defined reporting period such as quarter-to-date, the drying section may be colored in bright red to indicate that it has contributed substantially more delay than other components. Clicking on the dryer section may then provide more detailed information about the nature of the events, their frequency, and so forth.

In general, an interactive electronic map with multiple levels of detail may be provided to convey both text and graphical indications of the manufacturing performance of various entities in the corporation, all the way down to specific components of an individual machine in a particular plant. The interactive displays may be linked to dynamically provide more detailed information via spreadsheets or other reporting means. Waste, productivity, and quality issues may be viewed at a roll-up level for sectors, product categories, market categories, specific intervals of times, and so forth, with expanding displays providing to interactively allow the user to see how the results for one entity are distributed between the parts that make up the entity (e.g., multiple plants for a sector or various machines within a plant or the parts of a single machine).

Exemplary Operating Environments

The invention provides an intelligent manufacturing system including a process for converting raw materials to a product, a process control system including one or more sensors capable of generating an alarm in response to an event that results in one of waste, machine delay, or decrease product quality, a data logger associated with the process control system for obtaining event parameters associated with the event, a database on a server for recording event parameters obtained by the data logger, and a reporting system cooperatively associated with the database for reporting productivity parameters regarding the process derived at least in part from the event parameters.

In one embodiment, one or more computing devices implement the invention as illustrated and described herein. For example, the computing devices may include a personal computer (PC), a mainframe, a personal digital assistant (PDA), or a combination of various computing devices or the like. The computing devices may communicate with each other and/or with other computing devices via one or more networks such as an intranet or the Internet.

In addition, the computing devices may have access to one or more computer-readable media storing data such as computer-readable instructions and data structures. The computing devices execute the stored computer-readable instructions to perform the tasks embodied by the computer-readable instructions. The computer-readable media store data in a data signal (e.g., a carrier wave). Those skilled in the art will note that the data signal has one or more of its characteristics set or changed in such a manner as to encode information in the data signal. As used herein, the terms "computer-readable medium" and "computer-readable media" encompass data signals. Further, the terms "computer-readable medium" and "computer-readable media" encompass a smart tag, a memory device, or any other device storing data and located proximal to a material such as a raw material or an intermediate product.

One or more computer-readable media have computer-executable components including a control module and a database module. The control module collects, during a first process, event data relating to a material. The database module stores the event data collected by the control module as a data record. An identifier within the database module is associated with the data record. The data record is accessible via its associated identifier so that the collected event data in the database module is obtainable during a second process occurring subsequent to the first process.

One or more computer-readable media store a data structure representing an identifier for a material in an event-based manufacturing system. The data structure includes a first field storing a vendor code representing a vendor of the material. The data structure also includes a second field storing a batch code assigned by the vendor representing a batch of the material.

In an event-based manufacturing system, one or more computer-readable media for use in conjunction with a second process occurring after a first process, store a data structure representing event data for a material. The data structure includes one or more fields storing data describing characteristics of the material. The data structure is populated during the first process and is accessible during the second process.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes may be made in the above systems and methods without departing from the scope of the invention, it is intended that all matter contained in the above description and shown in the accompanying drawings shall be interpreted as illustrative and not in a limiting sense.

What is claimed is:

1. A method for collecting, storing, and/or reporting machine productivity, waste, and/or delay information on an event basis in a manufacturing system, the method comprising:
monitoring for an occurrence of an event associated with a raw material via a process sensor;
detecting an event trigger in response to the monitoring, wherein the event trigger indicates the occurrence of the event;
obtaining raw material attribute data in response to the detecting, the raw material attribute data comprising an attribute of the raw material affected by the event;
automatically validating the raw material attribute data;
storing the raw material attribute data in a database; and
correlating the stored raw material attribute data with a quality control issue to identify corrective action.

2. The method of claim 1, further comprising assuring quality of the stored data by performing error checking on the stored raw material attribute data.

3. The method of claim 1, further comprising:
embedding a plurality of identification devices in a raw material; and
monitoring the plurality of identification devices as the raw material passes through a component in the manufacturing system, wherein obtaining the raw material attribute data comprises obtaining raw material position data indicating a position of the raw material with respect to the component.

4. The method of claim 3, wherein embedding the plurality of identification devices comprises embedding a plurality of identification devices at various locations in a raw material, and wherein the monitoring the plurality of identification devices comprises monitoring by a scanning device in a machine.

5. The method of claim 1, wherein correlating the stored raw material attribute data comprises correlating via fuzzy logic.

6. The method of claim 1, wherein correlating the stored raw material attribute data comprises correlating the stored raw material attribute data with the quality control issue to identify one or more of the following: repairs, modification to production methods, and modifications to the component.

7. The method of claim 3, wherein monitoring the plurality of identification devices comprises monitoring the plurality of identification devices as the raw material passes through one or more of the following in the manufacturing system: a moving device, a belt, and a wire.

8. The method of claim 3, wherein monitoring the plurality of identification devices comprises monitoring one or more.

9. The method of claim 1, wherein monitoring for the occurrence of the event comprises monitoring at least one identification device associated with a raw material from a first process, and further comprising:
determining a physical location of the raw material in response to the monitoring to use the raw material in a second process; and
associating the determined physical location of the raw material with the obtained raw material attribute data.

10. The method of claim 9, further comprising generating one or more reports based on the stored data, wherein at least one report is based on the determined physical location.

11. The method of claim 9, wherein monitoring the at least one identification device comprises monitoring the at least one identification device associated with one or more of the following: a roll, a pallet, and a box of materials.

12. The method of claim 9, wherein monitoring at least one identification device comprises monitoring at least one ultra-wide band transmitter emitting a signal, and further wherein determining the physical location of the raw material comprises triangulating the physical location of the raw material based on the emitted signal.

13. The method of claim 9, wherein monitoring at least one identification device comprises monitoring at least one smart tag emitting a radio frequency signal and wherein the method further comprises receiving, the emitted radio frequency signal with a scanning device.

14. A system, comprising:
a memory area for storing a data structure in an event-based manufacturing system, wherein the data structure comprises one or more fields configured to store data describing at least one characteristics associated with a raw material and an event associated with the raw material; and
a processor configured to execute computer-executable instructions for
monitoring for an occurrence of the event via a process sensor;
detecting an event trigger in response to the monitoring, wherein the event trigger indicates the occurrence of the event;
obtaining raw material attribute data in response to the detecting, the raw material attribute data describing the at least one characteristics associated with the raw material and the event;
populating the one or more fields of the data structure with the obtained raw material attribute data;
automatically validating the data stored in the one or more fields of the data structure;

storing the raw material attribute data populated in the one or more fields of the data structure;

correlating the stored raw material attribute data with a quality control issue; and generating a report based on the recorded data.

15. The system of claim 14, wherein the obtained raw material attribute data comprises one or more of the following: a position of the raw material with respect to a machine component, a process variable from a control system, a measure of the waste, delay, or quality loss associated with the event, and operator input.

16. The system of claim 14, wherein the at least one characteristics comprises one or more of the following: product waste, machine down time, machine slow downs, product maintenance, and machine failure.

17. The system of claim 14, wherein the one or more fields comprise an output table storing one or more of the following: a machine reference field identifying the machine, a timestamp field defining the date and time of the event data, a delay code field identifying a type of delay, a delay trigger field indicating an origin of delay, a grade shift field representing a shift in production parameters, operator comments, and a duration field representing a delay length.

18. The system of claim 14, wherein the one or more fields comprise a support table interpreting the characteristics, the support table comprising one or more of the following: a delay code field identifying a type of delay, a description field describing the delay code, a programmable logic controller field associated with the delay code, a section field identifying a machine section relating to the event data, a machine type field identifying a type of machine, an alarm source field indicating alarm origin.

19. A tangible computer-readable medium having instructions stored thereon, the instructions comprising:

instructions for monitoring for an occurrence of an event associated with a raw material via a process sensor;

instructions for detecting an event trigger in response to the monitoring, wherein the event trigger indicates the occurrence of the event;

instructions for obtaining raw material attribute data in response to the detecting, the raw material attribute data comprising an attribute of the raw material affected by the event;

instructions for automatically validating the raw material attribute data;

instructions for storing the raw material attribute data in a database; and instructions for correlating the stored raw material attribute data with a quality control issue to identify corrective action.

20. The method of claim 1 wherein correlating the stored raw material attribute data comprises correlating the stored raw material attribute data with at least one of a waste loss, a delay loss, or a quality loss to identify corrective action.

* * * * *

UNITED STATES PATENT AND TRADEMARK OFFICE
CERTIFICATE OF CORRECTION

| | | |
|---|---|---|
| PATENT NO. | : 7,882,438 B2 | Page 1 of 1 |
| APPLICATION NO. | : 11/363476 | |
| DATED | : February 1, 2011 | |
| INVENTOR(S) | : Markham et al. | |

It is certified that error appears in the above-identified patent and that said Letters Patent is hereby corrected as shown below:

On Title Page 3, item (56), under "Other Publications", in Column 1, Line 13, delete "Mead's," and insert -- Mead's --.

On Title Page 3, item (56), under "Other Publications", in Column 1, Lines 13-14, delete "Software." PIMA'North" and insert -- Software," PIMA's North --.

Column 58, line 18, in Claim 8, delete "more." and insert -- more smart tags --.

Column 58, line 44, in Claim 13, delete "receiving," and insert -- receiving --.

Column 58, line 50, in Claim 14, delete "characteristics" and insert -- characteristic --.

Column 58, line 62, in Claim 14, delete "characteristics" and insert -- characteristic --.

Column 59, lines 12-13, in Claim 16, delete "characteristics" and insert -- characteristic --.

Column 60, line 23, in Claim 20, delete "claim 1" and insert -- claim 1, --.

Signed and Sealed this
Thirty-first Day of May, 2011

David J. Kappos
*Director of the United States Patent and Trademark Office*